(12) United States Patent
Murase et al.

(10) Patent No.: US 7,062,155 B2
(45) Date of Patent: *Jun. 13, 2006

(54) OPTICAL DISC, RECORDING DEVICE AND REPRODUCING DEVICE

(75) Inventors: Kaoru Murase, Nara (JP); Tomoyuki Okada, Osaka (JP); Kazuhiro Tsuga, Hyogo (JP); Noriko Sugimoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 228 days.

This patent is subject to a terminal disclaimer.

(21) Appl. No.: 10/713,112

(22) Filed: Nov. 17, 2003

(65) Prior Publication Data

US 2004/0096704 A1    May 20, 2004

Related U.S. Application Data

(62) Division of application No. 09/678,651, filed on Oct. 4, 2000, now Pat. No. 6,681,077, which is a division of application No. 09/538,294, filed on Mar. 30, 2000, now Pat. No. 6,377,747.

(30) Foreign Application Priority Data

Apr. 2, 1999 (JP) .................................. 11-96516
Mar. 2, 2000 (JP) .............................. 2000-57116

(51) Int. Cl.
*H04N 5/781* (2006.01)
*H04N 5/928* (2006.01)
*H04N 5/83* (2006.01)

(52) U.S. Cl. .................... 386/99; 386/105; 386/106

(58) Field of Classification Search ............... 386/125, 386/124, 96, 97, 98, 99, 104, 105, 106, 39, 386/40, 45

See application file for complete search history.

(56) References Cited

U.S. PATENT DOCUMENTS

| 5,469,370 A | 11/1995 | Ostrover |
| 5,568,461 A | 10/1996 | Nishiuchi et al. |
| 5,703,997 A | 12/1997 | Kitamura et al. |
| 5,706,385 A * | 1/1998 | Suzuki et al. ............... 386/34 |
| 5,715,224 A | 2/1998 | Fujinami |

(Continued)

FOREIGN PATENT DOCUMENTS

CN    1151577    6/1997

(Continued)

*Primary Examiner*—Robert Chevalier
(74) *Attorney, Agent, or Firm*—Wenderoth, Lind & Ponack, L.L.P.

(57) ABSTRACT

Optical discs formatted to record plural audio streams of different content for reproduction with a single video stream can result in audio output of content unexpected by the user depending upon the audio stream configuration contained in the AV stream reproduced. This can confuse and cause the user to change the audio output after reproduction starts. To prevent this, information indicating the type of audio stream configuration contained in each AV stream on the optical disc is stored with each audio stream. This audio stream type information is presented to the user on the same screen from which an AV program is selected for playback. The user can thus know before playback starts what audio stream channel is preselected for playback, and can change the audio channel as desired before playback starts.

2 Claims, 50 Drawing Sheets

U.S. PATENT DOCUMENTS

| | | |
|---|---|---|
| 5,751,371 A | 5/1998 | Shintani |
| 5,838,873 A | 11/1998 | Blatter |
| 5,881,203 A | 3/1999 | Fujinami et al. |
| 5,915,066 A | 6/1999 | Katayama |
| 5,933,398 A | 8/1999 | Fujinami |
| 5,953,290 A | 9/1999 | Fukuda |
| 6,097,676 A | 8/2000 | Fujinami |
| 6,208,802 B1 | 3/2001 | Mori |
| 6,219,488 B1 | 4/2001 | Mori |
| 6,222,805 B1 | 4/2001 | Mori |
| 6,253,021 B1 | 6/2001 | Yagi |
| 6,278,834 B1 | 8/2001 | Yagi |
| 6,282,363 B1 | 8/2001 | Yagi |
| 6,393,206 B1 | 5/2002 | Yagi |
| 6,404,980 B1 | 6/2002 | Yagi |
| 6,553,180 B1 * | 4/2003 | Kikuchi et al. ............... 386/95 |
| 2001/0010757 A1 | 8/2001 | Mori |
| 2001/0046377 A1 | 11/2001 | Yagi |
| 2002/0127002 A1 | 9/2002 | Mori |
| 2002/0127003 A1 | 9/2002 | Mori |
| 2002/0141738 A1 | 10/2002 | Yagi |
| 2003/0123346 A1 | 7/2003 | Ishii |
| 2003/0175016 A1 | 9/2003 | Mori |
| 2004/0071446 A1 | 4/2004 | Yagi |

FOREIGN PATENT DOCUMENTS

| | | |
|---|---|---|
| EP | 0 521 487 | 1/1993 |
| EP | 0 727 780 | 8/1996 |
| EP | 0 858 073 | 8/1998 |
| EP | 0 896 335 | 2/1999 |
| EP | 0 924 704 | 6/1999 |
| EP | 0 896 335 | 10/1999 |
| EP | 1 024 494 | 8/2000 |
| JP | 05095524 | 4/1993 |
| JP | 7-93873 | 4/1995 |
| JP | 8-7282 | 1/1996 |
| JP | 9-180366 | 7/1997 |
| WO | 95/12180 | 5/1995 |
| WO | 97/46007 | 12/1997 |

* cited by examiner

Fig. 7

| VERN | | | | | | | |
|---|---|---|---|---|---|---|---|
| b15 | b14 | b13 | b12 | b11 | b10 | b9 | b8 |
| b7 | b6 | b5 | b4 | b3 | b2 | b1 | b0 |
| reserved | | | | | | | |
| Book version | | | | | | | |

| TM_ZONE | | | | | | | |
|---|---|---|---|---|---|---|---|
| b15 | b14 | b13 | b12 | b11 | b10 | b9 | b8 |
| b7 | b6 | b5 | b4 | b3 | b2 | b1 | b0 |
| TZ_TY | | | | | TZ_OFFSET[11..8] | | |
| TZ_OFFSET[7..0] | | | | | | | |

Fig.9

| PL_TY | | | | | | | |
|---|---|---|---|---|---|---|---|
| b7 | b6 | b5 | b4 | b3 | b2 | b1 | b0 |
| PL_TY1 | | | | reserved | | | |

| PL_CREATE_TM | | | | | | | |
|---|---|---|---|---|---|---|---|
| b39 | b38 | b37 | b36 | b35 | b34 | b33 | b32 |
| b31 | b30 | b29 | b28 | b27 | b26 | b25 | b24 |
| Year[13..6] | | | | | | | |
| b23 | b22 | b21 | b20 | b19 | b18 | b17 | b16 |
| Year[5..0] | | | | | | Month[3..2] | |
| b15 | b14 | b13 | b12 | b11 | b10 | b9 | b8 |
| Month[1..0] | | Day[4..0] | | | | Hour[4] | |
| b7 | b6 | b5 | b4 | b3 | b2 | b1 | b0 |
| Hour[3..0] | | | | Minute[5..2] | | | |
| Minute[1..0] | | Second[5..0] | | | | | |

Fig.10

| PTM describing format | | | | | | | |
|---|---|---|---|---|---|---|---|
| b47 | b46 | b45 | b44 | b43 | b42 | b41 | b40 |
| | | | PTM_base[31..24] | | | | |
| b39 | b38 | b37 | b36 | b35 | b34 | b33 | b32 |
| | | | PTM_base[23..16] | | | | |
| b31 | b30 | b29 | b28 | b27 | b26 | b25 | b24 |
| | | | PTM_base[15..8] | | | | |
| b23 | b22 | b21 | b20 | b19 | b18 | b17 | b16 |
| | | | PTM_base[7..0] | | | | |
| b15 | b14 | b13 | b12 | b11 | b10 | b9 | b8 |
| | | | PTM_extension[15..8] | | | | |
| b7 | b6 | b5 | b4 | b3 | b2 | b1 | b0 |
| | | | PTM_extension[7..0] | | | | |

Fig.11

S_VOB_ENTN describing format

| b47 | b46 | b45 | b44 | b43 | b42 | b41 | b40 |
|---|---|---|---|---|---|---|---|
| b39 | b38 | b37 | b36 | b35 | b34 | b33 | b32 |
| b31 | b30 | b29 | b28 | b27 | b26 | b25 | b24 |
| b23 | b22 | b21 | b20 | b19 | b18 | b17 | b16 |
| b15 | b14 | b13 | b12 | b11 | b10 | b9 | b8 |
| b7 | b6 | b5 | b4 | b3 | b2 | b1 | b0 |

Fields: S_VOB_ENTN (b47–b36), reserved (b35–b0)

Fig.13

| V_ATR | | | | | | | |
|---|---|---|---|---|---|---|---|
| b15 | b14 | b13 | b12 | b11 | b10 | b9 | b8 |
| Video compression | | TV system | | Aspect ratio | | | Application Flag |
| b7 | b6 | b5 | b4 | b3 | b2 | b1 | b0 |
| line21_switch_1 | line21_switch_2 | Video resolution | | | | | reserved |

| A_ATR0/1 | | | | | | | |
|---|---|---|---|---|---|---|---|
| b23 | b22 | b21 | b20 | b19 | b18 | b17 | b16 |
| Audio coding mode | | | reserved | Preference Flag | | | Application Flag |
| b15 | b14 | b13 | b12 | b11 | b10 | b9 | b8 |
| Quantization/DRC | | fs | | | Number of Audio channels | | |
| b7 | b6 | b5 | b4 | b3 | b2 | b1 | b0 |
| Bitrate | | | | | | | |

*Fig.14*

| SP_ATR | | | | | | | |
|---|---|---|---|---|---|---|---|
| b15 | b14 | b13 | b12 | b11 | b10 | b9 | b8 |
| | | reserved | | | | | Application Flag |
| b7 | b6 | b5 | b4 | b3 | b2 | b1 | b0 |
| | | | reserved | | | | |

| SP_PLT | | | | | | | |
|---|---|---|---|---|---|---|---|
| b23 | b22 | b21 | b20 | b19 | b18 | b17 | b16 |
| b15 | b14 | b13 | b12 | b11 | b10 | b9 | b8 |
| | | | Luminance signal(Y) | | | | |
| | | | Color difference signal(Cr=R−Y) | | | | |
| b7 | b6 | b5 | b4 | b3 | b2 | b1 | b0 |
| | | | Color difference signal(Cb=B−Y) | | | | |

Fig.17

| VOB. TY | b15 | b14 | b13 | b12 | b11 | b10 | b9 | b8 |
|---|---|---|---|---|---|---|---|---|
| | TE | A0_STATUS | | A1_STATUS | | reserved | APS | |
| | b7 | b6 | b5 | b4 | b3 | b2 | b1 | b0 |
| | SML_FLG | A0_GAP_LOC | | A1_GAP_LOC | | reserved | | |

Fig. 19

| VOBU_ENT | | | | | | |
|---|---|---|---|---|---|---|
| b23 | b22 | b21 | b20 | b19 | b18 | b17 | b16 |
| | | | 1STREF_SZ | | | |
| b15 | b14 | b13 | b12 | b11 | b10 | b9 | b8 |
| | | | VOBU_PB_TM | | | VOBU_SZ(upper) |
| b7 | b6 | b5 | b4 | b3 | b2 | b1 | b0 |
| | | | VOBU_SZ(lower) | | | |

Fig.21

V_ATR

| b15 | b14 | b13 | b12 | b11 | b10 | b9 | b8 |
|---|---|---|---|---|---|---|---|
| Video compression mode | | TV system | | Aspect ratio | | | reserved |

| b7 | b6 | b5 | b4 | b3 | b2 | b1 | b0 |
|---|---|---|---|---|---|---|---|
| reserved | | Video resolution | | | reserved | | |

OA_ATR

| b15 | b14 | b13 | b12 | b11 | b10 | b9 | b8 |
|---|---|---|---|---|---|---|---|
| Audio coding mode | | | reserved | | | Application Flag | |

| b7 | b6 | b5 | b4 | b3 | b2 | b1 | b0 |
|---|---|---|---|---|---|---|---|
| Quan./DRC | | fs | | | Number of Audio channels | | |

Fig.22

SP_ATR

| b15 | b14 | b13 | b12 | b11 | b10 | b9 | b8 |
|---|---|---|---|---|---|---|---|
| | | | reserved | | | | Application Flag |
| b7 | b6 | b5 | b4 | b3 | b2 | b1 | b0 |
| | | | reserved | | | | |

SP_PLT

| b23 | b22 | b21 | b20 | b19 | b18 | b17 | b16 |
|---|---|---|---|---|---|---|---|
| b15 | b14 | b13 | b12 | b11 | b10 | b9 | b8 |
| | | | Luminance signal(Y) | | | | |
| | | | Color difference signal(Cr=R−Y) | | | | |
| b7 | b6 | b5 | b4 | b3 | b2 | b1 | b0 |
| | | | Color difference signal(Cb=B−Y) | | | | |

Fig.24

| S_VOB ENT (TYPE A) | 2bytes |
|---|---|
| S_VOB ENT_TY | 1byte |
| V_PART_SZ | 1byte |

| S_VOB ENT (TYPE B) | 6bytes |
|---|---|
| S_VOB ENT_TY | 1byte |
| V_PART_SZ | 1byte |
| A_PART_SZ | 2bytes |
| A_PB_TM | 2bytes |

Fig.25

| S_VOB_ENT_TY | | | | | | | |
|---|---|---|---|---|---|---|---|
| b7 | b6 | b5 | b4 | b3 | b2 | b1 | b0 |
| MAP_TY | | TE | reserved | | | | SPST_Ns |

Fig.29

| PG_TY | | | b7 | b6 | b5 | b4 | b3 | b2 | b1 | b0 |
|---|---|---|---|---|---|---|---|---|---|---|
| | | | Protect | reserved | | | | | | |

Fig.31

| C_TY | b7 | b6 | b5 | b4 | b3 | b2 | b1 | b0 |
|------|----|----|----|----|----|----|----|----|
|      |    | C_TY1 | | reserved | | | | |

Fig.32

| M_C_EPI (Type A) | 7bytes |
|---|---|
| EP_TY | 1byte |
| EP_PTM | 6bytes |

| M_C_EPI (Type B) | 135bytes |
|---|---|
| EP_TY | 1byte |
| EP_PTM | 6bytes |
| PRM_TXTI | 128bytes |

| S_C_EPI (Type A) | 7bytes |
|---|---|
| EP_TY | 1byte |
| S_VOB_ENTN | 6bytes |

| S_C_EPI (Type B) | 135bytes |
|---|---|
| EP_TY | 1byte |
| S_VOB_ENTN | 1byte |
| PRM_TXTI | 128bytes |

Fig.33

| EP_TY1 | | b7 | b6 | b5 | b4 | b3 | b2 | b1 | b0 |
|---|---|---|---|---|---|---|---|---|---|
| EP_TY1 | | | | | reserved | | | | |

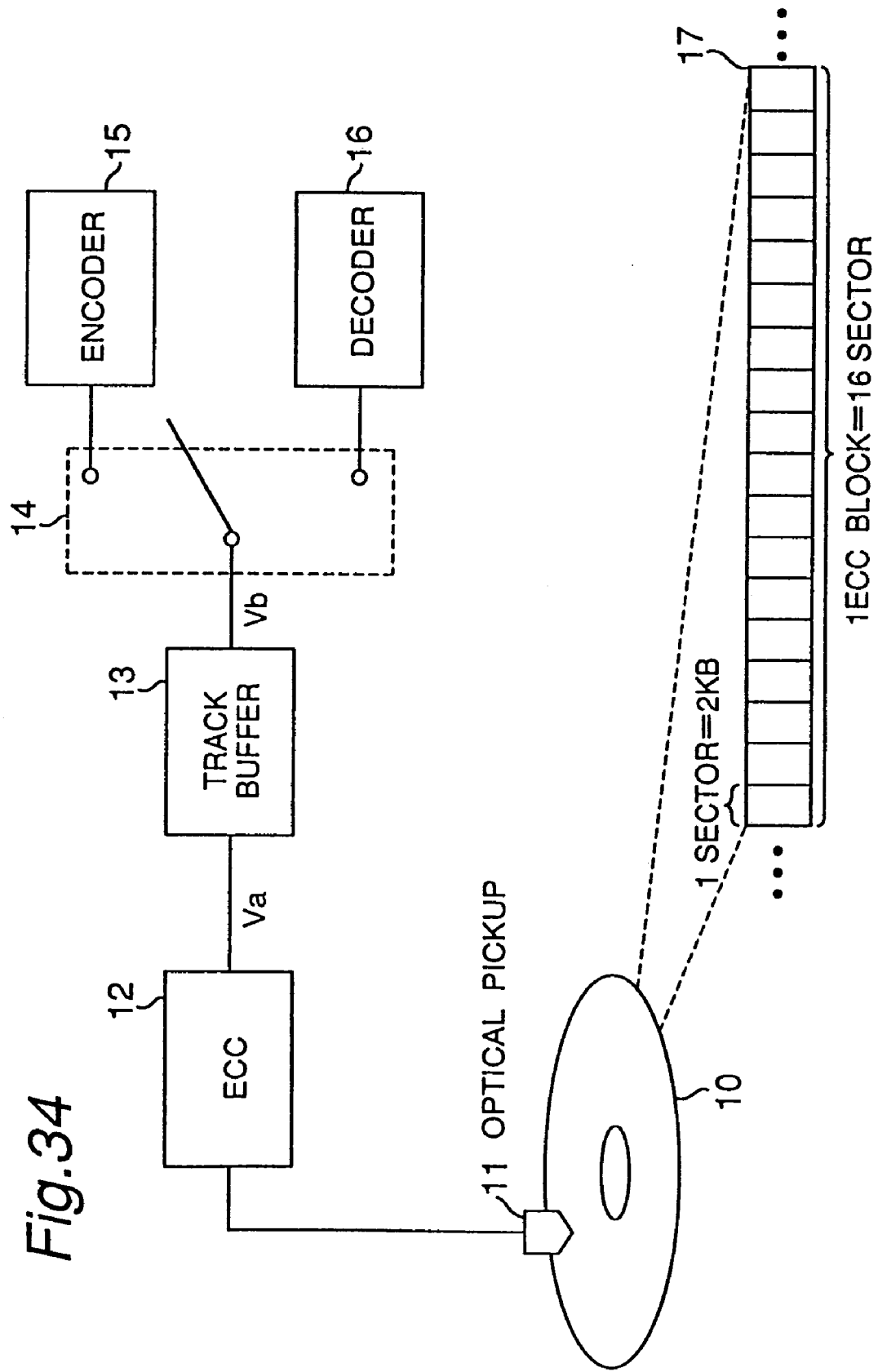

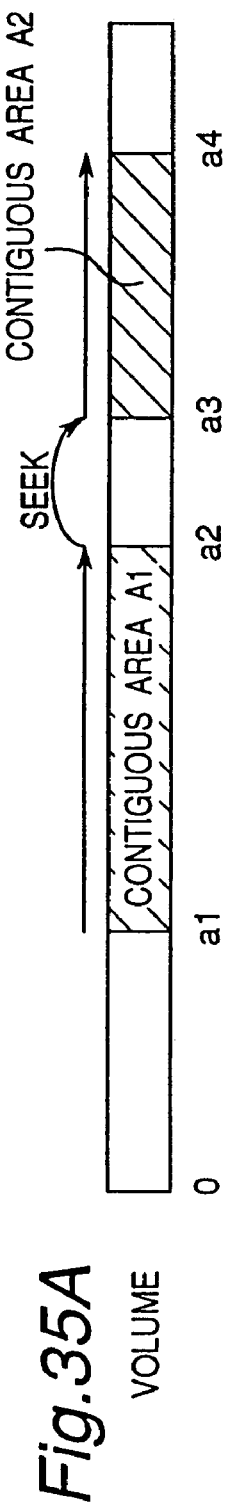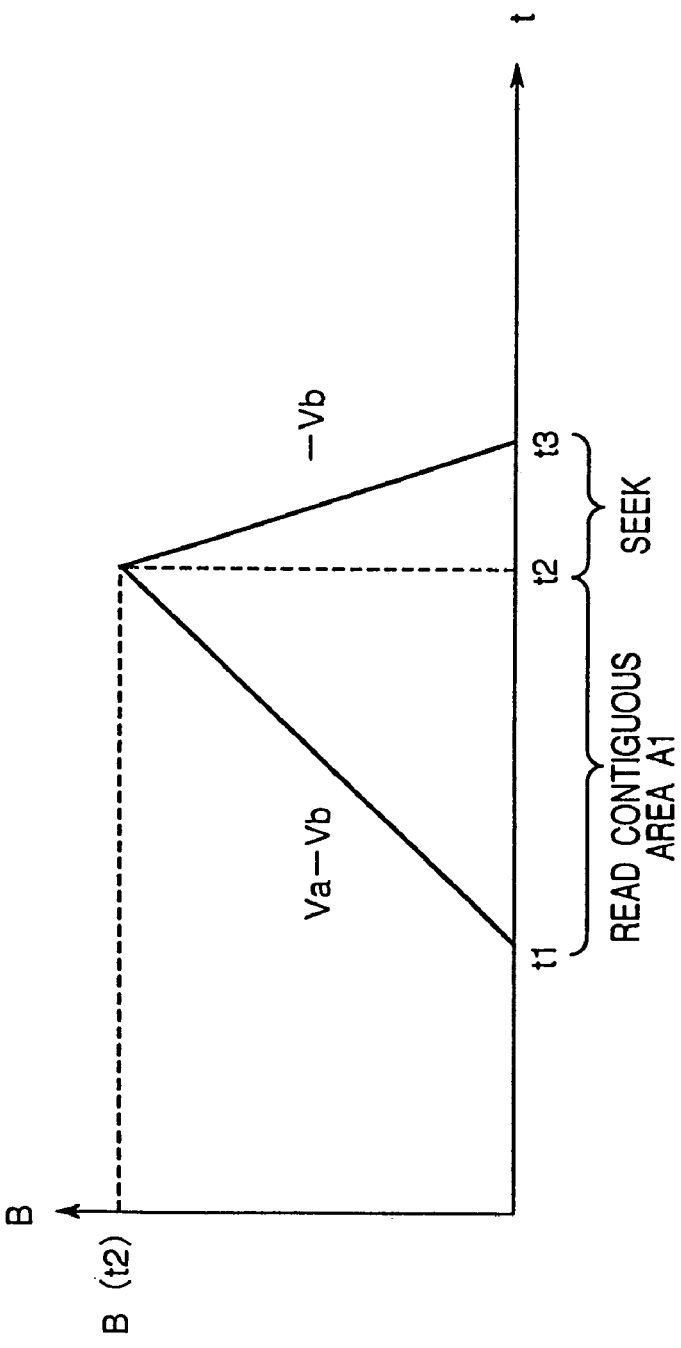

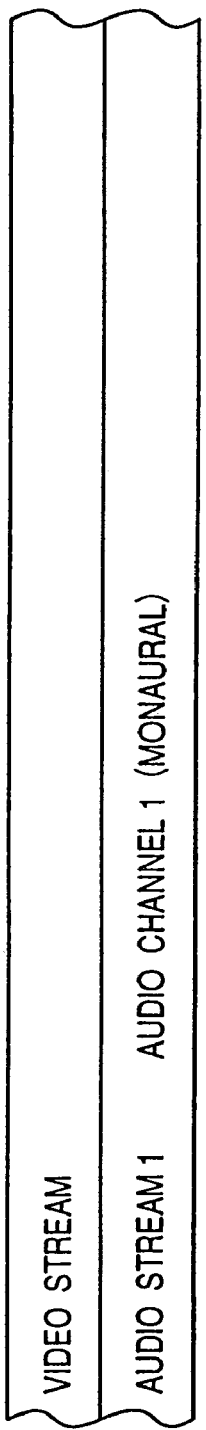
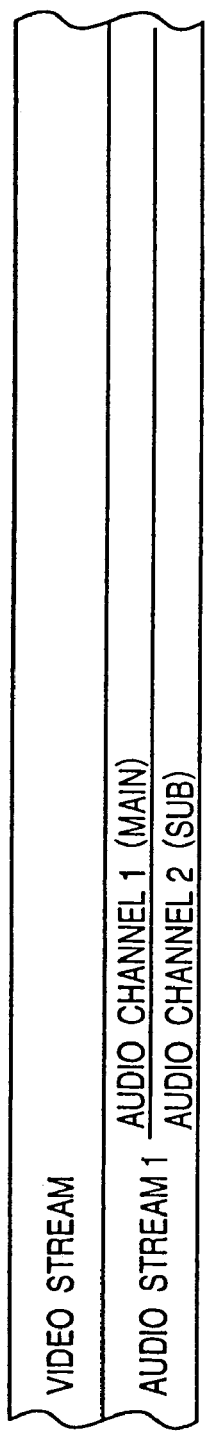
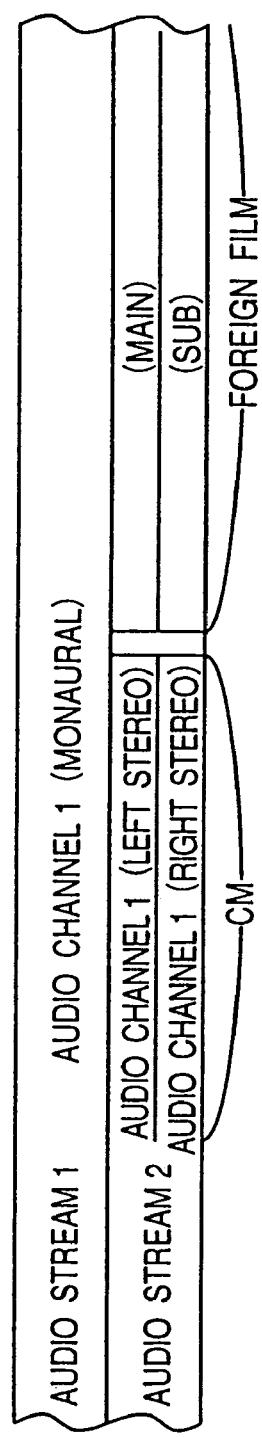

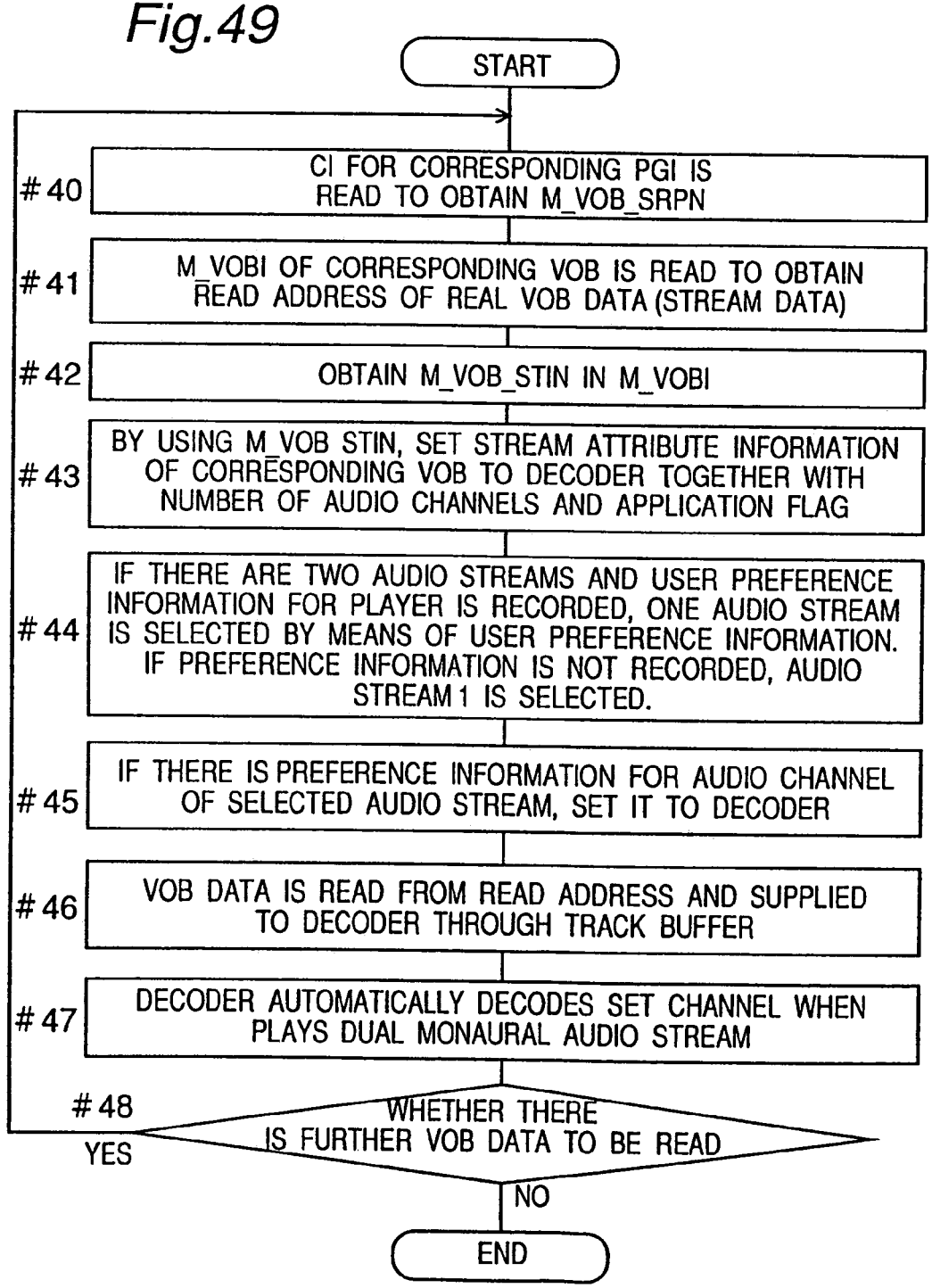

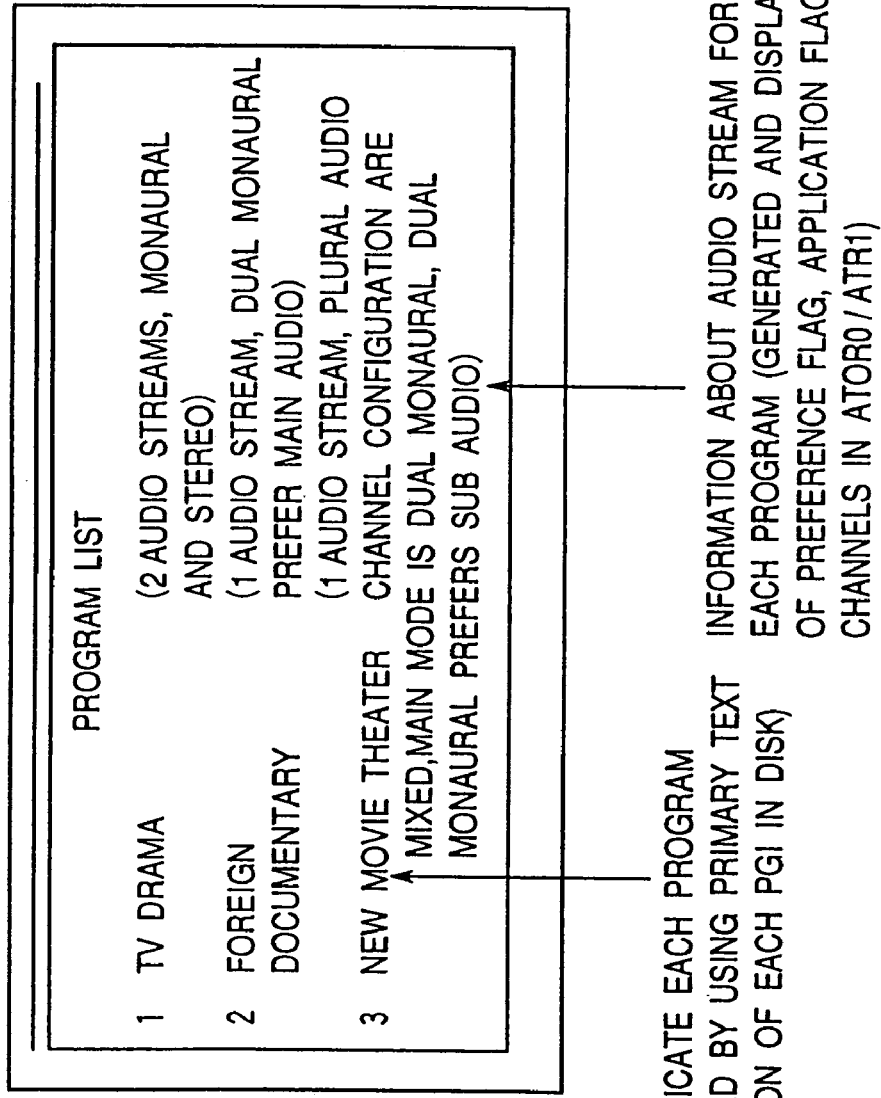

OPTICAL DISC, RECORDING DEVICE AND REPRODUCING DEVICE

This application is a divisional of application Ser. No. 09/678,651, filed Oct. 4, 2000 now U.S. Pat. No. 6,681,077, which is a divisional of application Ser. No. 09/538,294, filed Mar. 30, 2000 now U.S. Pat. No. 6,377,747.

BACKGROUND OF THE INVENTION

1. Field of the Invention

The present invention relates to a readable and writable optical disc, and to a recording device and a reproducing device for the optical disk. More particularly, our invention relates to an optical disc for recording multimedia data including moving picture data, still image data, and audio data, and to a recording device and a reproducing device for this optical disc.

2. Description of the Related Art

Rewritable optical discs have for years had a maximum storage capacity of approximately 650 MB, but this has been changed by the development of phase change type DVD-RAM discs with a capacity of several gigabytes. Combined with the adoption of MPEG, and particularly MPEG-2, standards for encoding digital AV data, DVD-RAM is widely anticipated as a recording and reproducing medium with application in the AV industry as well as the computer industry. More specifically, DVD-RAM media are expected to replace magnetic tape as the storage medium of choice for AV recordings.

A. DVD-RAM

Increases in the storage density of rewritable optical disc media over the last few years has made it possible to use such media for applications ranging from storing computer data and recording audio data to recording image data, including movies.

The signal recording surface of a conventional optical disc is typically formatted with lands and grooves, one of which is used as a guide groove for signal recording and reproducing. The data signal is then recorded using only the land or the groove. With the advent of the land and groove recording method, however, it became possible to record signals to both the land and groove. This development approximately doubled the storage capacity of the disc.

Further development of a zone CLV (constant linear velocity) method simplified and made it easy to implement a CLV recording and reproducing technique, an effective means of further increasing the recording density.

A major topic left for future development is how to use such potentially high capacity optical disc media to record AV data containing image data to achieve new functions and performance far surpassing conventional AV products.

With the introduction of high capacity rewritable optical disc media, optical discs are widely expected to replace conventional tape media for recording and reproducing AV content. The transition from tape to disc recording media is also expected to greatly affect both the performance and functions of AV recording and reproducing products.

One of the greatest benefits of a transition to disc is a significant improvement in random access performance. While random access to tape content is possible, it generally takes on the order of minutes to rewind a full tape. This is several orders slower than the typical seek time of optical disc media, which is on the order of at most several ten milliseconds. Tape is therefore considered, for practical purposes, not to be a random access medium.

The random access capability of optical disc media has also made possible distributed, that is, noncontiguous, recording of AV data, which is not possible with conventional tape.

FIG. 34 is a block diagram of the drive device of a DVD recorder. As shown in FIG. 34, this DVD recorder comprises an optical pickup 11 for reading data from the disc 10, an ECC (error correction code) processor 12, track buffer 13, switch 14 for changing track buffer input/output; encoder 15, and decoder 16. An enlarged view of the disc 17 format is also shown.

As indicated by the disc 17 format, the smallest unit used for recording data to a DVD-RAM disc is the sector, which is 2 KB. Sixteen sectors are combined as one ECC block, to which the ECC processor 12 applies error correction coding.

The track buffer 13 is used for recording AV data at a variable bit rate in order to record AV data to a DVD-RAM disc more efficiently. While the read/write rate (Va) to a DVD-RAM disc is fixed, the bit rate (Vb) of the AV data is variable, based on the complexity of the AV data content (e.g., images if the AV data is video). The track buffer 13 is used to absorb this bit rate difference. This means that the track buffer 13 is unnecessary if the AV data bit rate is also fixed, as it is in the Video CD format.

This track buffer 13 can be even more effectively used by dispersed placement of the AV data on the disc. This is explained with reference to FIG. 35.

FIG. 35($a$) shows the disc address space. If the AV data is recorded divided between contiguous area A1 between addresses a1 and a2, and contiguous area A2 between a3 and a4 as shown in FIG. 35($a$), the AV data can be continuously reproduced from these non-contiguous areas A1 and A2 by supplying data accumulated in the track buffer 13 to the decoder while the optical head seeks from a2 to a3. This is shown in FIG. 35($b$).

Once reading AV data starts from a1 at time t1, it is both input to the track buffer 13 and output from the track buffer 13 with data accumulating in the track buffer at the rate (Va−Vb), that is, the difference between the input rate Va to the track buffer and the output rate Vb from the track buffer. This continues to address a2 at time t2. Assuming that the data volume accumulated to the track buffer at this time is B(t2), data supply to the decoder can continue until the data B(t2) accumulated to the track buffer is depleted at time t3 at which reading resumes from address a3.

In other words, if it is assured that a certain volume of data ([a1, a2]) is read before a seek operation is performed, AV data can be continuously supplied to the decoder while the seek is in progress.

It should be noted that this example considers reading, that is, reproducing, data from DVD-RAM, but the same concept applies for writing or recording data to DVD-RAM.

It will thus be obvious that insofar as a specified amount of data is recorded continuously to DVD-RAM disc, continuous reproduction and recording is possible even if the AV data is noncontiguously recorded to the disc.

B. MPEG

A common AV data format is described next below.

As noted above, AV data is recorded to DVD-RAM media using the MPEG international standard, also known as ISO/IEC 13818.

Even though DVD-RAM discs have a large, plural gigabyte, capacity, this is still not sufficient for recording uncompressed digital AV data of any duration. A way to compress and record AV data is therefore necessary. This need was addressed by worldwide adoption of the MPEG (ISO/IEC 13818) standard for AV data compression. MPEG decoders (compression/decompression ICs) have also been realized with advances in IC devices. This has enabled the DVD recorder to handle MPEG compression and decompression internally.

MPEG signal processing is able to achieve high efficiency data compression chiefly as a result of the following two features.

First is that compression using a time correlation characteristic between frames (known as pictures in MPEG) is used in conjunction with conventional compression using a spatial frequency characteristic for moving picture data compression. Each video sequence of an MPEG video signal stream is divided into one or more groups of pictures, each group of pictures comprising one or more pictures of three different types: I-pictures (intraframe coded pictures), P-pictures (predictive-coded pictures, that is, intracoded with reference to a preceding picture), and B-pictures (bidirectionally predictive-coded pictures, that is, intraframe coded with reference to preceding and following pictures).

FIG. 36 shows the relationship between I, P, and B pictures. As shown in FIG. 36, P-pictures refer to temporally preceding I- or P-pictures in the sequence, while B-pictures refer to the first preceding and following I- or P-pictures. It should also be noted that because B-pictures reference an upcoming I- or P-picture, the display order of the pictures may not match the coding order of the pictures in the compressed data bitstream.

The second feature of MPEG coding is that code size is dynamically allocated by picture unit according to the complexity of the image. An MPEG decoder has an input buffer, and by accumulating data in this decoder buffer a large amount of code can be allocated to complex images that are difficult to compress.

Three types of audio coding are used for the audio portion of a DVD-RAM recording: MPEG audio with data compression, Dolby Digital® (also known as AC-3), and non-compressive linear pulse code modulation (LPCM). Both Dolby Digital® and LPCM are fixed bit rate coding methods, but MPEG audio coding can select from several compression rates on an audio frame basis, although audio compression is not as high as video stream compression.

The resulting compressed video and audio streams are multiplexed to a single stream using a method known as the MPEG system. FIG. 37 shows the organization of an MPEG system stream. As shown in FIG. 37, each 2 KB sector comprises a pack header 41, packet header 42, and payload 43. The MPEG system thus has a hierarchical structure comprising packs and packets. Each packet comprises a packet header 42 and payload 43. AV data is segmented from the beginning into blocks of an appropriate size for storage to the payload 43.

The packet header 42 records information referring to the AV data stored in the associated payload 43. More specifically, the packet header 42 contains a stream ID for identifying the data stored in the associated packet, and a decoding time stamp (DTS) and presentation time stamp (PTS) identifying the decoding time and presentation time of the data contained in the payload in 90 kHz precision. If the decoding and presentation are simultaneous, as in the case of audio data, the DTS can be omitted.

A pack is a unit of plural packets. In DVD-RAM, however, there is one pack for each packet, and each pack therefore comprises a pack header 41 and packet (containing a packet header 42 and payload to 43).

The pack header contains a system clock reference (SCR) expressing with 27 MHz precision the time at which the data contained in this pack is input to the decoder buffer.

An MPEG system stream thus comprised is recorded one pack to a sector (=2048 bytes) on DVD-RAM.

A decoder for decoding the above-noted MPEG system stream is described next below. FIG. 38 is a block diagram of an exemplary decoder model (P_STD) of an MPEG system stream decoder. Shown in FIG. 38 are the system time clock (STC) 51, that is, the internal reference clock for decoder operation; a demultiplexer 52 for decoding (demultiplexing) the system stream; video decoder input buffer (video buffer) 53; video decoder 54; re-ordering buffer 55 for temporarily storing I and P pictures to absorb the difference in the coding (data) sequence and presentation sequence that occurs between B pictures and I and P pictures; a switch 56 for adjusting the output order of the I, P, and B pictures buffered to the re-ordering buffer 55; an audio decoder input buffer (audio buffer) 57; and audio decoder 58.

This MPEG system decoder processes the above-noted MPEG system stream as follows.

When the time indicated by the STC 51 and the SCR written to the pack header match, the pack is input to the demultiplexer 52. The demultiplexer 52 then interprets the stream ID in the packet header, and passes the audio stream and video stream contained in the payload data to the appropriate decoder buffers. The PTS and DTS are also read from the packet header.

When the times indicated by the STC 51 and DTS match, the video decoder 54 reads and decodes the picture data from the video buffer 53. I and P pictures are stored to the re-ordering buffer 55 while B pictures are presented directly to screen. If the picture being decoded by the video decoder 54 is an I or P picture, the switch 56 switches to the re-ordering buffer 55 to output the previous I or P picture from the re-ordering buffer 55; if a B picture is decoded, the switch 56 switches to the video decoder 54.

Similarly to the video decoder 54, the audio decoder 58 reads and decodes one audio frame of data from the audio buffer 57 when the PTS matches the STC 51 (a DTS is not recorded for audio data).

An exemplary method of multiplexing an MPEG system stream is described next with reference to FIG. 39. Note that a sequence of video frames is shown in FIG. 39(a), the change in data storage to the video buffer is shown in FIG. 39(b), a typical MPEG system stream is shown in FIG. 39(c), and an audio signal is shown in FIG. 39(d). Each of FIGS. 39(a) to (d) are shown on a common time base (horizontal axis). The vertical axis in FIG. 39(b) indicates the amount of data stored to the video buffer. The bold line in this graph thus indicates the change over time in the buffered video data volume. The slope of this line is indicative of the video bit rate, and shows that data is input to the video buffer at a constant rate. The decrease in buffered data at regular intervals indicates the progression of data decoding. The intersection of the dotted line extension of the graphed line with the time base (horizontal axis) indicates the time at which video frame transfer to the video buffer begins.

MPEG encoding is described next using by way of example coding a complex image A in the video data stream. As shown in FIG. 39 (b), image A requires a large coding block, and data transfer to the video buffer must therefore begin from a time t1 before the image A decoding time. Note that the time from data input start time t1 to decoding is referred to as vbv_delay below. AV data is thus multiplexed to the position (time) of the shaded video pack.

Unlike video data, audio data does not require dynamic coding size control. It is therefore not necessary for audio data transfer to start at a similarly advanced time before decoding starts, and audio data is thus typically multiplexed only slightly before decoding starts. Video data is thus multiplexed to the MPEG system stream before the audio data.

It should be further noted that data can be accumulated to the buffer for a limited time in the MPEG system. More specifically, the MPEG system standard requires all data other than still image data be output to the decoder from the buffer within one second of being stored to the buffer. This means that there is at most a one second offset between video data and audio data multiplexing (or more precisely, the time required for video frame reordering).

It will also be obvious that while the MPEG system stream is described above with video data preceding the audio, the audio can theoretically precede the video. This type of stream can be purposely generated by using for the video data simple images to which a high compression rate can be applied, and transferring the audio data earlier than required. Even in this case, however, the audio can precede the video by at most one second due to the restrictions imposed by the MPEG standard.

Audio Stream Format and Reproduction

The format of the audio stream and a method for audio stream reproduction are described next below.

As described above, data is recorded and reproduced from a linear recording area in sequential access media such as magnetic tape. A typical method for recording an audio stream to a plurality of tracks on a single tape is described next below with reference to FIG. 41. In this example a maximum of two audio streams, shown as audio stream 1 and audio stream 2, can be recorded for a single video stream. In this example audio stream 1 is a single audio channel, generally known as a monaural audio channel, and audio stream 2 comprises two audio channels, such as a stereo audio signal or two monaural streams enabling a bilingual recording. It is also possible to record only one of these two audio streams (audio stream 1 or audio stream 2) or to record no audio stream. However, reducing the amount of audio recorded cannot be used as a means for increasing the video storage capacity of the tape. In other words, the audio stream recording area, i.e., the audio track space, is reserved exclusively for audio content and cannot be used for any other application even when no audio stream is actually recorded. The user can also select which of the two audio streams and channels to play, and the audio stream or channel selected by the user is reproduced simultaneously with the video.

DVD-RAM and other disc media, however, allow for more flexible audio stream recording and reproduction. The number of audio streams and channels recorded simultaneously with a video stream can be varied for the plurality of audio streams recorded to a disc.

FIG. 42 shows some of the ways in which the audio stream content can be varied with the video stream in a disc media. For example, AV stream 1 in FIG. 42(a) comprises one audio stream for the video stream, and the audio stream in this case has only one channel.

AV stream 2 in FIG. 42(b) similarly comprises one audio stream for the same video stream, but the audio stream in this case comprises two channels, i.e., main and sub audio channels. In this case the audio stream contains two selectively reproducible audio channels, a first audio channel containing the main audio (such as a first language), and a second audio channel containing the auxiliary audio data of the sub channel (such as a second language).

AV stream 3 in FIG. 42(c) comprises two audio streams for the video stream. In this case audio stream 1 is a single monaural channel while audio stream 2 contains two channels. The beginning of this audio stream 2 is recorded in stereo and then switches to dual monaural audio content. More specifically, audio stream 2 in this example comprises at least two of the following three audio content areas: a second (stereo) area containing first and second simultaneously reproduced audio channel data; a first (dual monaural) area containing first and second audio channels of which only one is selected and reproduced; and a third (monaural) area containing only one audio channel.

It will also be obvious that audio content is not limited to these stereo, dual monaural, and monaural types, and this audio stream 2 is simply illustrative of an audio stream containing a mix of different audio types. In the example shown in FIG. 42(c), audio stream 2 contains a stereo and a dual monaural area. Exemplary stereo content might be the commercials in a television broadcast while the dual monaural content contains separate audio streams of a bilingual broadcast in, for example, Japanese and English.

As noted above the relationship between video and audio streams on DVD-RAM and other disc media is flexible with the audio stream configuration being easily adapted according to the application and objective of the plural AV streams recorded to any same disc. It should be noted here that the AV stream configuration shown in FIG. 42 mimics a tape track configuration simply for ease of illustration and understanding. The actual AV stream configuration is a multiplexed bit stream of video stream data and one or more audio streams as shown in the MPEG system stream in FIG. 39(c).

PROBLEM TO BE SOLVED

The object of the present invention is to provide a DVD recorder that solves the following problems hindering obtaining maximum performance from DVD-RAM media, a high capacity rewritable storage medium widely anticipated as the next generation in AV recording media.

As described with reference to FIGS. 42(a) to (c), one or a plurality of audio streams can be freely recorded to DVD-RAM media with each audio stream containing a variable number of channels. The user can tell the number of audio streams and the channel configuration thereof by reproducing the AV stream to which this audio stream is recorded, but cannot know this information by simply loading the disc into the DVD-RAM disc player.

An object of the present invention is therefore to provide a disc format whereby the user can know the audio stream configuration of a recorded AV stream before actually reproducing the AV stream.

Our invention further makes it possible for the user to know 1o the audio stream configuration for each of one or a plurality of AV streams recorded to a DVD-RAM disc when the disc is loaded into a DVD-RAM disc player.

The greatest problem confronted by enabling a DVD recorder to record a flexible correlation between video streams and audio streams so that different audio stream configurations can be achieved for each AV stream on the disc is how to manage the data internally and how to present the data to the user.

The internal data management technique must be able to manage a variety of audio stream configurations while also achieving recording, reproducing, and editing functions without introducing incompatibilities and content mismatches.

A diverse range of audio stream configurations enables finite recording space (capacity) to be used effectively, and enables recording various AV streams according to particular user objectives, but at the same time can introduce confusion. In other words, when a user wants to play a particular AV stream, the user cannot select the appropriate audio stream and audio channel(s) if the user does not know what audio stream configuration was recorded for the desired AV stream. For example, if both Japanese and English audio streams are recorded and both are selectable so that the user can listen in either language, the AV stream could be reproduced in the language not desired by the user as a result of how the disc player is set up. Depending upon the circumstances it is also possible for the user to manually reselect the desired audio stream when the user realizes that the undesired audio stream is being reproduced.

There is therefore a need for a method of correctly selecting the desired audio stream and audio channel at the same time the desired AV stream is selected for reproduction.

It is therefore an object of our invention to provide a rewritable disc, such as a DVD-RAM disc, formatted such that information about the audio stream and audio channel configuration can be appropriately presented to the user using management information recorded to the disc when a plurality of audio stream configurations is recorded for one video stream, and an audio stream to be reproduced can be automatically selected according to selection information defined by the user.

SUMMARY OF THE INVENTION

To achieve the above object, our invention relates to an optical disc for storing an AV stream containing a video stream and at least one audio stream, and management information for managing the AV stream. More particularly, our invention provides such an optical disc in which the audio stream recorded to the optical disc comprises an audio channel area containing first and second audio channels, one of which is selectively reproduced. In addition, the management information stores preference information indicative of whether the first audio channel data or second audio channel data is preferentially reproduced when reproducing the audio channel area.

Further preferably, the audio stream contains at least two of the following areas: a first area containing first audio channel data and second audio channel data, one of which is selectively reproduced; a second area containing simultaneously reproduced first audio channel data and second audio channel data; and a third area containing data for one audio channel. In this case, the management information additionally contains application information indicating that two or more different audio stream areas are contained in one audio stream.

Our invention further provides a recording device for recording to an optical disc an AV stream containing a video stream and at least one audio stream, and management information for managing the AV stream. This recording device has an encoder (7804) for encoding an audio stream having an area containing first audio channel data and second audio channel data, one of which is selectively reproduced; a controller (7802) for generating management information containing preference information indicating whether the first audio channel data or second audio channel data is to be preferentially reproduced when the audio channel area is reproduced; and drive means (7807, 7808) for recording the encoded audio stream and management information to a data area of the optical disc.

Further preferably, the encoder further encodes an audio stream containing at least two of the following areas: a first area containing first audio channel data and second audio channel data, one of which is selectively reproduced; a second area containing simultaneously reproduced first audio channel data and second audio channel data; and a third area containing data for one audio channel. The controller in this case generates management information containing application information indicating that two or more different audio stream areas are contained in one audio stream.

Our invention also provides a playback device for reproducing an AV stream containing a video stream and at least one audio stream, and management information for managing the AV stream, from an optical disc. This playback device has reading means (7807, 7808) for reading management information from a data area of the optical disc; extraction means (7802, Step #26) for extracting preference information contained in the management information; and a decoder (7806) for selecting and decoding audio channel data indicated by the preference information. The preference information indicates whether the first audio channel data or second audio channel data is to be preferentially reproduced when reproducing the area containing the first audio channel data or second audio channel data of which one is selectively reproduced.

Further preferably, this playback device additionally has an output means (7805) for displaying the preferred audio channel determined from the preference information.

Yet further preferably, the extraction means of this playback device also extracts application information indicating two or more areas of different type are mixed in a single audio stream; and the output means displays information indicating that a mixture of audio types is recorded to the AV stream.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 7 shows the VERN and TM_ZONE format;

FIG. 9 shows the PL_TY and PL_CREATE format;

FIG. 10 shows the PTM format;

FIG. 11 shows the S_VOB_ENTN format;

FIG. 13 shows the V_ATR and A_ATR format;

FIG. 14 shows the SP_ATR and SP_PLT format for movies;

FIG. 17 shows the VOB_TY format;

FIG. 19 shows the VOBU_ENT format;

FIG. 21 shows the V_ATR and OA_ATRS_AA_STI format;

FIG. 22 shows the SP_ATR and SP_PLT format for still images;

FIG. 24 shows the structure of the S_VOB_ENT block;

FIG. 25 shows the S_VOB_ENT_TY format;

FIG. 29 shows the PG_TY format;

FIG. 31 shows the C_TY format;

FIG. 32 shows the structure of the C_EPI block;

FIG. 33 shows the EP_TY1 format;

FIG. 34 is a block diagram of a DVD recorder drive;

FIGS. 35(a) shows the volume address space of a disc, and (b) shows the change in data accumulation in the track buffer;

FIG. 42 is used to describe audio stream configurations in an exemplary AV stream;

FIG. 49 is a flow chart of an operation for reproducing a program recorded to a disc inserted to the disc player; and FIG. 50 shows an exemplary program list generated from a disc inserted to the disc player and presented for the user.

DESCRIPTION OF THE PREFERRED EMBODIMENTS

A DVD recorder and DVD-RAM disc are described below as a preferred embodiment of the present invention with reference to the accompanying figures.

Logical Structure of DVD-RAM

Figure 1:
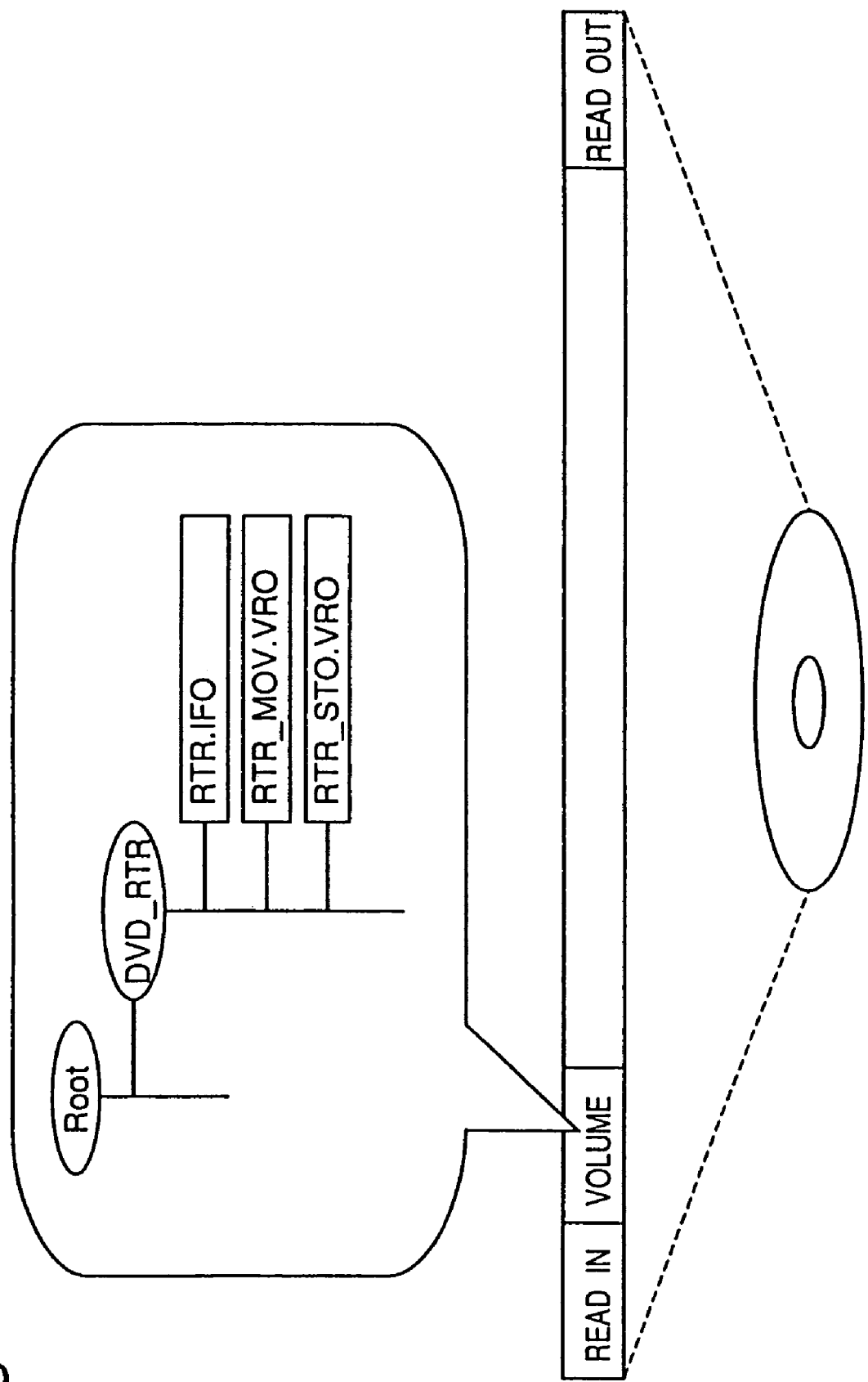
FIG. 1 shows the logical structure of a disc according to a preferred embodiment of the present invention.

The logical structure of a DVD-RAM disc is described first below with reference to FIG. 1. FIG. 1 shows the physical sector address area of the disc, and the structure whereby data is recorded to the disc as part of a file system.

The physical sector address area of the disc starts with a lead-in area to which a reference signal for servo stabilization, and an ID signal for differentiating DVD-RAM media from other media, are recorded. The user data area follows the lead-in area. Logically valid data is recorded to the user data area. A lead-out area ends the physical sector address area; a reference signal is also recorded here.

File system management information, called volume information, is recorded at the beginning of the user data area. The file system is not directly related to the present invention, and description thereof is thus omitted below. It should be noted, however, that by using a file system, data recorded to the disc can be managed as files and a directory to the files as shown in FIG. 1.

All data handled by the DVD recorder is filed under the DVD_RTR directory directly below the root directory as shown in FIG. 1.

Files handled by a DVD recorder can be grouped into two broad categories: a management information file (RTR.IFO file) and one or more AV files (RTR_MOV.VRO file, RTR_STO.VRO file).

AV files are recorded as an RTR_MOV.VRO file recording moving picture content (referred to as video below), or an RTR_STO.VRO file recording still image data and simultaneously recorded audio data.

Figure 2:
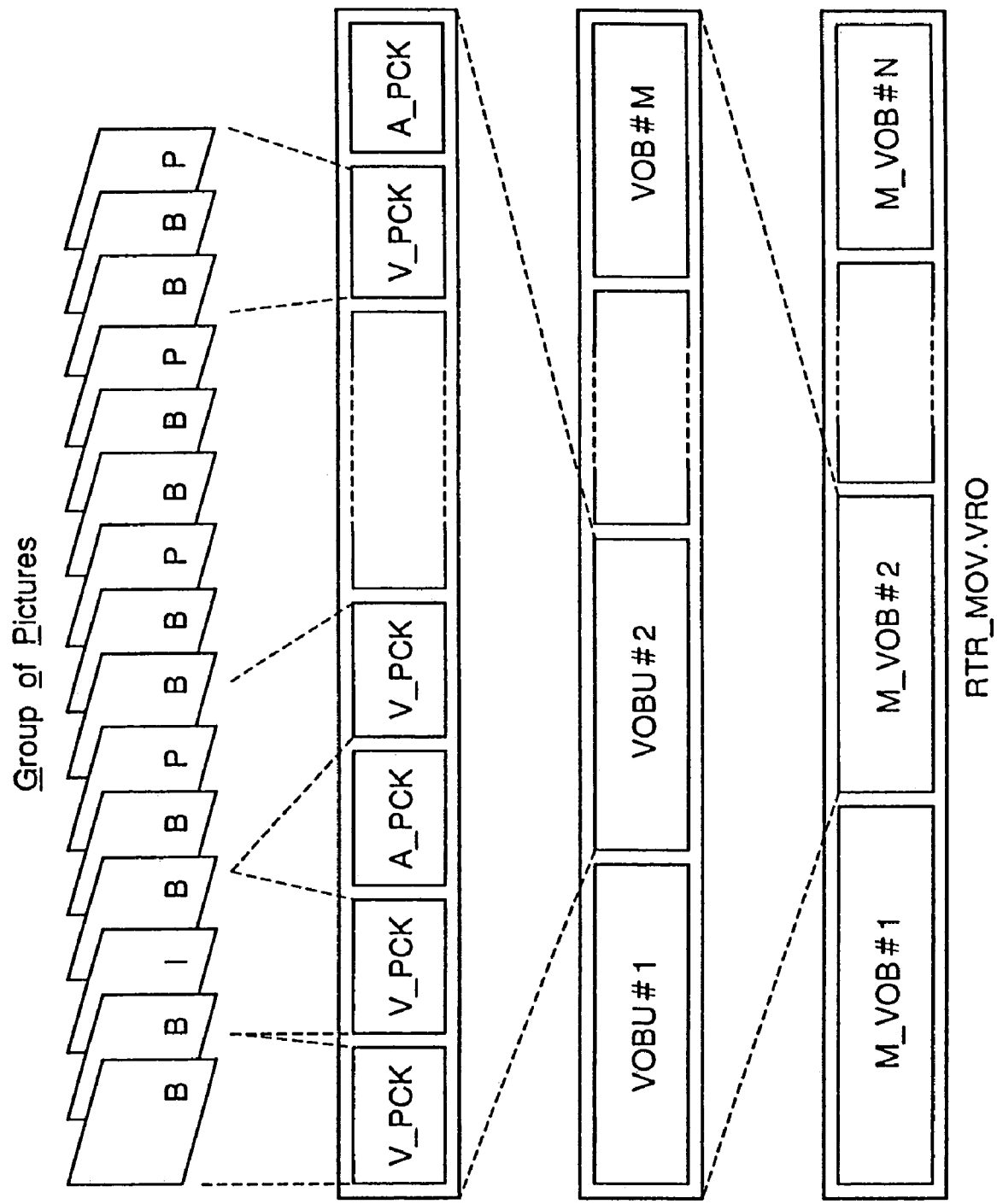
FIG. 2 shows the internal structure of an AV file for movies.

FIG. 2 shows the file structure of an RTR_MOV.VRO file recording video content. As shown in FIG. 2, MPEG program streams (M_VOB (Movie Video Object)) are arranged in recording sequence in the RTR_MOV.VRO file.

Each program stream (M_VOB) is built from a plurality of Video Object Units (VOBU), each with a video reproduction time of 0.4 sec. to 1.0 sec.

Each VOBU comprises a number of video packs (V_PCK), audio packs (A_PCK), and subpicture packs (SP_PCK); each pack is 2 KB.

The video data in each VOBU further comprises one or more Group of Pictures (GOP). The GOP is the decoding unit for MPEG video, starts with an I-picture, and contains plural P- or B-pictures.

Figure 3:
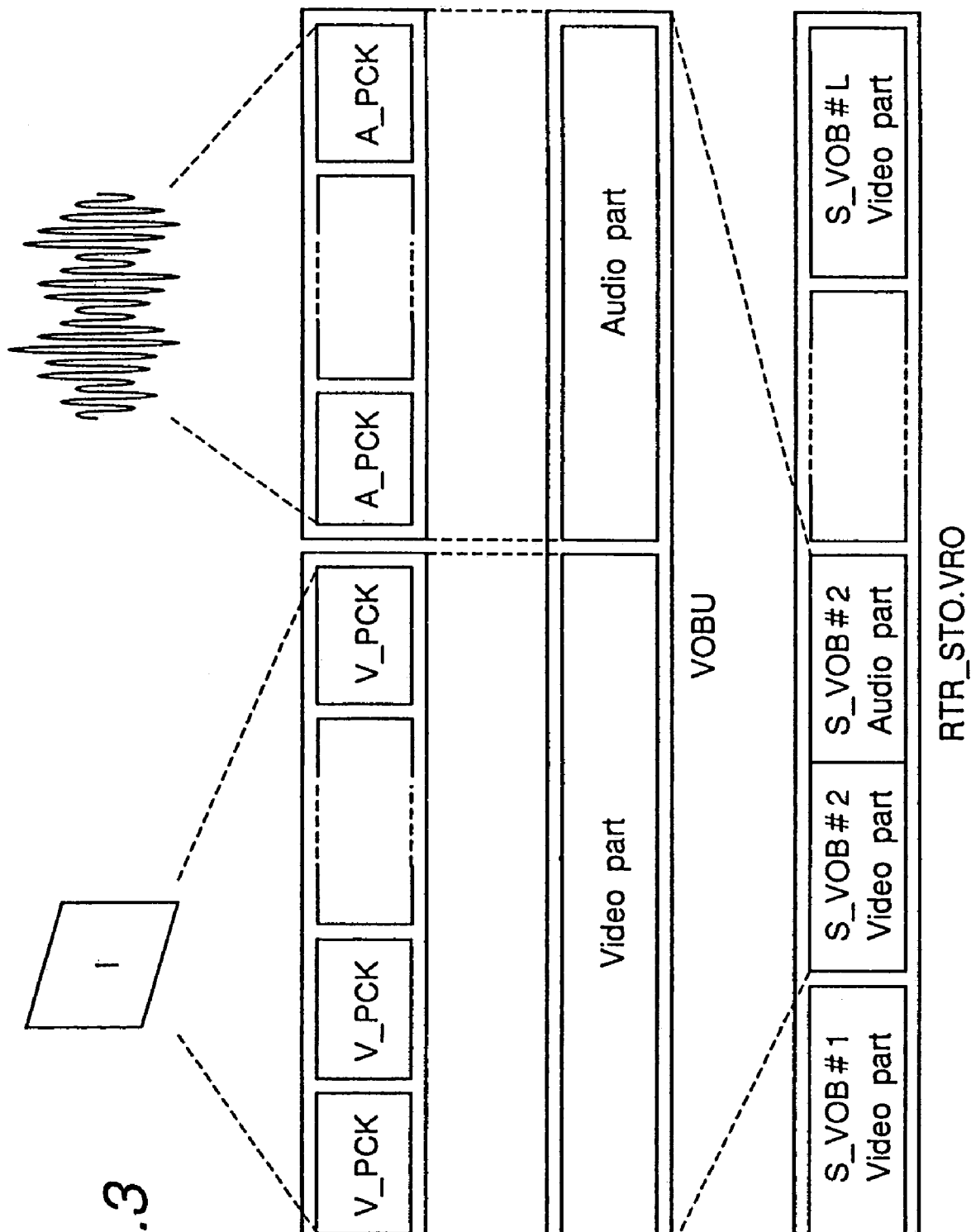
FIG. 3 shows the internal structure of an AV file for still images.

FIG. 3 shows the structure of an RTR_STO.VRO file for recording still images and audio data. As shown in FIG. 3, an RTR_STO.VRO file contains S_VOB (Still Picture Video Objects), the MPEG program stream for still images, arranged in recording sequence.

The greatest difference between an S_VOB and M_VOB is that an S_VOB records still image data instead of moving picture data, and the still image data (video part) is followed by the audio data (audio part) instead of multiplexing the video and audio.

An S_VOB also contains one VOBU, which comprises a V_PCK, A PCK, and SP_PCK.

AV Data and Management Information

Figure 4:
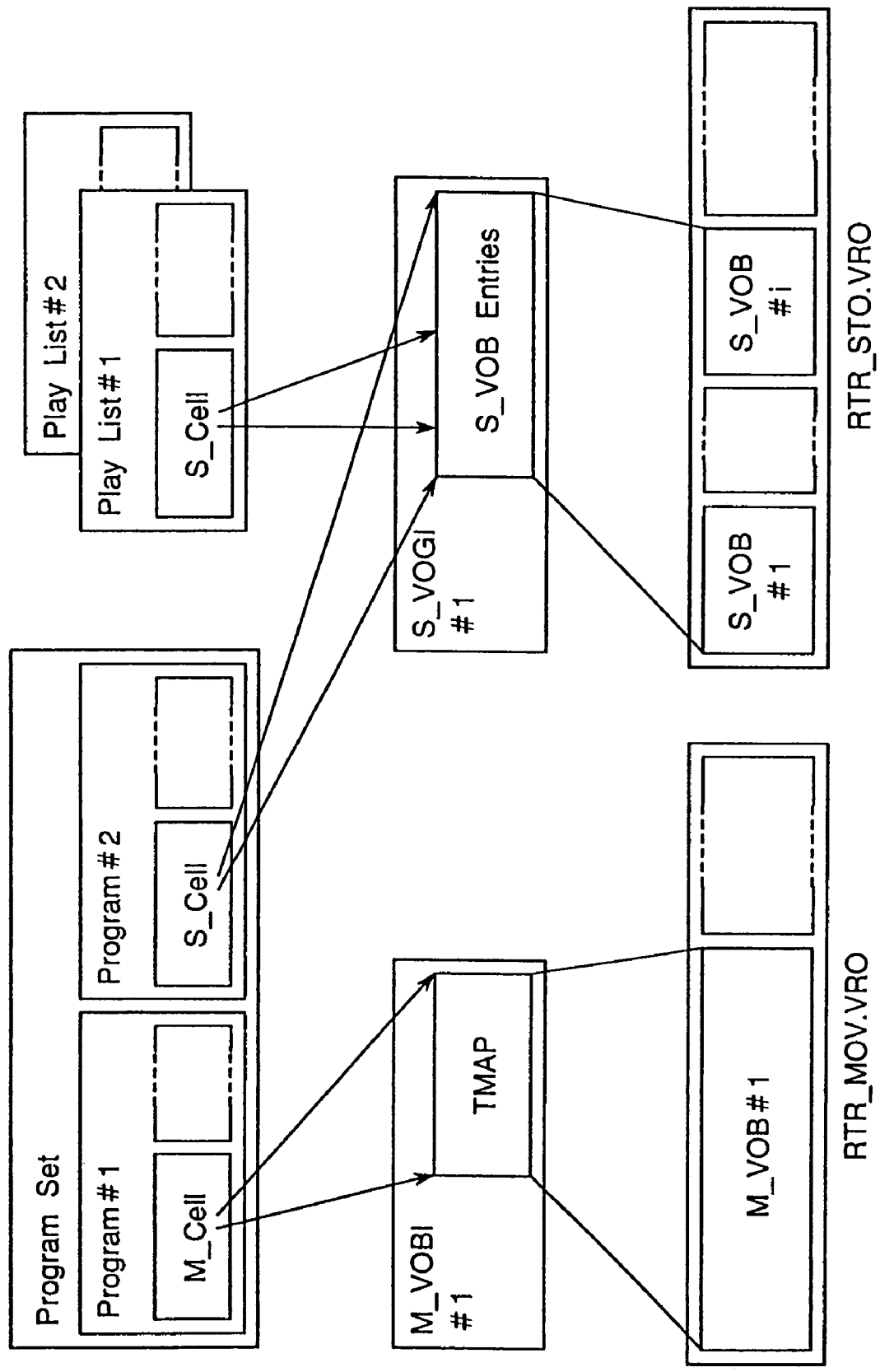
FIG. 4 shows the relationship between AV data and management information.

The relationship between M_VOB, S_VOB, and management information is described next below with reference to FIG. 4.

As described above, there are two types of AV data, M_VOB and S_VOB. Management information M_VOBI for each M_VOB is stored for each M_VOB where the M_VOBI records attributes of the corresponding M_VOB. Individually managing S_VOBs, however, would greatly increase the amount of management information. Management information S_VOGI is therefore used to manage a group S_VOG containing plural S_VOB units. This S_VOGI records attributes for the corresponding S_VOB group.

What is important to note here is that MPEG stream data does not have a linear correlation between time and data size. As noted above, the MPEG system stream is compressed using temporal correlation characteristics and variable length coding techniques (including variable is bit rate coding) in order to achieve high compression efficiency. As a result there is not necessarily a direct correlation between time and data size (address).

Therefore, an M_VOBI also contains a filter (TMAP) for converting time and address information, and an S_VOGI also contains a filter (S_VOB Entries) for converting a still image number in an S_VOG group and address.

Management information for the reproduction sequence is described next below.

The reproduction sequence is defined as a program chain (PGC) or sequence of cells describing all or part of a range of M_VOB or S_VOG blocks.

The reproduction sequence can be either of two types: an original PGC referring to all AV data on the disc, or a user-defined PGC defining a user-selected reproduction sequence of AV data on the disc. Note that a plurality of-user-defined PGC can be recorded.

The original PGC is also called a Program Set having a Program layer logically bundling a plurality of cells.

A user-defined PGC is also called a Play List. Unlike an original PGC, a Play List does not have a Program layer.

Management Information File

The content of the management information file RTR.IFO is described next below with reference to FIG. 5 to FIG. 33.

RTR_VMG (FIG. 5)

The VR_MANGR.IFO file contains real-time recording video management information RTR_VMG. RTR_VMG comprises seven tables: RTR_VMGI, M_AVFIT, S_AVFIT, ORG_PGCI, UD_PGCIT, TXTDT_MG, and MNFIT.

These seven tables are described in detail next below.

RTR_VMGI (FIG. 6)

Real-time recording video management information RTR_VMGI includes video management information table VMGI_MAT and play list search pointer table PL_SRPT.

VMGI_MAT (FIG. 6)

The video management information management table VMGI_MAT stores the following information relating to the entire disc The reproducing device and recording device, referred to as simply disc player and recorder, respectively, below, first read this VMGI_MAT to detect the overall structure of the disc.

VMG_ID (video management identifier)

Stores the identifier DVD_RTR_VMG0 identifying the disc as storing video recording data.

RTR_VMG_EA (RTR_VMG end address)

Stores the RTR_VMG end address.

VMGI_EA (VMGI end address)

Stores the VMGI end address.

VERN (version number)

Records the version number of the recording format of the stored video recording data according to the format shown in FIG. 7.

TM_ZONE (time zone)

Records the time zone used for all time information recorded to the disc. As shown in FIG. 7, the TM_ZONE stores a time zone stamp TZ_TY indicating whether time information is based on Greenwich Mean Time or a regional time standard (such as Eastern Standard Time (EST) or Japan Standard Time (JST)), and a time zone offset TZ_OFFSET recording the time difference to Greenwich Mean Time.

STILL_TM (still time)

Stores the still time used for presenting still images without sound.

CHRS (character set code for primary text display)

Defines the character set code to use for primary text displays (described below).

M_AVFIT_SA (M_AVFIT start address)

Stores the start address of the movie AV file information table M_AVFIT. This start address is used in the seek operation for accessing the M_AVFIT table.

S_AVFIT SA (S_AVFIT start address)

Stores the start address of the still image AV file information table S_AVFIT. This start address is used in the seek operation for accessing the S_AVFIT table.

ORG_PGCI_SA (ORG_PGCI start address)

Stores the start address of the original PGC information. This start address is used in the seek operation for accessing the original PGC.

UD_PGCIT_SA (UD_PGCIT start address)

Stores the start address of the user-defined PGC information table. This start address is used in the seek operation for accessing the user-defined PGC information table.

TXTDT_MG_SA (TXTDT_MG start address)

Stores the start address of the text data management information TXTDT_MG. This start address is used in the seek operation for accessing the text data management information TXTDT_MG.

MNFIT_SA (MNFIT start address)

Stores the start address of the management file information table MNFIT. This address is used in the seek operation for accessing the MNFIT table.

Figure 8:
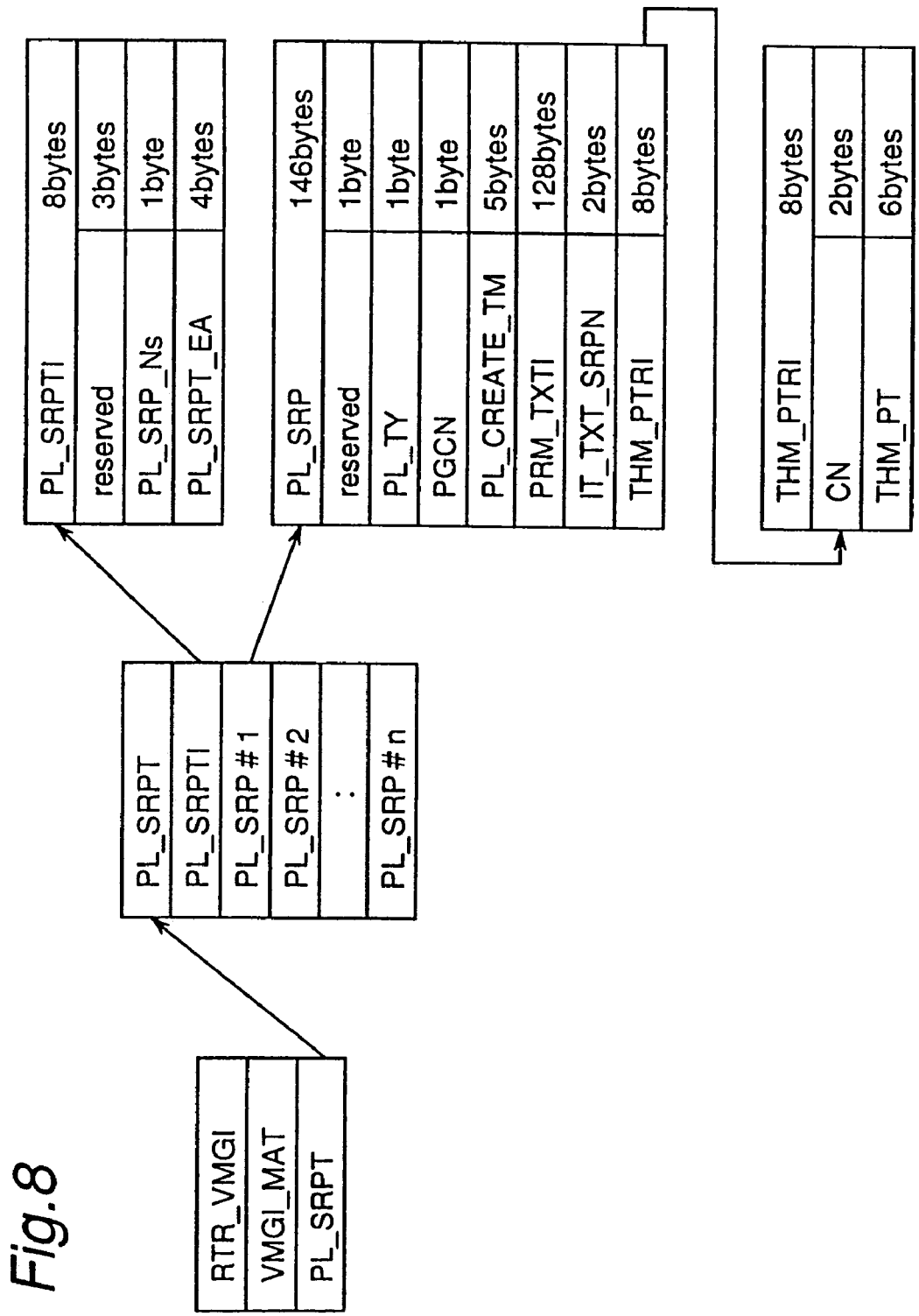
FIG. 8 shows the structure of the PL_SRP block.

PL_SRPT (play list search pointer table) (FIG. 8)

The play list search pointer table PL_SRPT records play list search pointer table information PL_SRPTI and n play list search pointers PL_SRP.

PL_SRPTI (play list search pointer table information) (FIG. 8)

The play list search pointer table information PL_SRPTI records the following information for accessing a play list search pointer PL_SRP.

PL_SRP_Ns (number of play list search pointers)

Stores the number of play list search pointers PL_SRP.

PL_SRPT_EA (PL_SRPT end address)

Stores the end address of this play list search pointer table PL_SRPT.

PL_SRP (play list search pointer) (FIG. 8)

Records the following information for accessing the actual play list data, that is, the user-defined PGC.

PL_TY (play list type)
Stores one of the following values for identifying the play list type using the format shown in FIG. 9.
 0000b: video only
 0001b: still images only
 0010b: both video and still images
 0011b: audio only
PGCN (PGC number)
Stores the PGC number for the associated play list. The PGC number is the recording sequence of PGC information in the UD_PGCIT described below.
PL_CREATE_TM (play list Creation date/time)
Stores the date and time the play list was created according to the format shown in FIG. 9.
PRM_TXTI (primary text information)
Stores text information indicative of play list content. For example, if the play list is a television program, PRM_TXTI could record the name of the show. PRM_TXTI includes an ASCII code field, and a field for the character code set defined by the above-noted CHRS.
IT_TXT_SRPN (IT_TXT_SRP number)
If information indicative of the play list content is recorded as the optional IT_TXT block in addition to the above-noted primary text, the IT_TXT_SRP number is stored as a link to the IT_TXT recorded in TXTDT_MG. This IT_TXT_SRP number is the recording sequence in TXTDT_MG, described below.
THM_PTRI (thumbnail pointer information)
Stores thumbnail image information for the play list.
THM_PTRI (FIG. 8)
THM_PTRI stores the following information indicating a thumbnail image location.
CN (cell number)
Stores the cell number containing the thumbnail image. The cell number is the recording sequence of the cell information in the UD_PGCI for this play list.
THM_PT (thumbnail image pointer)
Stores the presentation time of the video frame used as the thumbnail image according to the PTM (presentation time) describing format as shown in FIG. 10 if the cell indicated by CN is a video cell. PTM is written according to the reference time of the time stamp written in the MPEG program stream.
Stores the still image VOB entry number of the still image used as the thumbnail image according to the S_VOB_ENTN describing format as shown in FIG. 11 if the cell indicated by CN is a still image cell.
M_AVFIT (FIG. 12)
The movie AV file information table M_AVFIT stores management information for the movie AV file RTR_MOV.VRO, and comprises M_AVFITI, M_VOB_STI, and M_AVFI.
M_AVFITI (movie AV file information table information) (FIG. 12)
Stores the following information for accessing M_VOB_STI and M_AVFI.
M_AVFI_Ns (Movie AV file information number)
Indicates the number of following AVFI information fields. If 0, no AVFI is present; if 1, an AVFI is present. AVFI presence corresponds to the presence of movie AV file RTR_MOV.VRO.
M_VOB_STI_Ns (M_VOB_STI number)
Indicates the number of following M_VOB_STI fields.
M_AVFIT EA (M_AVFIT end address)
Stores the M_AVFIT end address.

M_VOB_STI (Movie VOB Stream Information) (FIG. 12)
Stores the following as movie VOB stream information.
V_ATR (video attributes)
Stores the following video attributes according to the format as shown in FIG. 13.
 Video compression mode
 Stores one of the following values indicating the video compression mode.
 00b: MPEG_1
 01b: MPEG_2
 TV system
 Stores one of the following values indicating the television system.
 00b: 525/60 (NTSC)
 01b: 625/50 (PAL)
 Aspect ratio
 Stores one of the following values indicating the aspect ratio.
 00b: 4×3
 01b: 16×9
  line21_switch_1
  Stores one of the following values indicating whether closed caption data for field 1 is contained in the video stream.
  1b: recorded
  0b: not recorded
  line21_switch_2
  Stores one of the following values indicating whether closed caption data for field 2 is contained in the video stream.
  1b: recorded
  0b: not recorded
  Video resolution
  Stores one of the following values indicating the video resolution.
  000b: 720×480 (NTSC), 720×576 (PAL)
  001b: 702×480 (NTSC), 702×576 (PAL)
  010b: 352×480 (NTSC), 352×576 (PAL)
  011b: 352×240 (NTSC), 352×288 (PAL)
  100b: 544×480 (NTSC), 544×576 (PAL)
  101b: 480×480 (NTSC), 480×576 (PAL)
AST_Ns (audio stream number)
Stores the number of audio streams recorded to the corresponding VOB.
SPST_Ns (still picture stream number)
Stores the number of still picture streams recorded to the corresponding VOB.
A_ATR0 (audio stream 0 attributes)
Stores the following attributes for the audio recorded to audio stream 0 using the format as shown in FIG. 13.
 Audio coding mode
 Stores one of the following values indicating the audio compression method.
 000b: Dolby AC-3
 001b: MPEG audio without an extension stream
 010b: MPEG audio with an extension stream
 011b: linear PCM
 Preference flag
 Stores one of the following values indicating user preference information for the audio channel.
 00b: not applicable
 01b: audio channel 1
 10b: audio channel 2
For example, if audio channel 1 is in Japanese, audio channel 2 is in English, and the user prefers to listen in English, this preference flag is set to 10b by the user.

Application Flag

Stores one of the following values indicating the audio application.

00b: not applicable
01b: plural audio channel configurations are mixed
10b: enhancement channel included Note that a value of 01b indicating plural audio channel configurations are mixed means, for example, that two or more audio streams of monaural, stereo, or dual audio (such as in both Japanese and English) are recorded to the AV stream on separate time bases.

The enhancement channel is an enhanced audio channel for the visually impaired.

Quantization/DRC

Stores one of the following values for identifying whether dynamic range control (DRC) information is present.

00b: DRC not contained in MPEG stream
01b: DRC contained in MPEG stream

If LPCM is used, the following value is stored to identify the quantization level.

00b: 16 bit fs

The following value is stored to identify the sampling frequency.

00b: 48 kHz

Number of Audio channels

Stores one of the following values indicating the number of audio channels.

0000b: 1 channel (monaural)
0001b: 2 channel (stereo)
0010b: 3 channel
0011b: 4 channel
0100b: 5 channel
0101b: 6 channel
0110b: 7 channel
0111b: 8 channel
1001b: 2 channel (dual monaural)

Dual monaural refers, for example, to a bilingual recording with main (e.g., Japanese) and sub (e.g., English) channels, both of which are monaural.

Bitrate

Stores one of the following values indicating the bitrate.

0000 0001b: 64 kbps
0000 0010b: 89 kbps
0000 0011b: 96 kbps
0000 0100b: 112 kbps
0000 0101b: 128 kbps
0000 0110b: 160 kbps
0000 0110b: 192 kbps
0000 1000b: 224 kbps
0000 1001b: 256 kbps
0000 1010b: 320 kbps
0000 1011b: 384 kbps
0000 1100b: 448 kbps
0000 1101b: 768 kbps
0000 1110b: 1536 kbps What is important here is that if the corresponding audio stream is an MPEG audio stream with an extension stream, only the bitrate of the base stream, not including the extension stream, is recorded. This is because compression using a VLC technique is used for the extension stream, and the extension stream therefore cannot be defined using a fixed bitrate as above.

A_ATR1 (audio stream 1 attributes)

Stores the following attributes of audio stream 1 using the format as shown in FIG. 13. Note that these attributes are defined using the same fields used with A_ATR0 and described above, and further description is thus omitted here.

Figure 43:
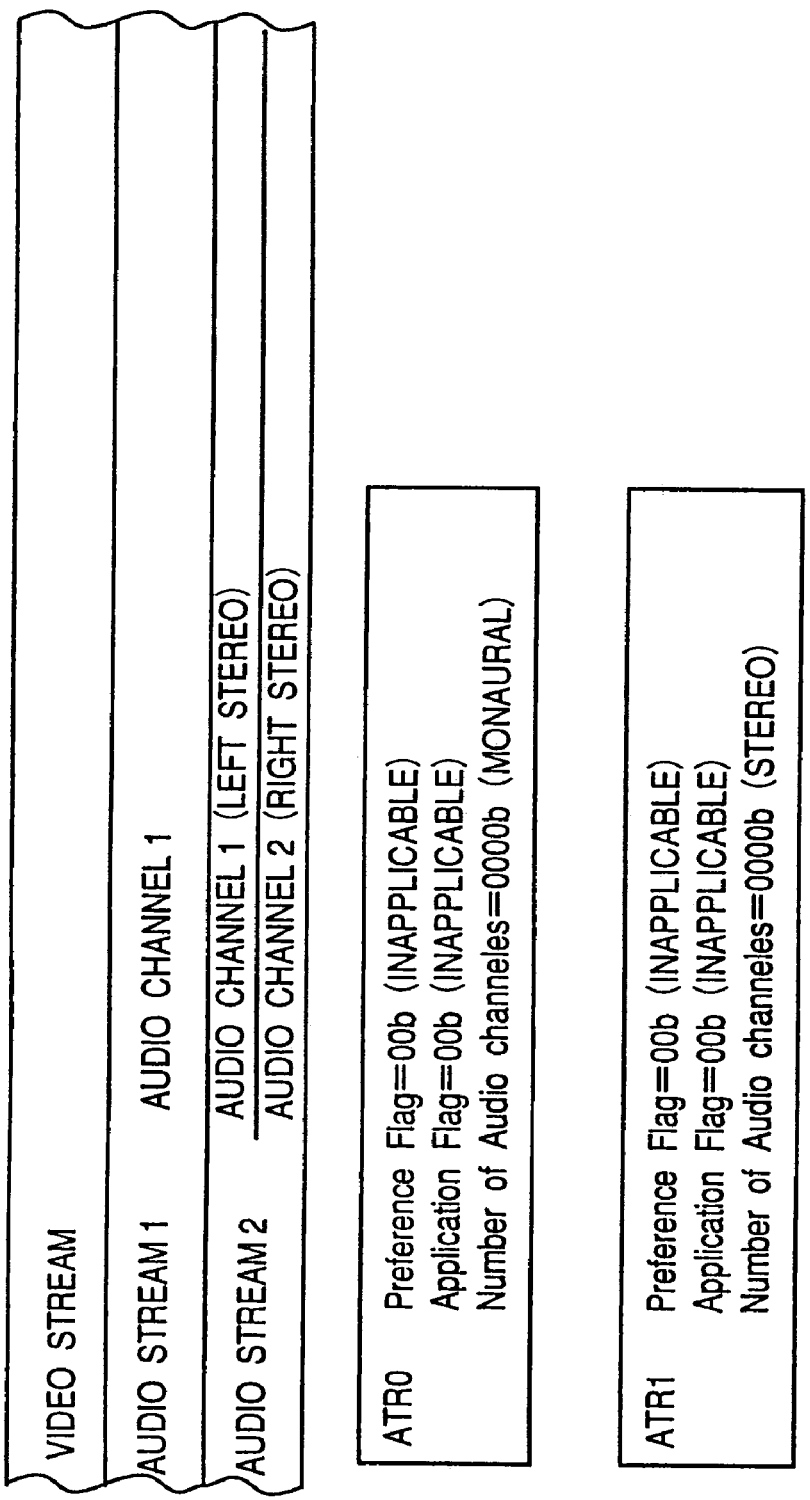
FIG. 43 shows the relationship between management information stored to disc and a first exemplary audio stream configuration.

As shown in FIG. 43, if there are two audio streams (audio stream 1 and audio stream 2) for a single AV stream, A_ATR0 is used for audio stream 1 management information, and A_ATR1 is used for audio stream 2 management information. Because A_ATR0 and A_ATR1 are identical in structure, A_ATR0 shown on the bottom in FIG. 13 is also applicable to A_ATR1.

One possible application for two audio streams is to broadcast a baseball game, for example, with announcer commentary for one team broadcast in stereo on audio stream 1, and the announcer commentary for the other team broadcast in stereo on audio stream 2.

Figure 44:
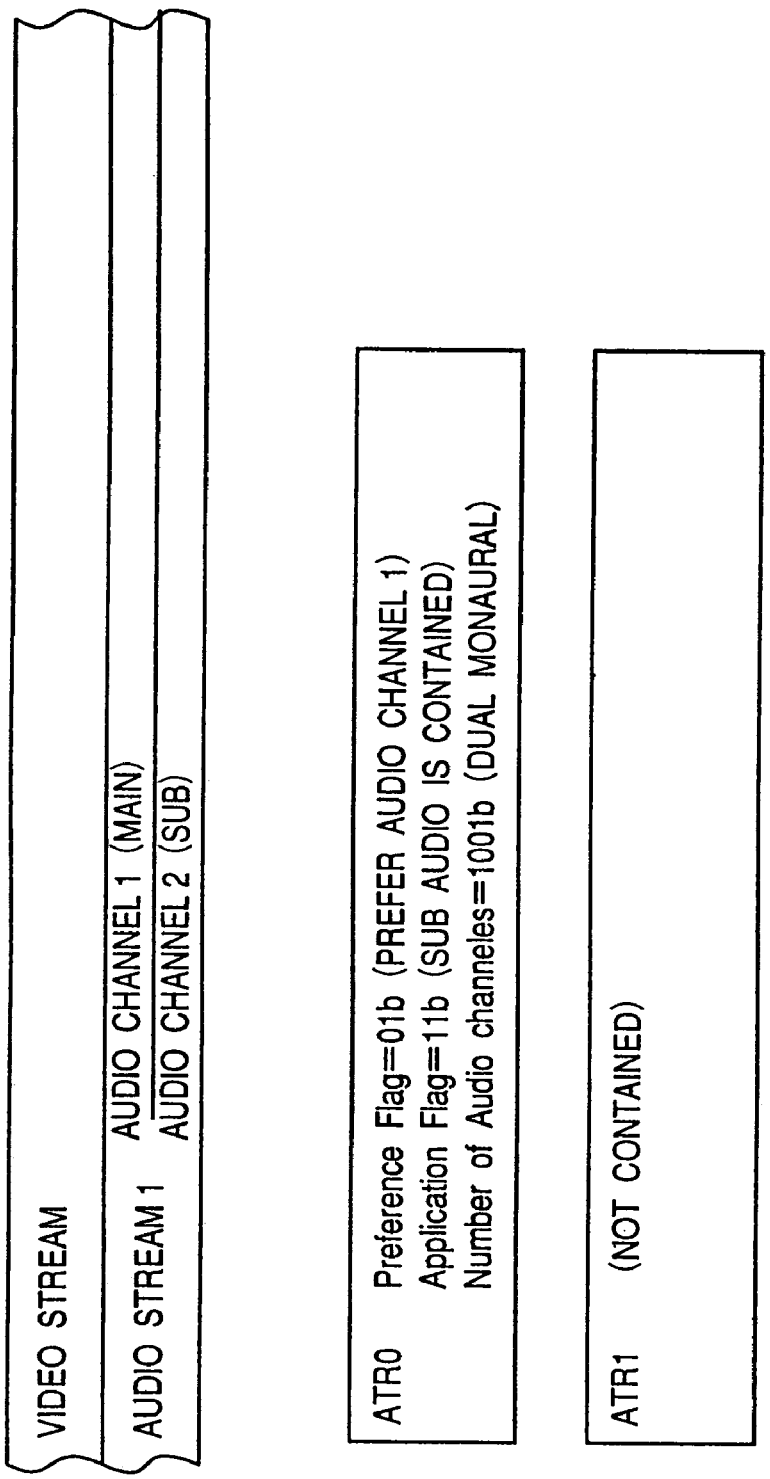
FIG. 44 shows the relationship between management information stored to disc and a second exemplary audio stream configuration.

If there is only one audio stream, that is, audio stream 1 in this case as shown in FIG. 44, A_ATR0 is used for the audio stream 1 management information while A_ATR1 is left blank or as initialized.

Figure 45:
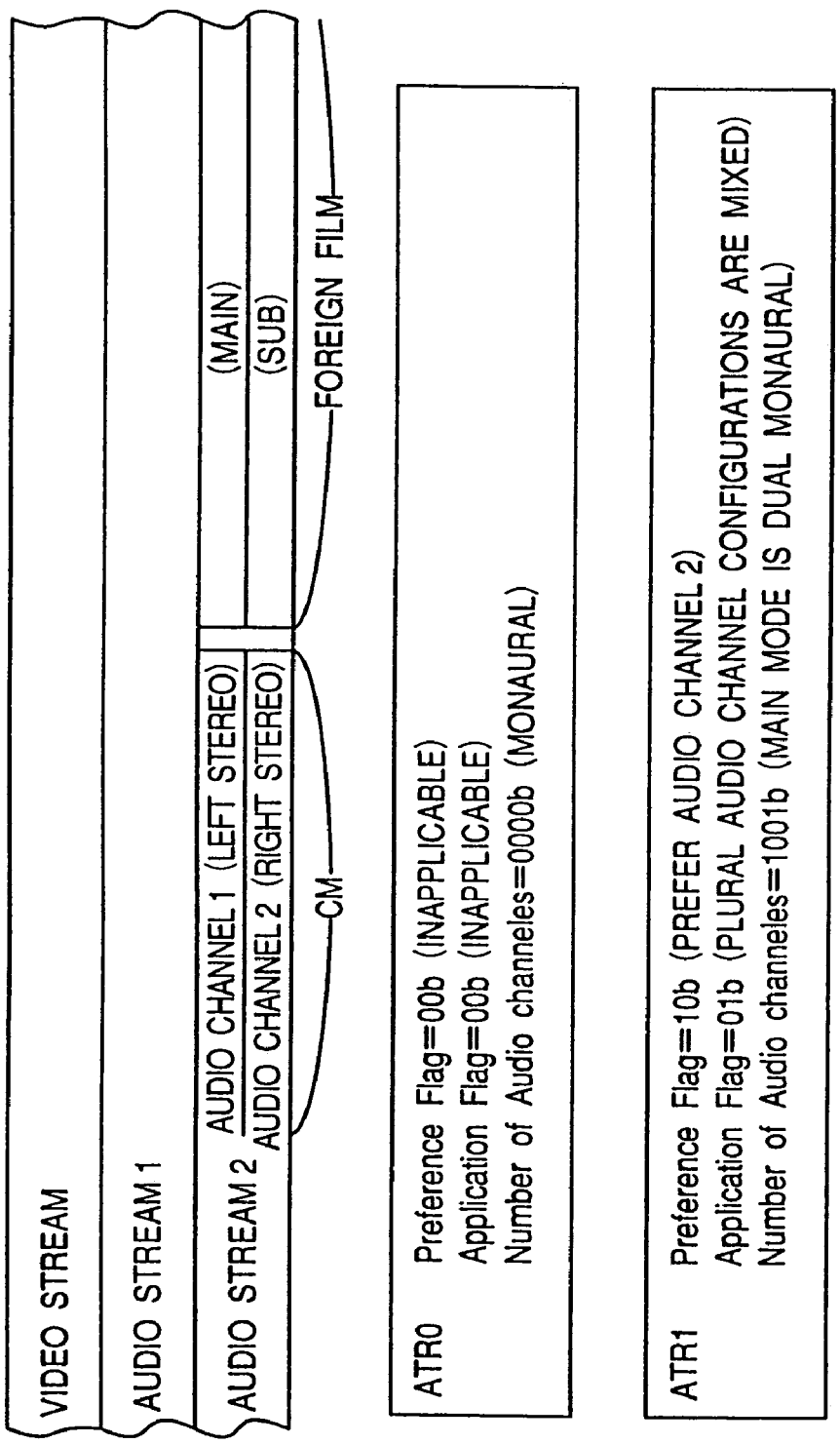
FIG. 45 shows the relationship between management information stored to disc and a third exemplary audio stream configuration.

Furthermore, if audio streams 1 and 2 are both recorded for a single AV stream, A_ATR0 is used for audio stream 1 management information, and A_ATR1 is used for audio stream 2 management information. By setting the preference flag to 10b in A_ATR1 as shown in FIG. 45, audio channel 2, that is, the subchannel, can be designated the preferred channel and selected with priority to audio channel 1. Furthermore, by setting the application flag to 01 it is known that a plurality of audio channels are mixed. By further setting the number of audio channels to 1001b, it is known that two channel (dual monaural) is audio is the preferred mode. Which is the preferred or representative mode when there are plural modes can be detected by, for example, comparing the total time of each mode and selecting the mode with the longest time, or sending a code in the broadcast signal indicating a preselected preferred mode.

SP_ATR (subpicture attribute)

Records the subpicture attribute information shown below according to the format as shown in FIG. 14.

Application Flag

Stores one of the following values indicating the application type.

00b: not applicable
01b: caption
10b: animation

SP_PLT (subpicture color palette)

Records the subpicture color palette information using the format shown in FIG. 14.

M_AVFI (FIG. 15)

The movie AV file information M_AVFI comprises the following information for accessing a movie VOB: M_AVFI_GI, M_VOBI_SRP, and M_VOBI.

Figure 15:
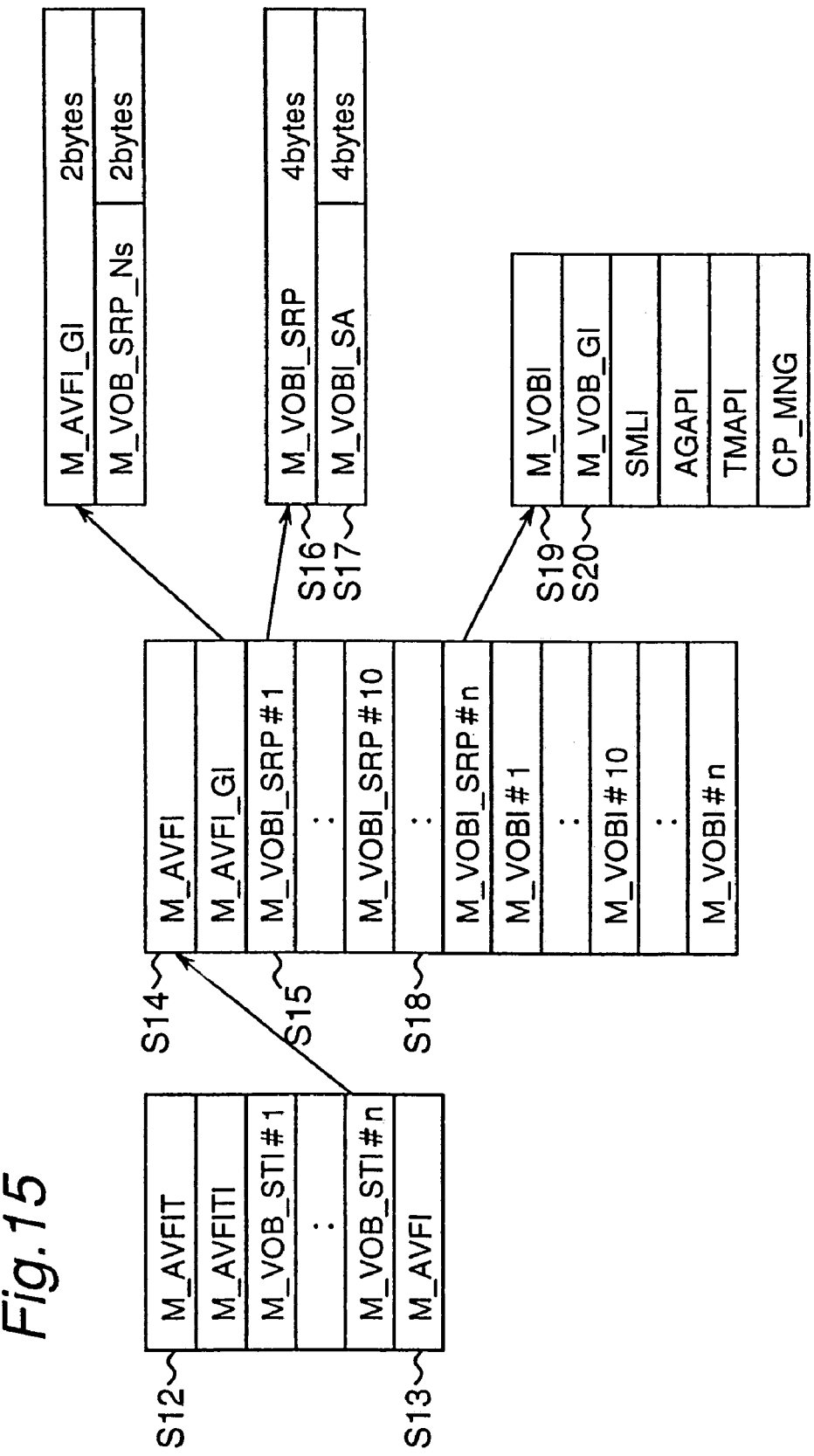
FIG. 15 shows the structure of the M_AVFI block.

M_AVFI_GI (movie AV file feneral information) (FIG. 15)

Stores the movie VOB information search pointer count M_VOBI_SRP_Ns.

M_VOBI_SRP_Ns (movie VOB information search pointer number)

Records the number of movie VOB information search pointers M_VOBI_SRP.

M_VOBI_SRP (movie VOB information search pointer) (FIG. 15)

Stores address information for accessing each M_VOBI.

M_VOBI_SA (movie VOB information start address)

Stores the M_VOBI start address used for a seek operation accessing the corresponding VOBI information.

Figure 16:
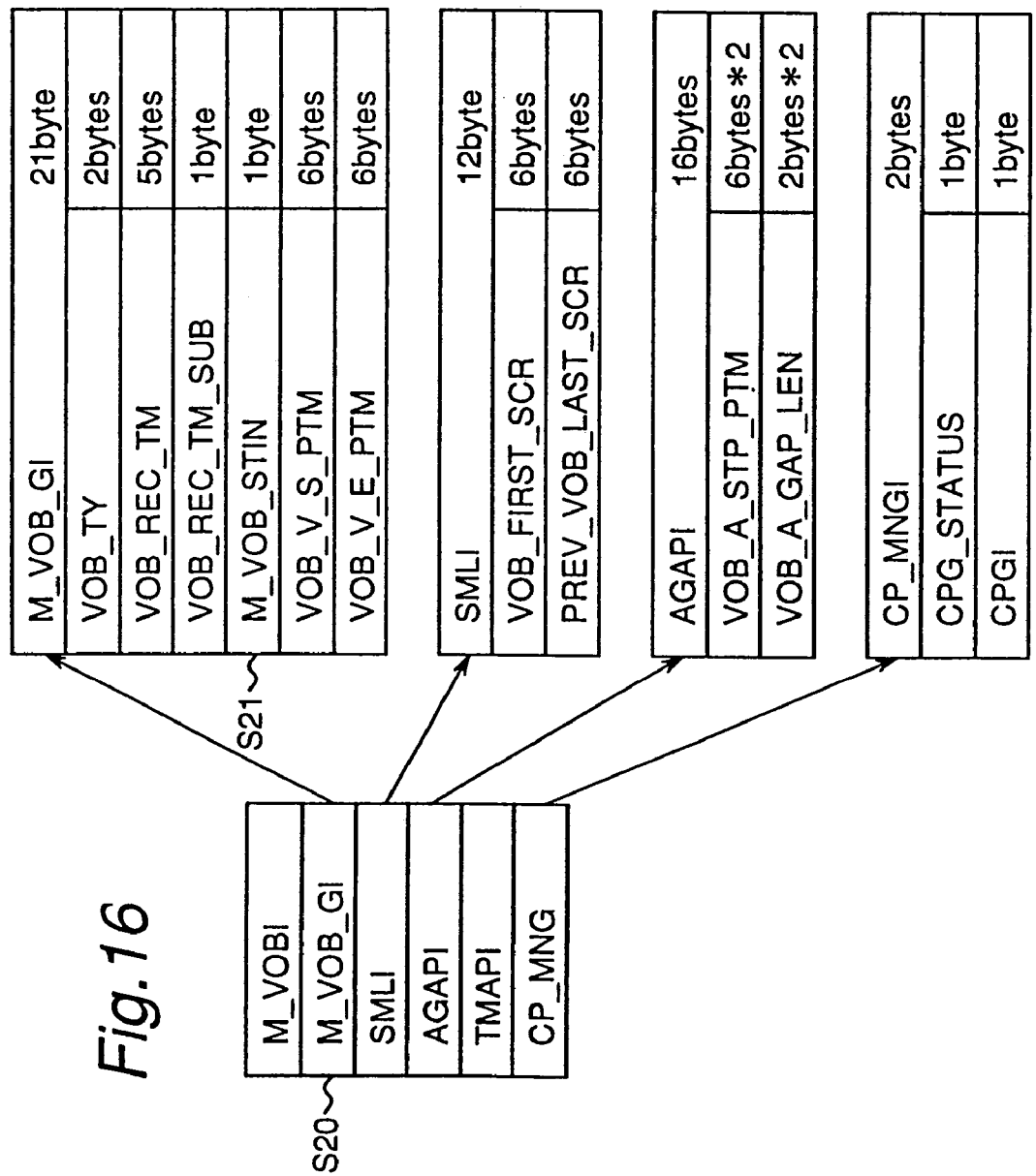
FIG. 16 shows the structure of the M_VOBI block.

M_VOBI (movie VOB information) (FIG. 16)

Stores the following movie VOB management information: M_VOB_GI, SMLI, AGAPI, TMAPI, and CP_MNGI.

M_VOB_GI (general information) (FIG. 16)

Records the following general information relating to a movie VOB.

VOB_TY (VOB type)

Stores VOB attributes according to the format as shown in FIG. 17.

TE

Stores one of the following values indicating the VOB status.

0b: normal
1b: temporarily or partially deleted

A0_STATUS

Stores one of the following values indicating the status of audio stream 0.

00b: original state
01b: overwritten

A1_STATUS

Stores one of the following values indicating the status of audio stream 1.

00b: original state
01b: overwritten
10b: dummy for additional audio content
11b: additional audio content added

APS

Stores one of the following values indicating the analog copy prevention control signal state.

00b: analog copy protection not enabled
01b: type 1
10b: type 2
11b: type 3

SML_FLG

Stores one of the following values indicating whether the VOB is to be seamlessly reproduced with the preceding VOB.

0b: seamless reproduction not possible
1b: seamless reproduction possible

A0_GAP_LOC

Stores one of the following values indicating the presence of an audio reproduction gap in audio stream 0, and identifying the VOBU to which the audio-reproduction gap is multiplexed.

00b: no audio reproduction gap recorded
01b: audio reproduction gap multiplexed to first VOBU
10b: audio reproduction gap multiplexed to second VOBU
11b: audio reproduction gap multiplexed to third VOBU

A1_GAP_LOC

Stores one of the following values indicating the presence of an audio reproduction gap in audio stream 1, and identifying the VOBU to which the audio reproduction gap is multiplexed.

00b: no audio reproduction gap recorded
01b: audio reproduction gap multiplexed to first VOBU
10b: audio reproduction gap multiplexed to second VOBU
11b: audio reproduction gap multiplexed to third VOBU VOB_REC_TM (VOB recording date/time)

The date and time the VOB was recorded is stored in the same format used for PL_CREATE_TM shown in FIG. 9. What is important to note here is that this indicates the date/time that the first video presentation frame of the VOB was recorded. If the first video frame is changed by editing or deletion, this VOB_REC_TM value must be updated. It should be further noted that the date/time of recording can be displayed synchronized to the VOB presentation similarly to the way a date/time is displayed on the viewfinder of a video camcorder by simply adding the time elapsed in the VOB to the time stored as VOB_REC_TM.

VOB_REC_TM_SUB (VOB recording Date/time difference information)

This field is used to absorb error in a VOB_REC_TM field that has been updated because the first video frame in the VOB was changed by VOB editing or deletion. As shown in FIG. 9, VOB_REC_TM is only accurate to the second. This means that if the video was edited or deleted at the frame or field level (precision), the recording time cannot be expressed with sufficient accuracy using only VOB_REC_TM. This field is therefore used to adjust for any difference.

M_VOB_STIN (M VOB_STI number)

Stores the M_VOB_STI number corresponding to the VOB. This M_VOB_STI number is the recording sequence in the above-noted M_VOB_STI table.

VOB_V_S_PTM (VOB video start PTM)

Stores the VOB presentation start time based on the same reference time as the time stamp of the video stream.

VOB_V_E_PTM (VOB video end PTM)

Stores the VOB presentation end time based on the same reference time as the time stamp of the video stream. It should be noted that the time stamp of the stream indicates the presentation start time of the frame, but this VOB_V_E_PTM field records the presentation end time, that is, the sum of the start time plus the frame presentation period.

SMLI (seamless information) (FIG. 16)

SMLI stores the following information required for seamless reproduction with the preceding VOB. Note that this field is only recorded when the above-noted SML_FLG is 1b.

VOB_FIRST_SCR

Stores the SCR of the first pack in the VOB.

PREV_VOB_LAST_SCR

Stores the SCR of the last pack in the previous VOB.

AGAPI (audio gap information) (FIG. 16)

AGAPI records the following information required for the decoder to process an audio reproduction gap. This field is only recorded when a value other than 00b is written to the above-noted A0_GAP_LOC or A1_GAP_LOC.

VOB_A_STP_PTM (VOB audio stop PTM)

Records the time of the audio reproduction gap, that is, the time at which the decoder is to temporarily stop audio reproduction. This time is recorded using the same reference time as the stream time stamp.

VOB_A_GAP_LEN (VOB audio gap length)

Records the length of the audio reproduction gap in 90 kHz precision.

CP_MNGI (copy management information) (FIG. 16)

Records the copy management information for the corresponding VOB, and comprises CPG_STATUS and CPGI.

CPG_STATUS (copy protection status)

Stores a value used for VOB copy protection. CPG_STATUS indicates whether content can be freely copied or whether only a first generation copy can be made.

CPGI (copy protection information)

Records the copy protection information applied to the corresponding VOB.

Figure 18:
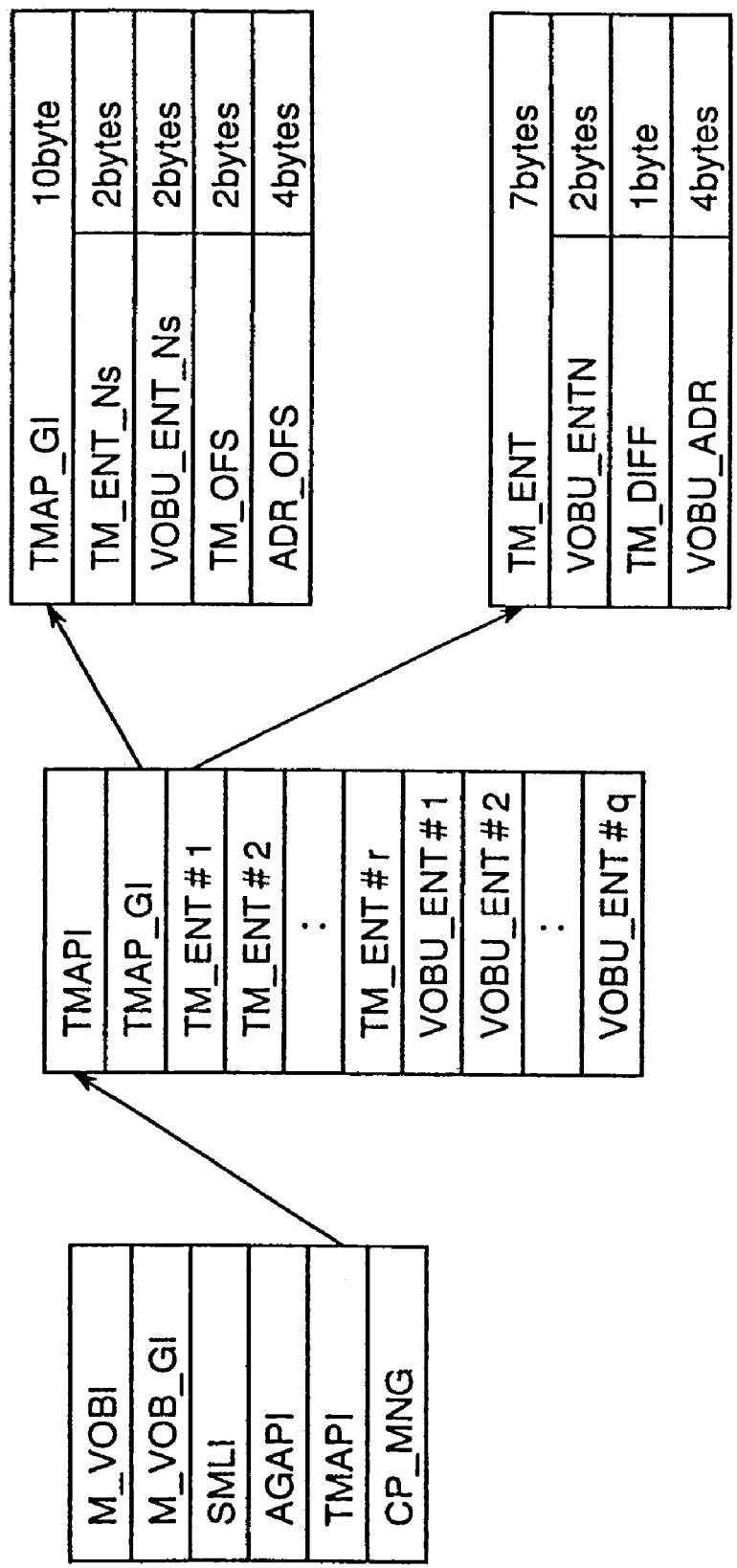
FIG. 18 shows the structure of the TMAPI block.
Figure 20:
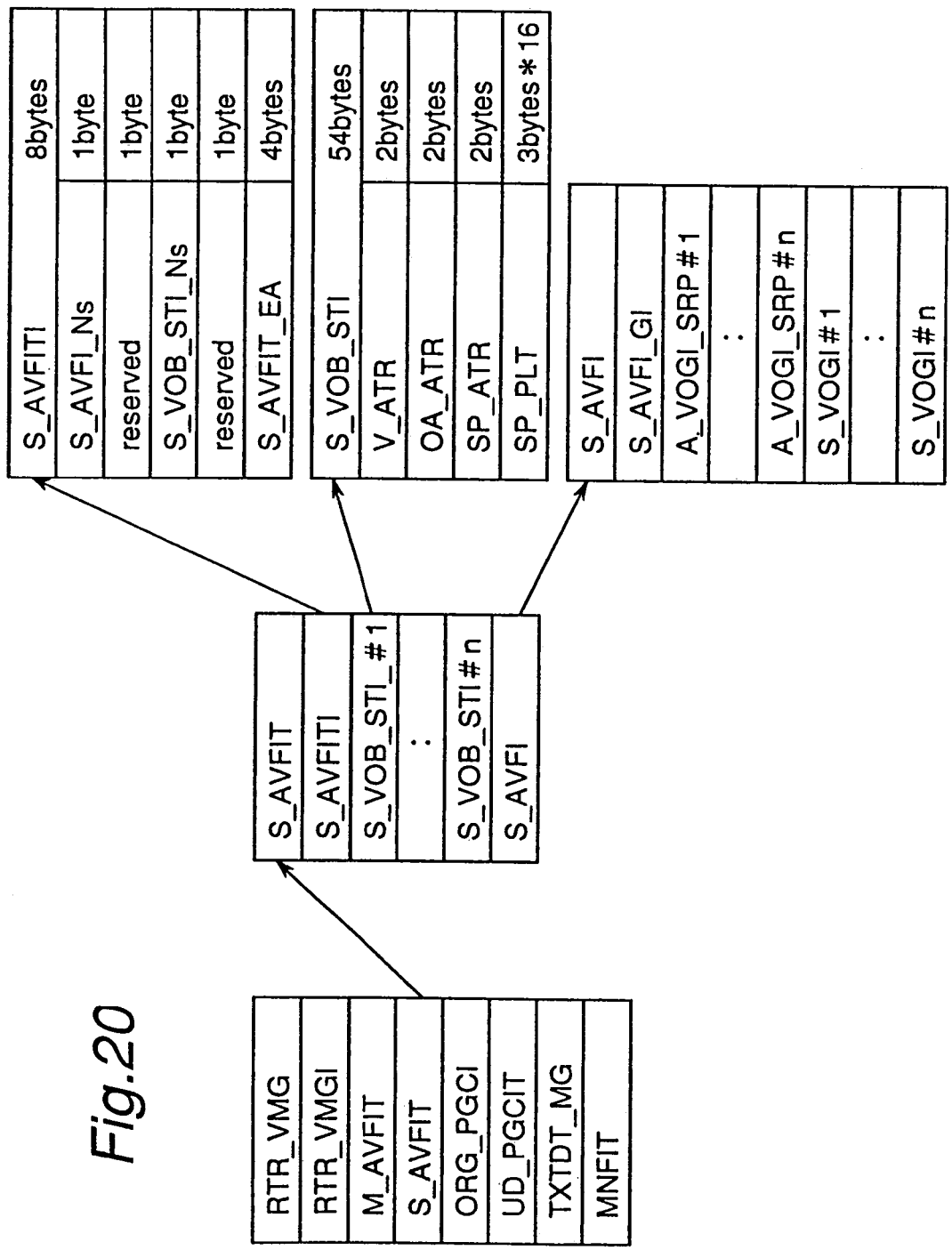
FIG. 20 shows the structure of the S_AVFIT block.
Figure 23:
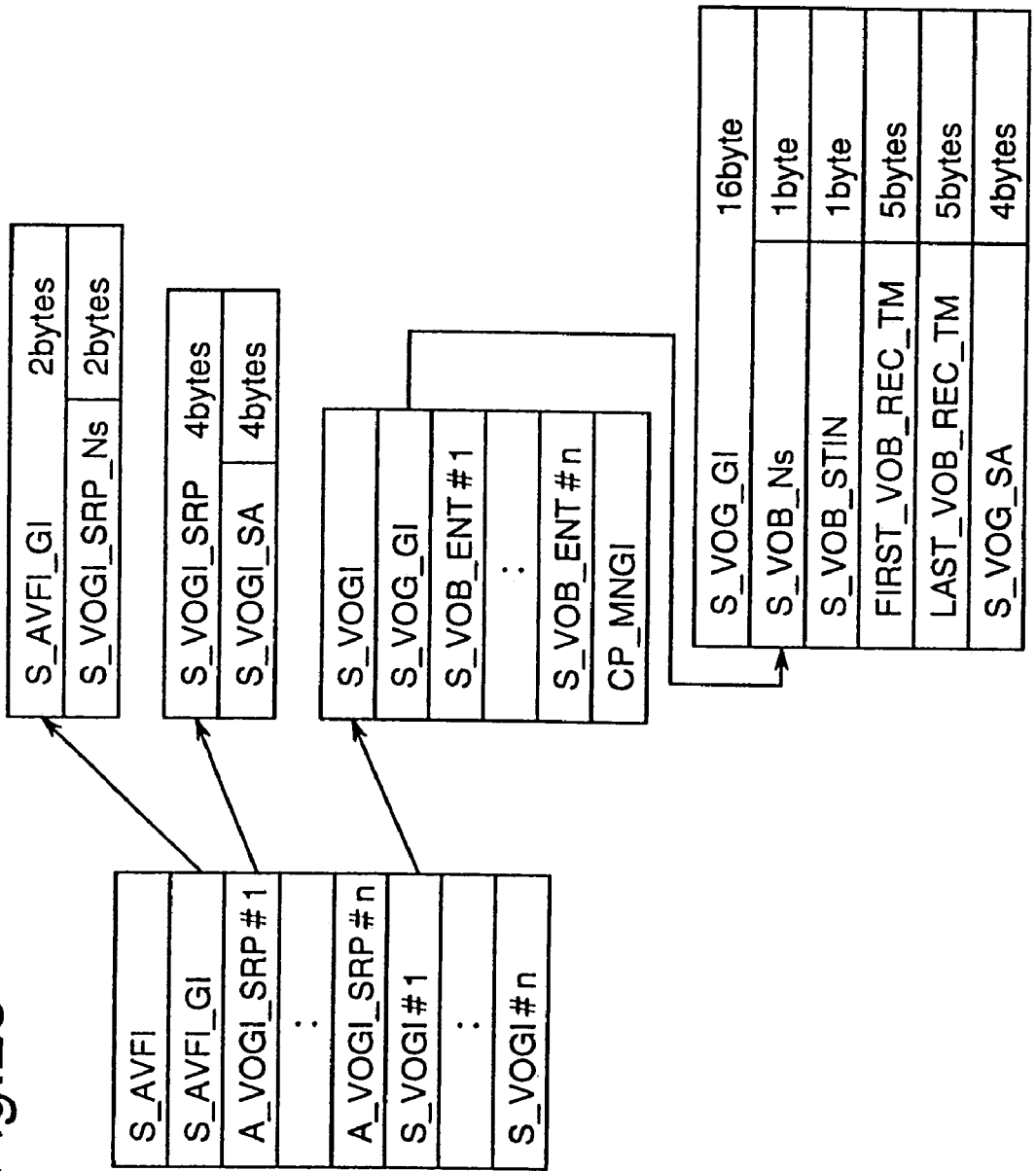
FIG. 23 shows the structure of the S_AVFI block.
Figure 26:
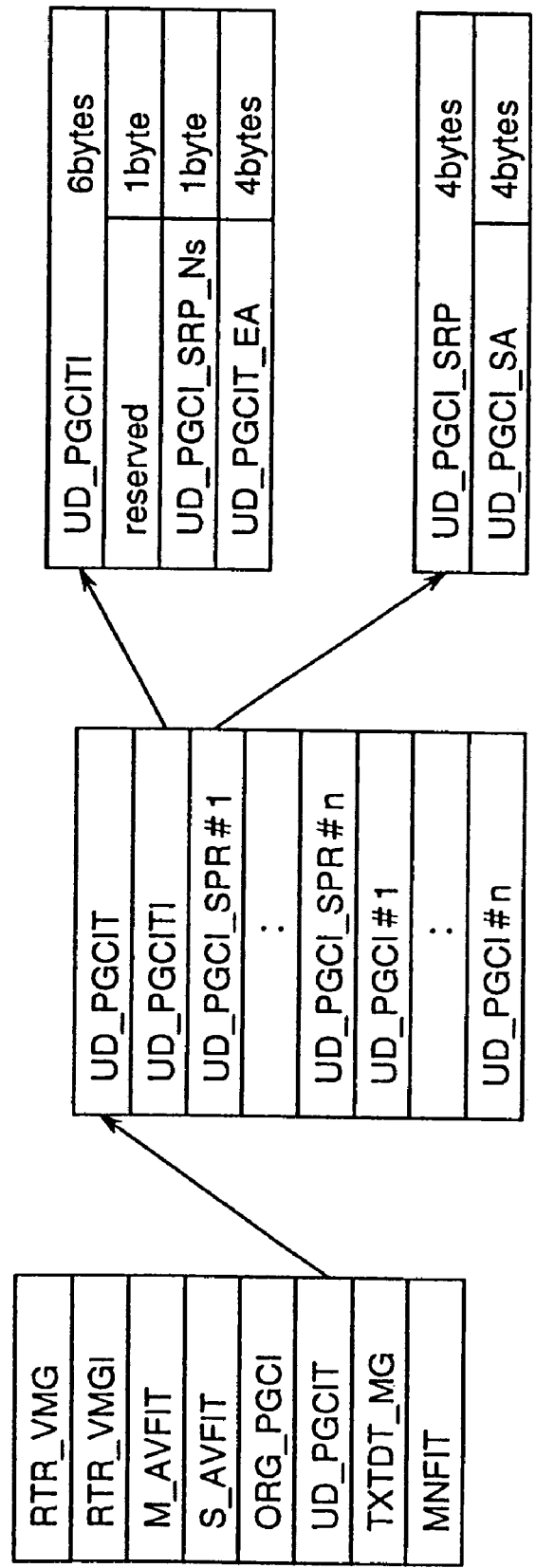
FIG. 26 shows the structure of the UD_PGCIT block.
Figure 27:
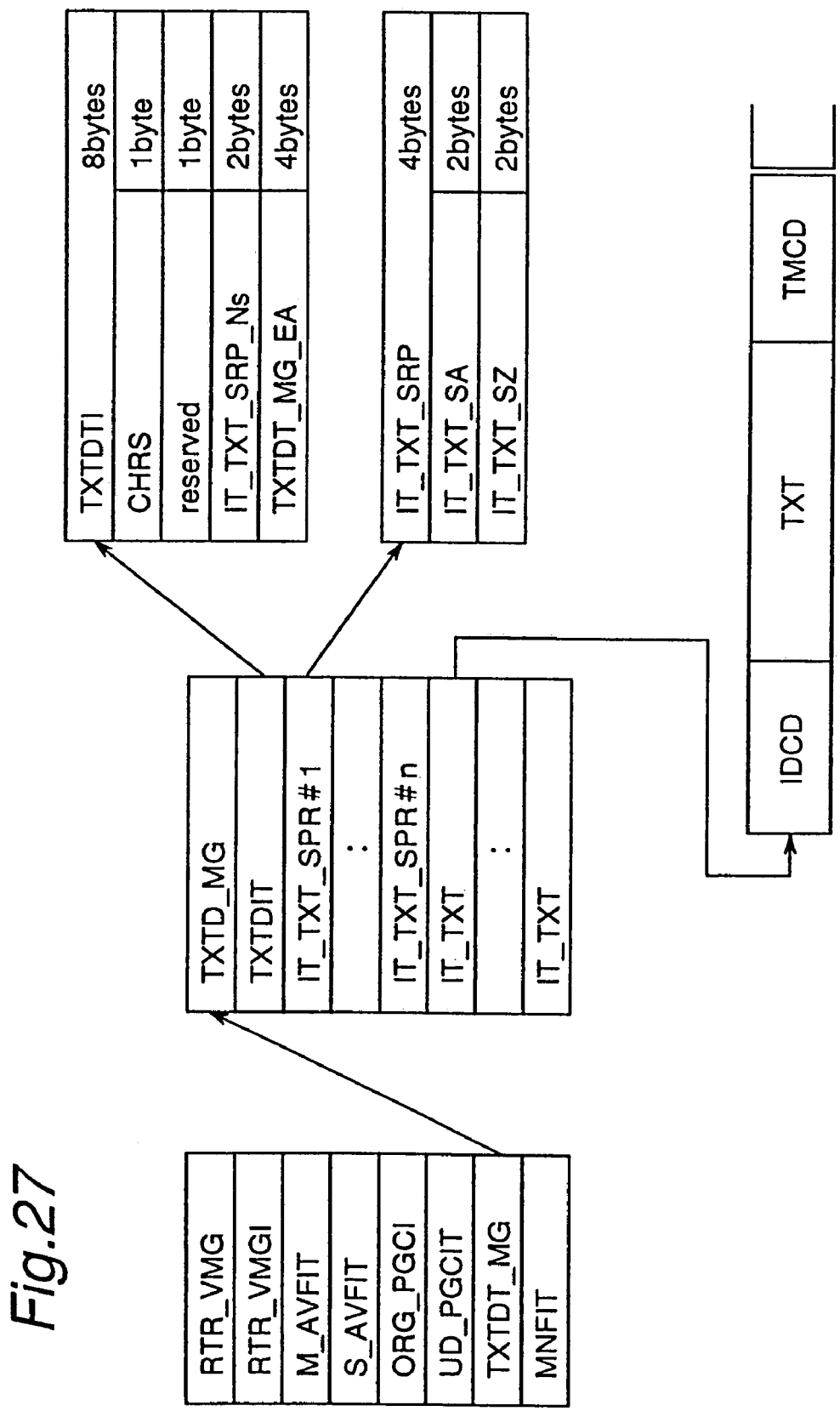
FIG. 27 shows the structure of the TXTDT_MG block.

TMAPI (time map information) (FIG. 18)

The time map information comprises TMAP_GI, TM_ENT, and VOBU_ENT fields.

TMAP_GI (FIG. 18)

The general TMAP information TMAP_GI comprises TM_ENT_Ns, VOBU_ENT_Ns, TM_OFS, and ADR_OFS fields as described below.

TM_ENT_Ns (TM_ENT number)
Records the number of TM_ENT fields in the TMAPI block as described below.

VOBU_ENT_Ns (VOBU_ENT number)
Records the number of VOBU_ENT fields in the TMAPI block as described below.

TM_OFS (time offset)
Records the time map offset with the video field precision.

ADR_OFS (address offset)
Records the offset in the first AV field in the VOB.

TM_ENT (time entry) (FIG. 18)
A time entry comprises the following fields as access point information at a constant time interval TMU. If the video format is NTSC, the TMU is 600 video fields; if PAL, it is 500 video fields.

VOBU_ENTN (VOBU_ENT number)
Records the entry number of a VOBU containing the time (TMU×(N−1)+TM_OFS for the N-th TM_ENT) indicated by the TM_ENT.

TM_DIFF (time difference)
Records the difference between the time indicated by this TM_ENT and the presentation start time of the VOBU pointed to by VOBU_ENTN.

VOBU_ADR (VOBU address)
Records the start address in the VOB of the VOBU pointed to by VOBU_ENTN.

VOBU_ENT (FIG. 19)
The VOBU entry (VOBU_ENT) has the fields shown below for the corresponding VOBU. The fields are formatted as shown in FIG. 19. The time and address information required to access a desired VOBU can be obtained by simply adding the following fields in sequence.

1STREF_SZ
Stores the number of packs from the first pack in the VOBU to the pack containing the last data block of the first I-picture in the VOBU.

VOBU_PB_TM
Records the playback time of this VOBU.

VOBU_SZ
Records the data size of this VOBU.

S_AVFIT (FIG. 20)
The still image AV file information table comprises the following management information fields for the still image AV file RTR_STO.VRO: S_AVFITI, S_VOB_STI, S_AVFI.

S_AVFITI (still image AV file information table information) (FIG. 20)
Stores the following information required to access S_VOB_STI and S_AVFI.

S_AVFI_Ns (still image AV file information number)
This is a value of either 0 or 1. This value corresponds to the number of still image AV files, that is, RTR_STO.VRO file presence.

S_VOB_STI_Ns (still image VOB stream information number)
Records the number of S_VOB_STI described below.

S_AVFI_EA (still image AV file information end address)
Records the S_AVFI end address.

S_VOB_STI (still image VOB stream information) (FIG. 20)
Records the following still image VOB stream information.

V_ATR (Video Attributes)
Information recorded as the video attributes are the Video compression mode, TV system, Aspect ratio, and Video resolution. These fields are as described above with reference to the video attributes V_ATR of the M_VOB_STI.

OA_ATR (audio stream attributes)
The audio stream attribute fields are: Audio coding mode, Application Flag, Quantization/DRC, fs, Number of Audio channels. These are also as described above with reference to the A_ATR0 fields of the M_VOB_STI.

SP_ATR (subpicture attribures)
The Application Flag is recorded for the subpicture attributes. This field is the same as SP_ATR described above with reference to M_VOB_STI.

SP_PLT (subpicture color palette)
Stores the color palette information for subpictures. The format is as described with reference to the SP_PLT of M_VOB_STI.

S_AVFI (still image AV file information) (FIG. 23)
Comprises the following fields required to access a still image VOG: S_AVFI_GI, S_VOGI_SRP, and S_VOGI.

S_AVFI_GI (FIG. 23)
General still image AV file information S_AVFI_GI records S_VOGI _SRP_Ns.

S_VOGI_SRP_Ns (still image VOB group search pointer number)
Records the number of S_VOGI_SRP fields described below.

S_VOGI_SRP (still image VOB group information search pointer) (FIG. 23)
Records S_VOGI_SA.

S_VOGI_SA (still image VOB group information start address) Records the Start Address of this S_VOGI S_VOGI (FIG. 23)
The still image VOB group information S_VOGI comprises the following still image VOB management information fields: S_VOG_GI, S_VOB_ENT, CP_MNGI.

S_VOG_GI (FIG. 23)
General still image VOB group information S_VOG_GI records the following fields as general information relating to the still image VOB group.

S_VOB_Ns (still image VOB number)
Records the number of still image VOBs in the still image VOB group.

S_VOB_STIN (S VOB_STI number)
Records the S_VOB_STI number storing the still image VOB stream information. This S_VOB_STI number is the recording sequence in the S_VOB_STI table.

FIRST_VOB_REC_TM (first VOB recording date/time)
Records the recording date/time information of the first still image VOB in the still image VOB group.

LAST_VOB_REC_TM (last VOB recording date/time)
Records the recording date/time information of the last still image VOB in the still image VOB group.

S_VOB_SA (still image VOB group start address)
Records the start address of the still image VOB group in the RTR_STO.VRO file.

CP_MNGI (copy management information)
Records copy management information relating to the corresponding still image VOB group. The fields thereof are the same as the above-described CP_MNGI for movie VOB information M_VOBI.

S_VOB_ENT (FIG. 24)
Still image VOB entries S_VOB_ENT are defined as either type A or type B as described below according to whether there is audio recorded for individual still image VOBs in the still image VOB group.

S_VOB_ENT (Type A) (FIG. 24)

Type A comprises the fields S_VOB_ENT_TY and V_PART_SZ, defined as follows.

S_VOB_ENT_TY (still image VOB entry type)

Still image VOB type information is formatted as shown in FIG. 25.

MAP_TY

Stores one of the following values for identifying type A or type B.

00b: type A
01b: type B

TE

Stores one of the following values indicating the status of the still image VOB.

0b: normal
1b: temporarily or partially deleted

SPST_Ns

Stores the number of subpicture streams in the still image VOB.

V_PART_SZ (video part size)

Stores the data size of the video part of the still image VOB.

S_VOB_ENT (Type B) (FIG. 24)

In addition to S_VOB_ENT_TY and V_PART_SZ fields, type B also has A_PART_SZ and A_PB_TM fields as defined below.

S_VOB_ENT_TY (still image VOB entry type)

Records the type of the still image VOB. These fields are as described above with reference to type A.

V_PART_SZ (video part size)

Stores the data size of the video part of the still image VOB.

A_PART_SZ (audio part size)

Stores the data size of the audio part of the still image VOB.

A_PB_TM (audio playback time)

Stores the playback time (length) of the audio part of the still image VOB.

UD_PGCIT (FIG. 26)

The user-defined PGC information table comprises the following fields: UD_PGCITI, UD_PGCI_SRP, and UD_PGCI.

UD_PGCITI (FIG. 26)

The user-defined PGC information table information UD_PGCITI records the following fields constituting the user-defined PGC information table.

UD_PGCI_SRP_Ns (user-defined PGC information search pointer number)

Records the number of UD_PGCI_SRP fields.

UD_PGCIT_EA (user-defined PGC information table end address)

Records the UD_PGCIT end address.

UD_PGCI_SRP (FIG. 26)

The user-defined PGC information search pointer UD_PGCI_SRP records the UD_PGCI_SA field.

UD_PGCI_SA (user-defined PGC Information Start Address)

Records the UD_PGCI start address. This address is used to seek and access the PGCI.

UD_PGCI (FIG. 26)

The detailed structure of the user-defined PGC information is described further below under the PGC information PGCI.

ORG_PGCI (FIG. 5)

The detailed structure of the original PGC information is described further below under the PGC information PGCI.

TXTDT_MG (FIG. 27)

The text data management field TXTDT_MG comprises TXTDTI, IT_TXT_SRP, and IT_TXT fields as described below.

TXTDTI (FIG. 27)

Text data information TXTDTI comprises the following fields: CHRS, IT_TXT_SRP_Ns, TXTDT_MG_EA.

CHRS (character set code)

Records the character set code used for IT_TXT.

IT_TXT_SRP_Ns (IT TXT search pointer number)

Records the number of IT_TXT_SRP fields.

TXTDT_MG_EA (text deata management end address)

Records the end address of the TXTDT_MG block.

IT_TXT_SRP (FIG. 27)

The IT_TXT search pointer IT_TXT_SRP records the following information for accessing IT_TXT.

IT_TXT_SA (IT_TXT start address)

Records the IT_TXT start address. This address is used to seek and access the IT_TXT block.

IT_TXT_SZ (IT_TXT size)

Records the IT_TXT data size. A desired IT_TXT block can be read by reading this amount of data.

IT_TXT (FIG. 27)

IT_TXT comprises one or more sets of three fields: identification code IDCD, the text TXT corresponding to that ID code, and an end code TMCD defining the end of the set. If there is no TXT field for an IDCD, the TXT field can be omitted and IDCD and TMCD recorded as one set. Valid IDCD values are defined as follow.

Genre Codes

30h: movie
31h: music
32h: drama
33h: animation
34h: sports
35h: documentary
36h: news
37h: weather
38h: educational
39h: hobby
3Ah: entertainment
3Bh: performing arts (plays, opera)
3Ch: shopping Input source codes 60h: broadcasting station
61h: camcorder
62h: photograph
63h: memo
64h: other

PGCI (FIG. 28)

Original program chain information ORG_PGCI and user-defined program chain information UD_PGCI have a common data structure collectively referred to as program chain information PGCI. PGCI comprises the following fields: PGC_GI (program chain general information), PGI (program information), CI_SRP (cell information search pointer), and CI (cell information).

PGC_GI (FIG. 28)

PGC_GI (PGC general information) comprises the fields PG_Ns (program number) and CI_SRP_Ns (cell information search pointer number) as general information about the PGC. These fields are described further below.

PG_Ns (program number)

Records the number of programs in the PGC. If a user-defined PGC, this field is 0 because there is no program.

CI_SRP_Ns (CI_SRP number)

Records the number of cell information search pointers CI_SRP, described below.

PGI (FIG. 28)

PGI (program information) comprises the following fields as described below: program type PG_TY, cell number C_Ns, primary text information PRM_TXTI, IT_TXT_SRPN, and THM_PTRI.

PG_TY (program type)

Figure 29:
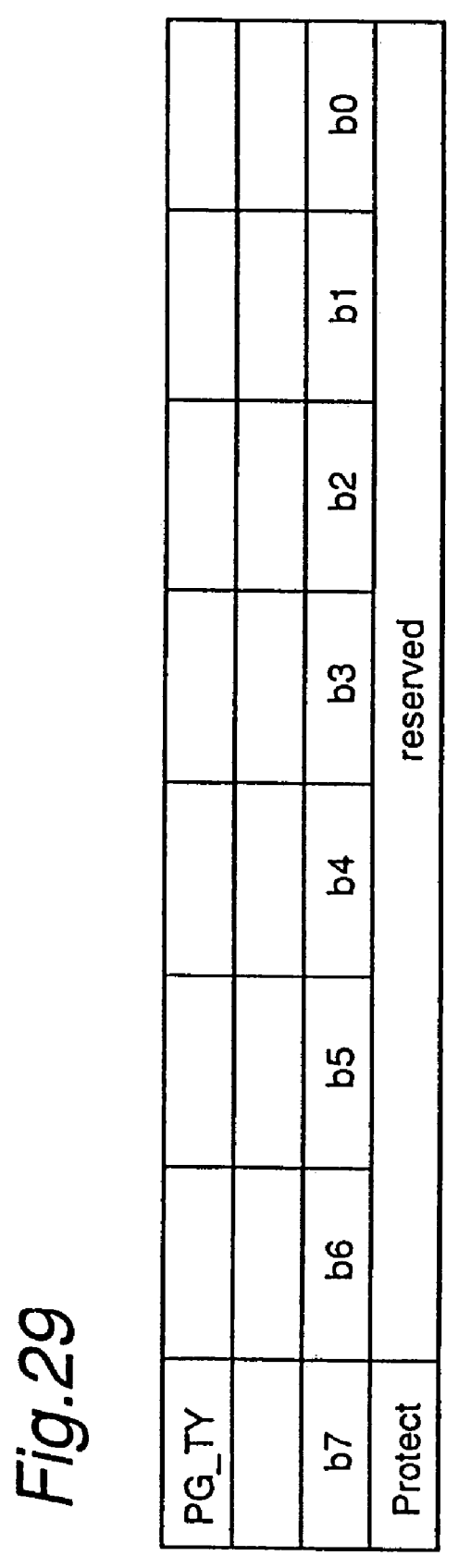

Records the following information formatted as shown in FIG. 29.

Protect (protected)
0b: normal
1b: protected
C_Ns (cell number)

Records the cell number in the program.

PRM_TXTI (primary text information)

Records the text information describing program content. For further details, see the above-noted PL_SRPT.

IT_TXT_SRPN (IT_TXT_SRP Number)

If IT_TXT containing program content information is recorded in addition to the primary text noted above, the IT_TXT_SRP number recorded in TXTDT_MG is stored to this field.

THM_PTRI (thumbnail image pointer information)

Records the thumbnail image information representing this program. Details about the THM_PTRI are identical to the above-noted THM_PTRI of PL_SRPT.

CI_SRP (FIG. 28)

The cell information search pointer (CI_SRP) records address information required for accessing this cell information.

CI_SA (cell information start address)

Records the start address of the cell information. The cell is accessed by seeking this address.

CI (FIG. 30)

CI (cell information) is one of two types: M_CI for movies, or S_CI for still image.

M_CI (FIG. 30)

M_CI (movie cell information) comprises the following fields: M_C_GI and M_C_EPI.

M_C_GI (FIG. 30)

M_C_GI (movie cell general information) contains the following basic information for each cell.

C_TY (cell type)

Figure 31:
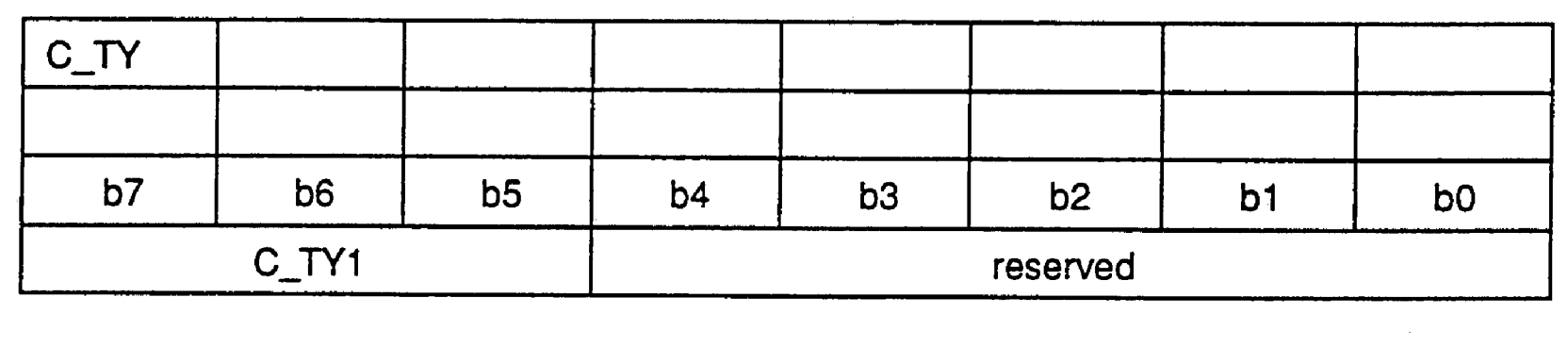

Records the following information formatted as shown in FIG. 31 for identifying movie cells and still image cells.

C_TY1
000b: movie cell
001b: still image cell

M_VOBI_SRPN (movie VOB information search pointer number)

Records the search pointer number of the movie VOB information corresponding to this cell. To access the stream data corresponding to this cell, it is first necessary to access the movie VOB information search pointer number indicated by this field.

C_EPI_Ns (cell entry point information number)

Records the number of entry points in this cell.

C_V_S_PTM (cell video start time)

Records the playback start time of the cell using the format shown in FIG. 10.

C_V_E_PTM (Cell Video End Time)

Records the playback end time of the cell using the format shown in FIG. 10. Used in conjunction with C_V_S_PTM to define the valid cell period within the corresponding VOB.

M_C_EPI (FIG. 32)

M_C_EPI (movie cell entry point information) is categorized as Type A or Type B based on the presence of primary text.

M_C_EPI (Type A) (FIG. 32)

M_C_EPI (Type A) contains the following information indicative of an entry point.

EP_TY (entry point type)

Figure 33:
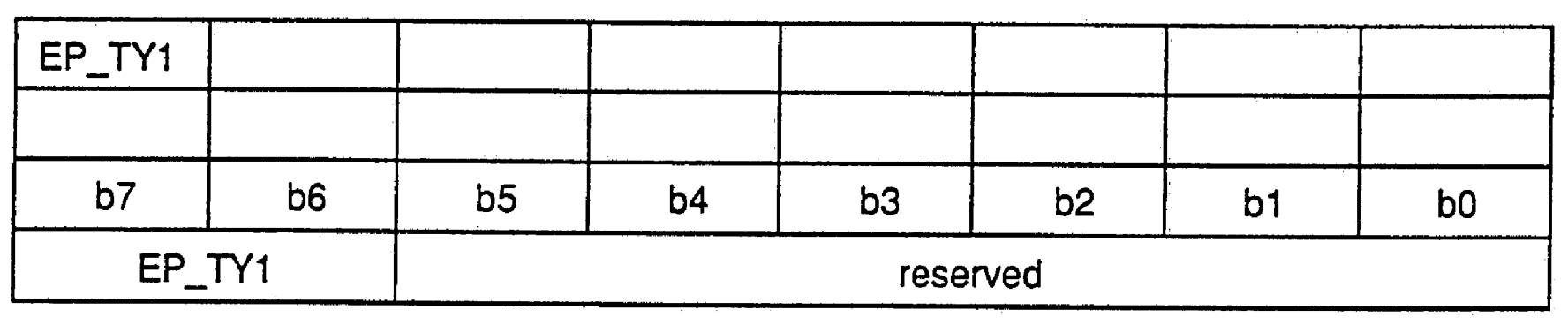

Records the following information formatted as shown in FIG. 33 for identifying the entry point type.

EP_TY1
00b: Type A
01b: Type B

EP_PTM (entry point time)

Records the time at which the entry point is set according to the format as shown in FIG. 10.

M_C_EPI (Type B) (FIG. 32)

In addition to the same EP_TY and EP_PTM fields of Type A, M_C_EPI (Type B) has a PRM_TXTI field as described below.

PRM_TXTI (primary text information)

Records text information describing the content of the location indicated by the entry point. Details of this information are as described in the above-noted PL_SRPT.

S_CI (FIG. 30)

S_CI (still image cell information) comprises S_C_GI and S_C_EPI fields.

S_C_GI (FIG. 30)

S_C_GI (still image cell general information) contains the basic cell information described below.

C_TY (cell type)

Records information for identifying movie cells and still image cells. This cell type information is as described above with reference to a movie cell.

S_VOGI_SRPN (still image VOB group information search pointer number)

Records the search pointer number of the still image VOB group information for the cell. To access the stream data corresponding to the cell, it is first necessary to access the still image VOB group information search pointer number indicated by this field.

C_EPI_Ns (cell entry point information number)

Records the number of entry points in this cell.

S_S_VOB_ENTN (starting still image VOB number)

Records the still image VOB number from, which cell reproduction starts according to the format as shown in FIG. 11. The still image VOB number is the sequence number in the S_VOG pointed to by the above-noted S_VOGI_SRPN.

E_S_VOB_ENTN (end still image VOB number)

Records the still image VOB number at which cell reproduction ends according to the format as shown in FIG. 11. The still image VOB number is the sequence number in the S_VOG pointed to by the above-noted S_VOGI_SRPN. It should be noted that the valid cell period in the S_VOG to which the cell belongs is defined by this field in conjunction with S_S_VOB_ENTN.

S_C_EPI (FIG. 32)

S_C_EPI (still image cell entry point information) is categorized as Type A or Type B depending upon the presence of primary text.

S_C EPI (Type A) (FIG. 32)

S_C_EPI (Type A) contains the following information indicative of an entry point.

EP_TY (entry point type)

Records the following information formatted as shown in FIG. 33 for identifying the entry point type.

EP_TY1

00b: Type A

01b: Type B

S_VOB_ENTN (still image VOB entry number)

Records the still image number in which the entry point is set according to the format as shown in FIG. 11.

S_C_EPI (Type B) (FIG. 32)

In addition to the same EP_TY and S_VOB_ENTN fields of Type A, S_C_EPI (Type B) has a PRM_TXTI as described below.

PRM_TXTI (primary text information)

Records text information describing the content of the location indicated by the entry point. Details of this information are as described in the above-noted PL_SRPT.

Configuration of a DVD Recorder

The configuration of a DVD recorder is described next below with reference to FIG. 40.

As shown in the figure, this DVD recorder comprises a user interface 7801 for interaction with the user; a system controller 7802 for handling overall management and control of the recorder; an input block 7803 comprising an A/D converter for audio and video input to the recorder; an encoder 7804; an output section 7805 for audio and video output; a decoder 7806 for MPEG stream decoding; track buffer 7807; and drive 7808.

Operation of a DVD Recorder

Figure 40:
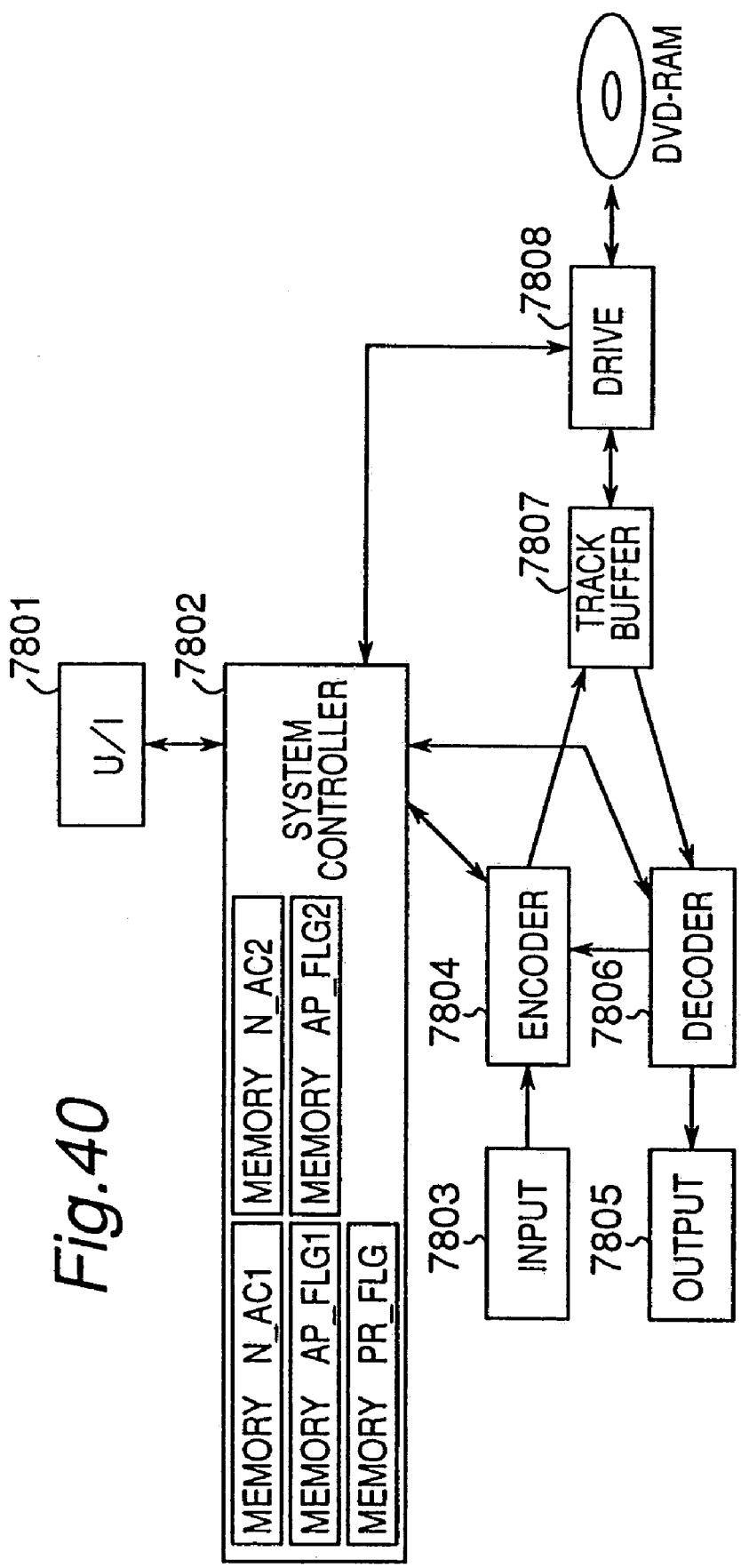
FIG. 40 is a block diagram of a DVD recorder.
Figure 41:
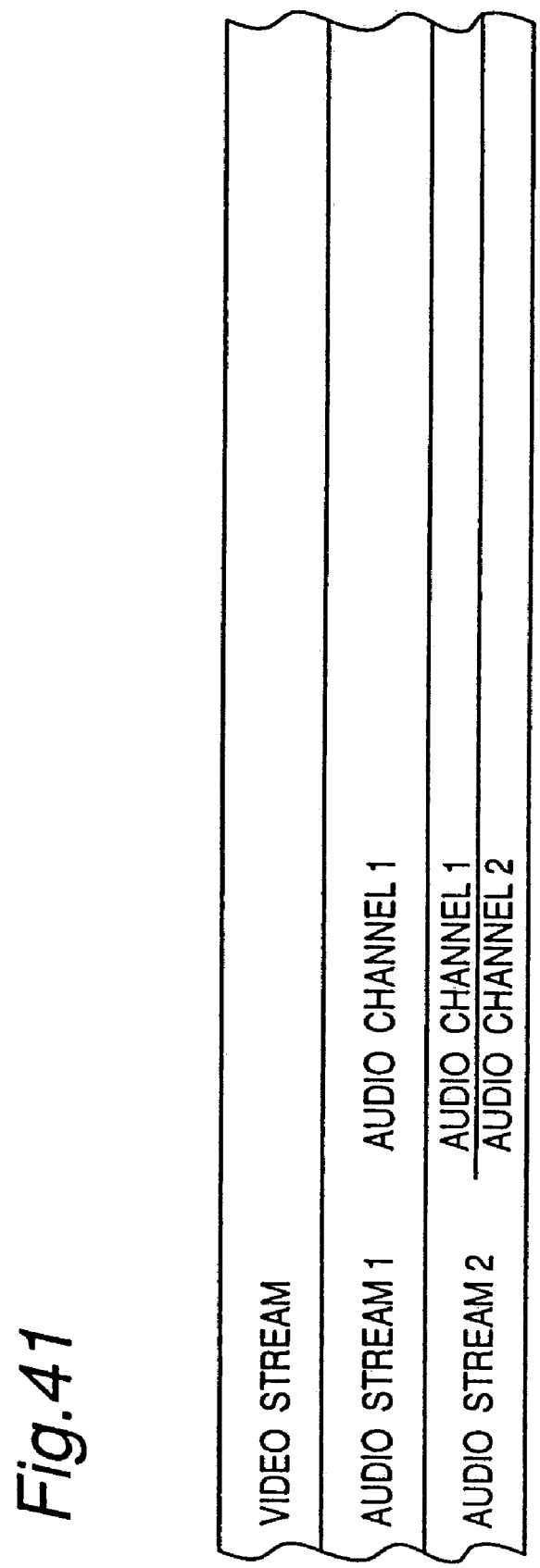
FIG. 41 is used to describe the audio stream configuration in a conventional AV stream.

The basic recording and reproduction operation of a DVD recorder shown in FIG. 40 is described next below.

A recording operation is described first below.

Before recording starts, the input block 7803, encoder 7804, and track buffer 7807 are initialized by a command from the system controller 7802. Audio and video data input to the input block 7803 are A/D converted and passed to the encoder 7804. The encoder 7804 compresses and multiplexes the video and audio data to generate a MPEG system stream, which it then passes to the track buffer 7807. Data is then passed sequentially from the track buffer 7807 to the drive for recorded to DVD-RAM disc.

A reproduction operation is described next.

After inserting a DVD-RAM disc to the disc player for reproduction, the user selects the AV stream to be played from among the plural AV streams on the disc. The method whereby the user selects the desired AV stream is described in particular detail below.

As noted above, a plurality of AV streams can be recorded to a single disc. It is therefore essential that the disc player be able to present to the user a list of all AV streams currently on the disc.

As also described above each AV stream is managed using video object VOB units. Video object information VOBI is recorded specifically for each VOB to record and manage attribute information for each VOB. A sequence of one or a plurality of VOBs is managed using a program chain PG defining a hierarchical sequence of VOBs. This program concept is introduced so that bitstreams representing a linear stream of data can be managed when recorded for whatever reason as a plurality of AV streams. This program concept is useful for managing separately recorded scenes as a meaningful sequence of related events. For example, an AV stream of a tug-of-war recorded during morning using a disc camera, and another AV stream of a relay race recorded in the afternoon could be linked and managed as a single program titled as a "school field day." Program information PGI is recorded for each program. The title associated with a particular program is recorded and managed within the attribute information for that program.

The program is thus a useful unit for recording and reproducing AV content in a way that can be easily understood by and presented to the user, while the video object VOB is the unit whereby these AV streams are internally managed by the DVD recorder.

Management information as related to the present invention and applied to actual AV stream data is described next below with reference to FIG. 46.

Figure 46:
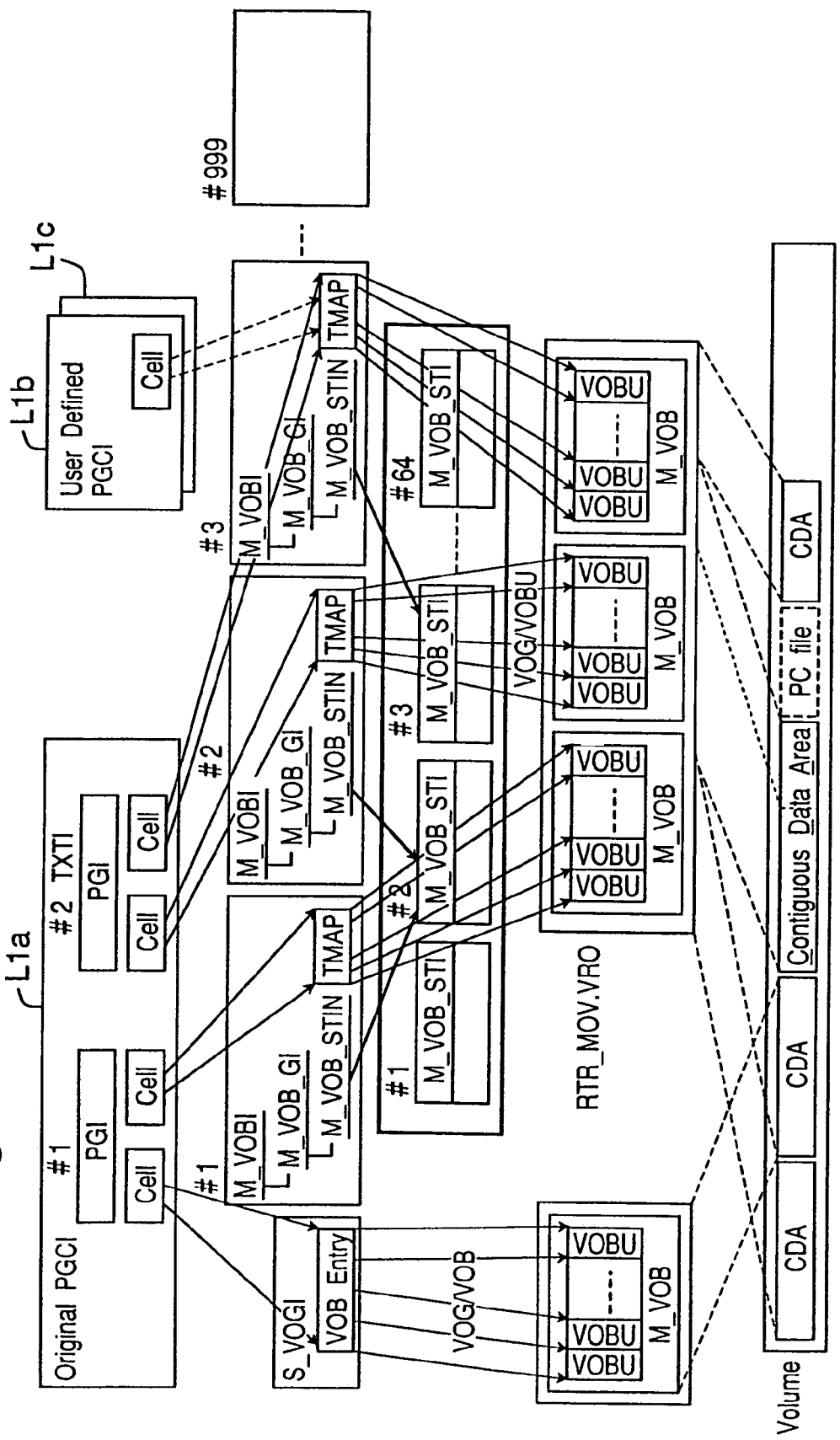
FIG. 46 is used to describe the management information structure written to optical disc.

Row L1 in FIG. 46 shows program chain information PGCI. The left block L1a shows the original program chain information ORG_PGCI required to reproduce an AV stream as it was recorded. The right block L1b and L1c show the user-defined program chain information UD_PGCI required to reproduce a program chain as edited and defined by the user.

Figure 5:
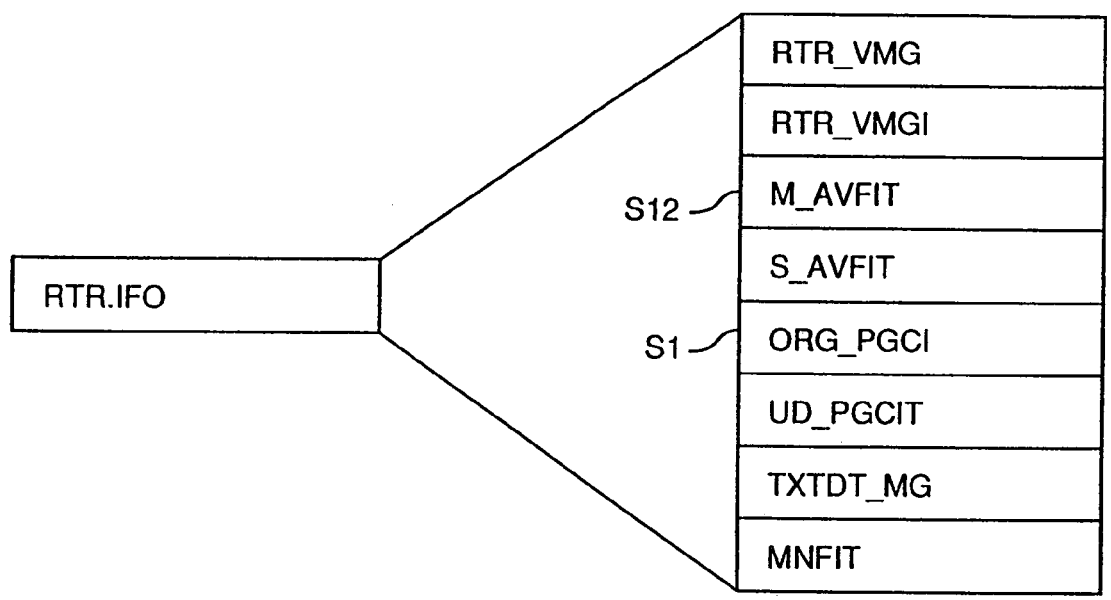
FIG. 5 shows the structure of the RTR_VMG block.
Figure 6:
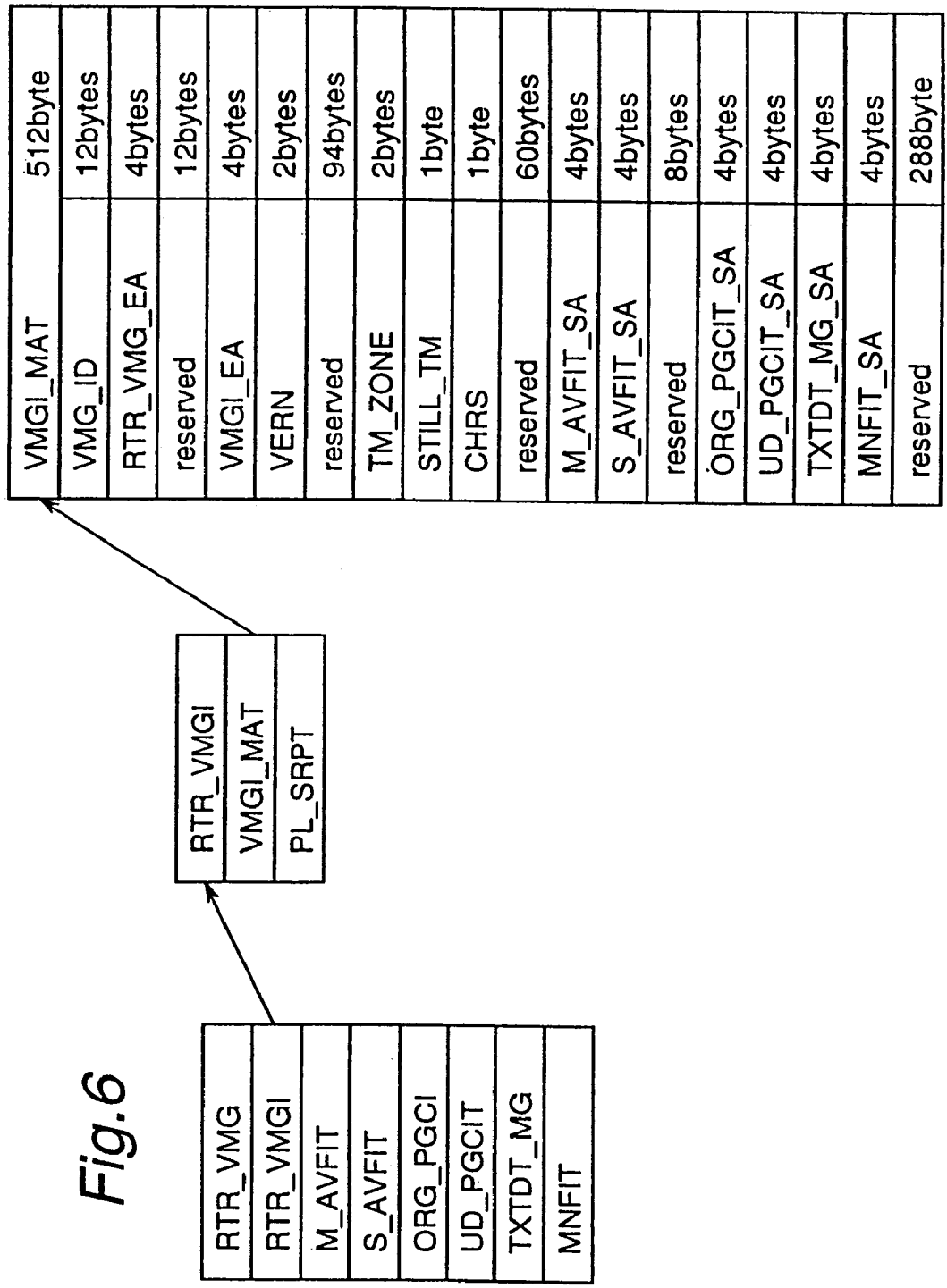
FIG. 6 shows the structure of the RTR_VMGI block.
Figure 28:
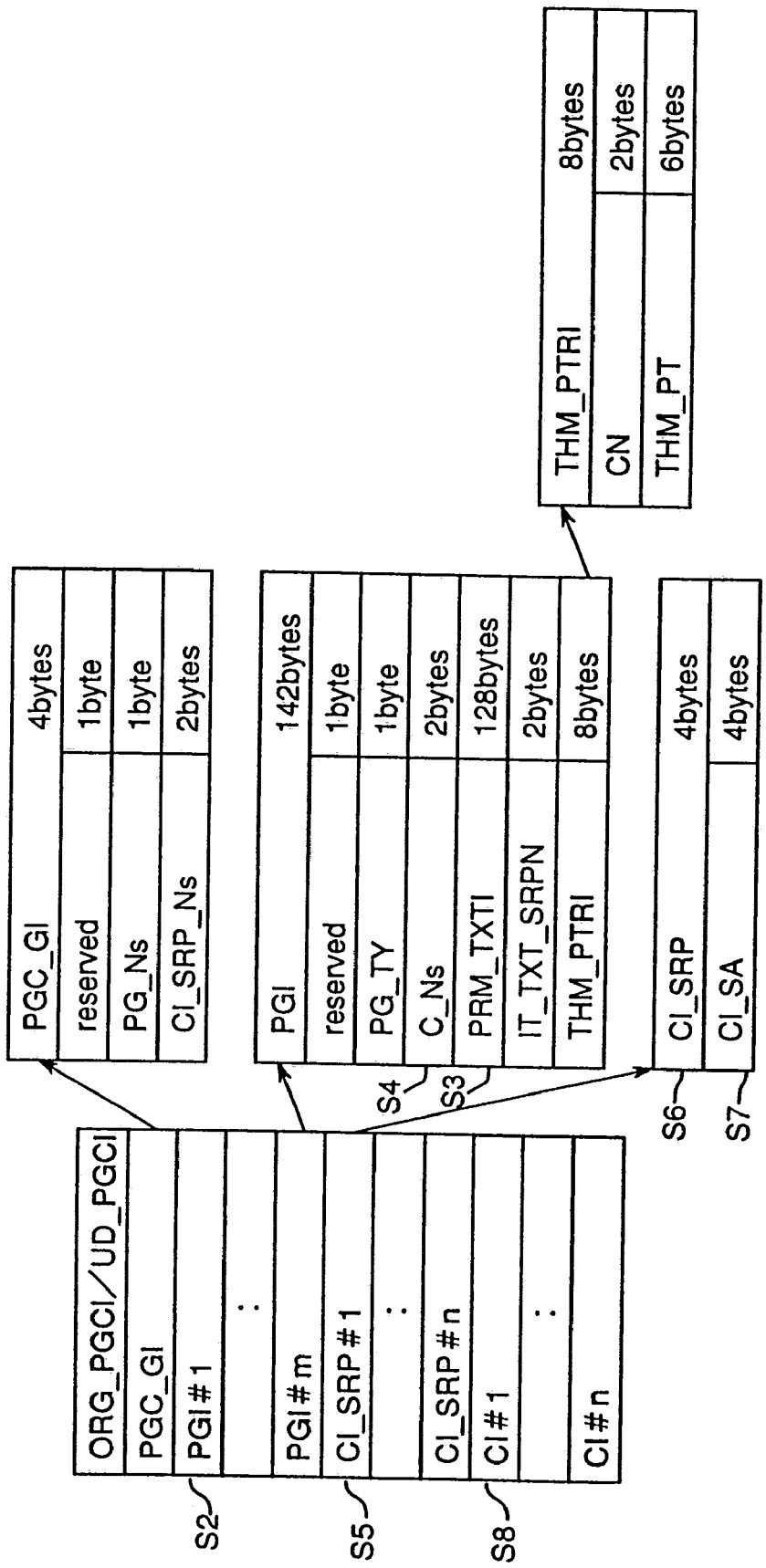
FIG. 28 shows the structure of the PGCI block.
Figure 30:
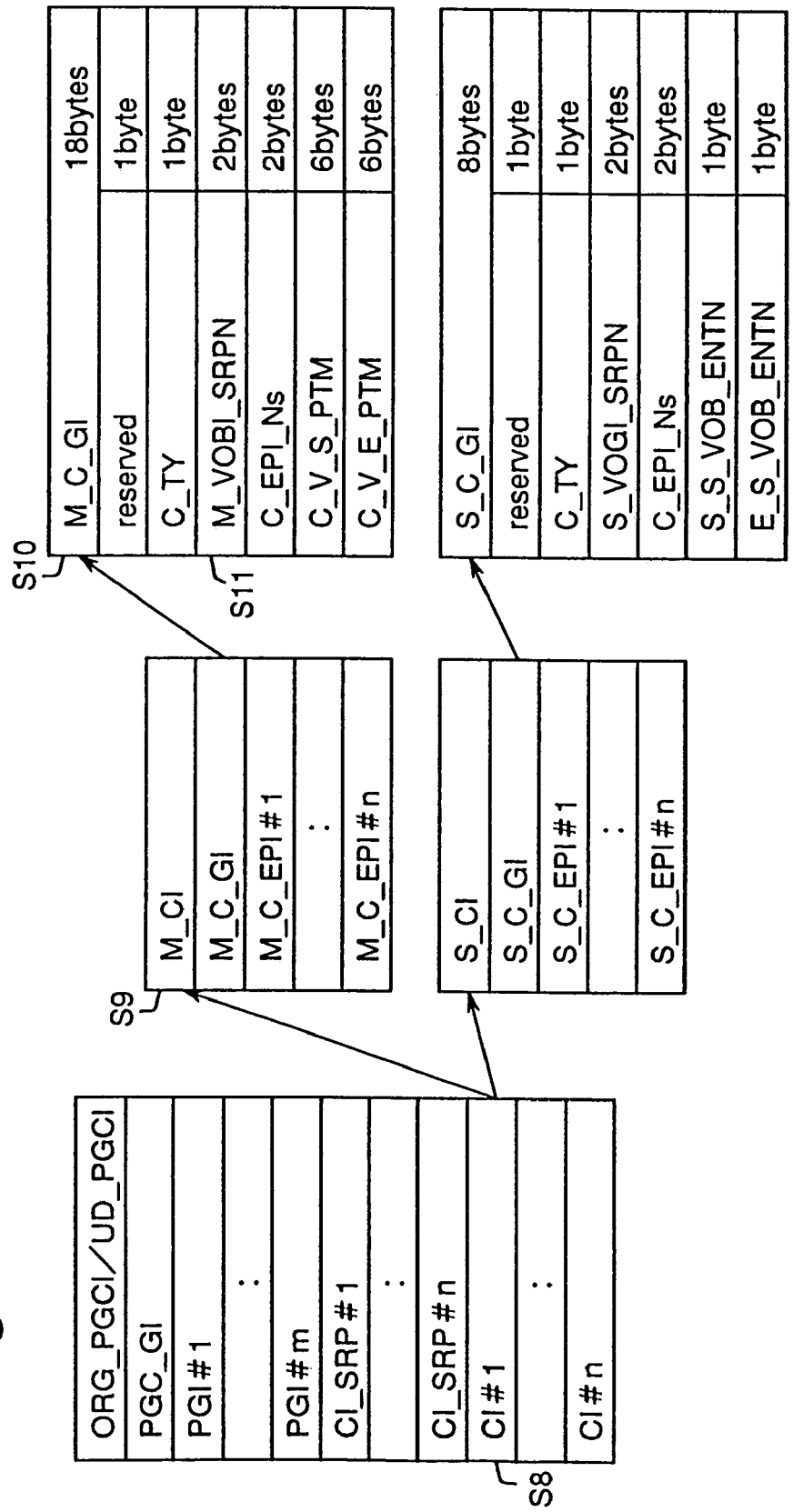
FIG. 30 shows the structure of the CI block.
Figure 36:
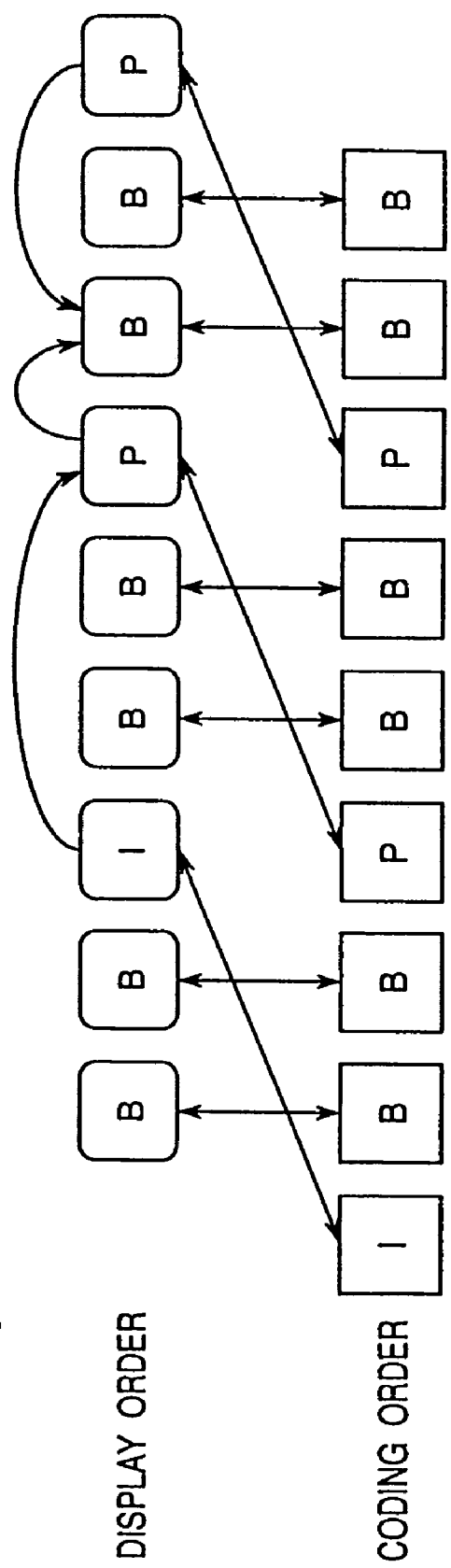
FIG. 36 shows the correlation between picture types in an MPEG video system stream.
Figure 37:
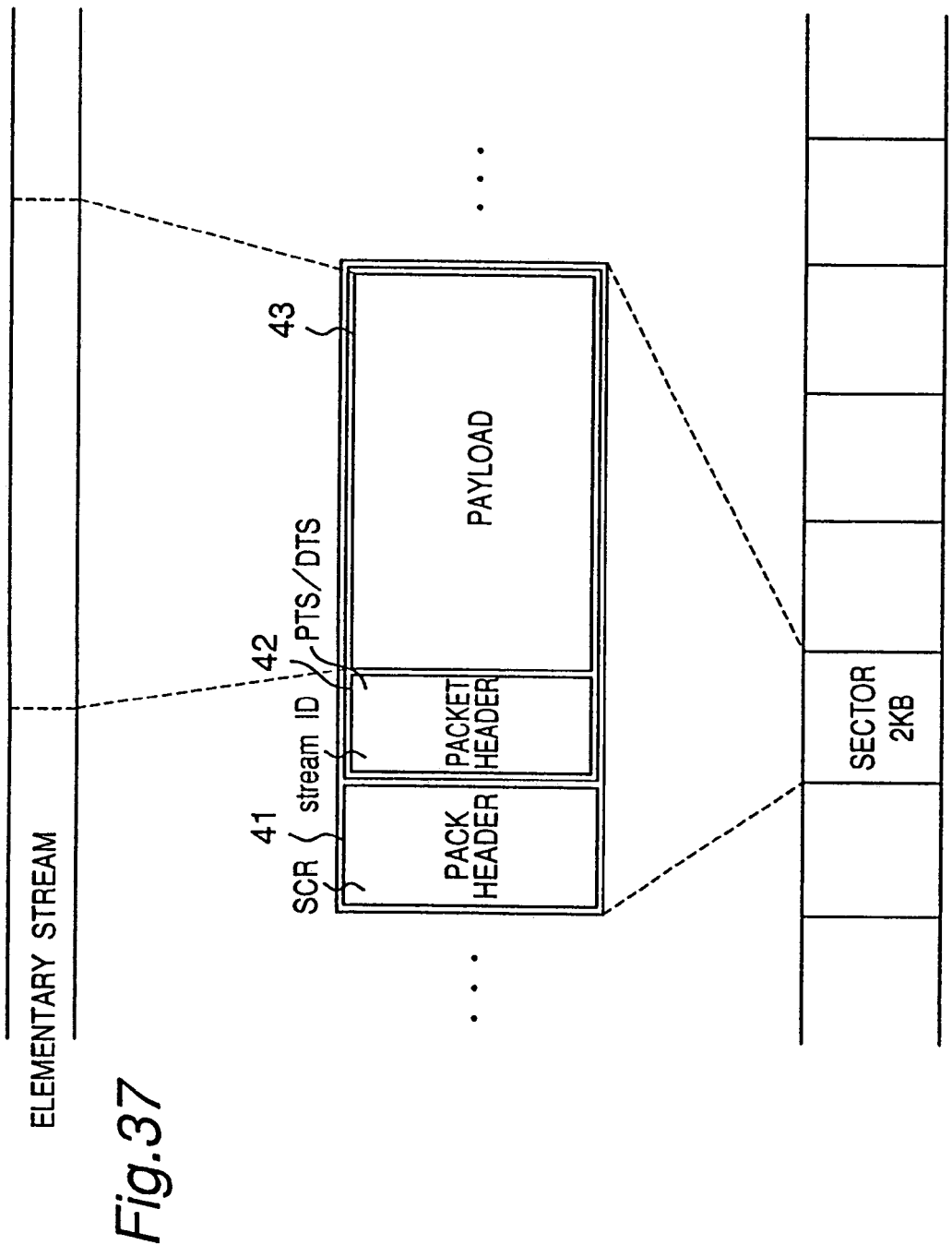
FIG. 37 shows the structure of an MPEG system stream.
Figure 38:
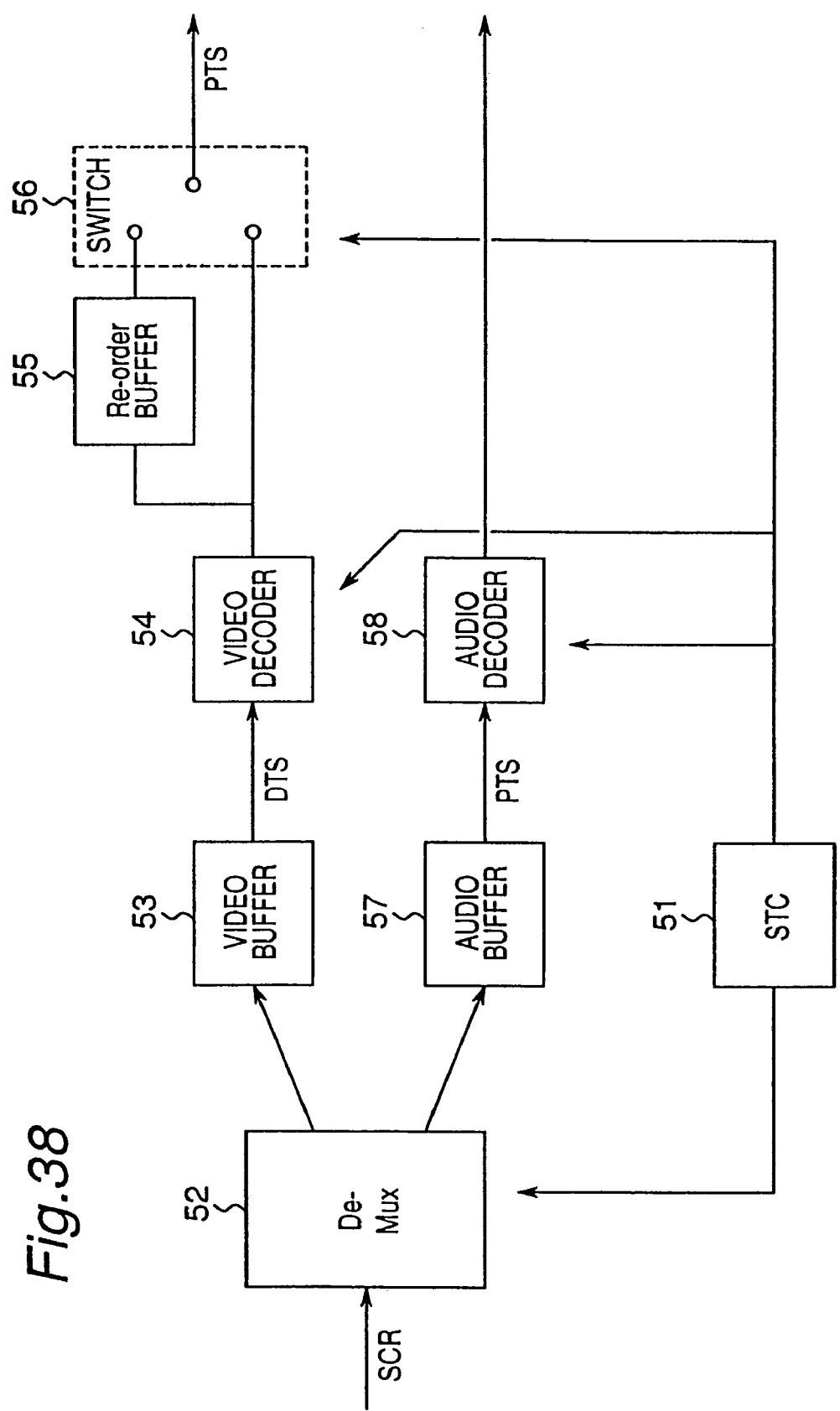
FIG. 38 is a block diagram of an MPEG system decoder (P_STD)
Figure 39:
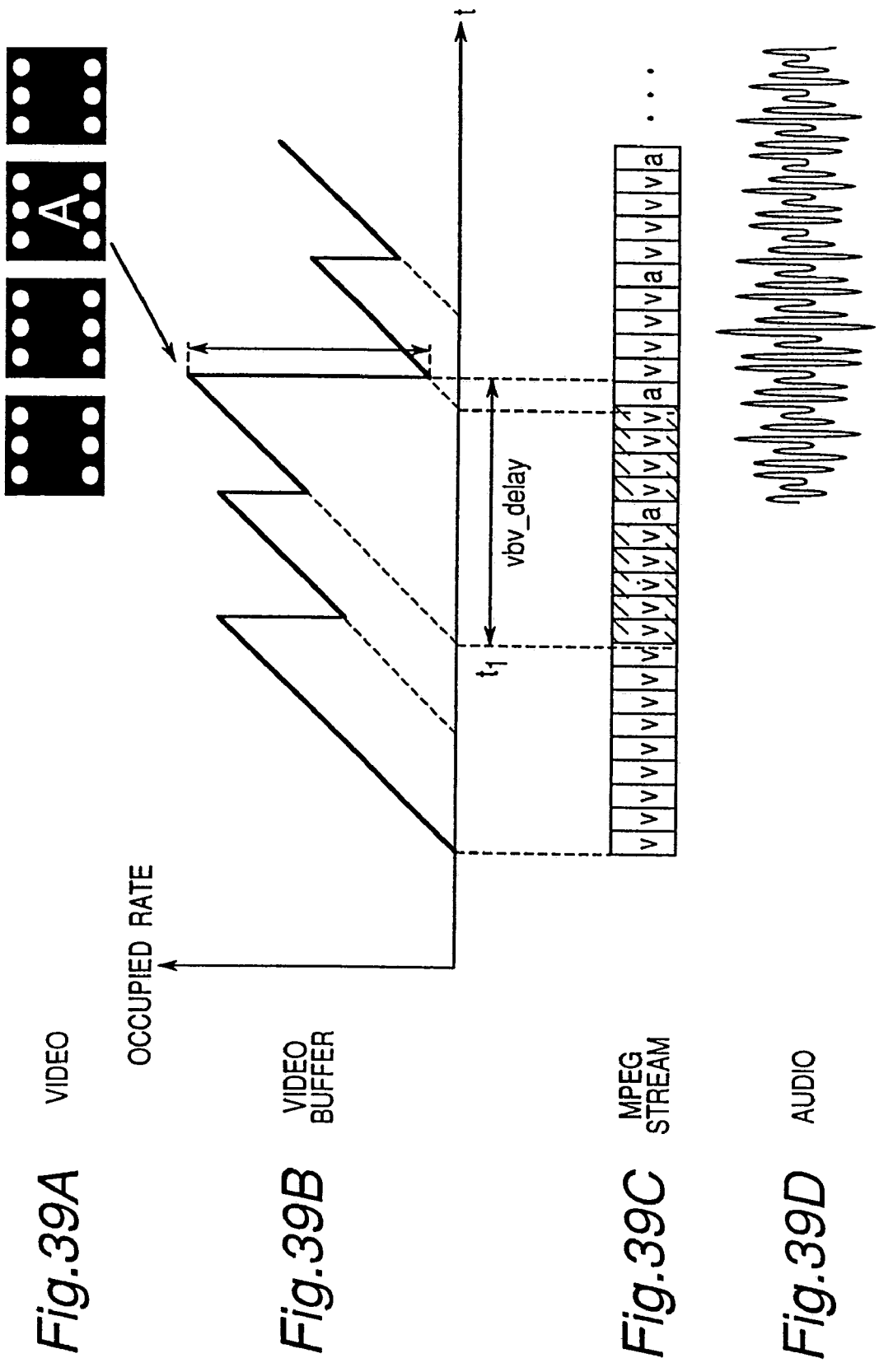
FIGS. 39(a) shows video data, (b) shows the change in data accumulation in the video buffer, (c) shows the MPEG system stream, and (d) shows the audio data.

The hierarchical structure of the ORG_PGCI management information is shown in FIG. 5, FIG. 28, and FIG. 30. The hierarchical structure of the UD_PGCI management information is shown in FIG. 5, FIG. 26, FIG. 28, and FIG. 30.

It should be noted that plural UD_PGCI can be recorded to a single disc. The UD_PGCIT (user defined program chain information table) as shown in FIG. 5 is therefore used as a table of these UD_PGCI from which a user can select a particular UD_PGCI for reproduction.

The title of the first recorded program can be obtained by tracing a path through the management information in the order described below with reference to FIG. 46.

S1 in FIG. 5→S2→S3 in FIG. 28.

The second row L2 in FIG. 46 shows the still image VOB management information S_VOBI and movie VOB management information M_VOBI. Up to 999 M_VOBI management information blocks can be recorded to an optical disc. The hierarchical structure of this M_VOBI management information is shown in FIG. 5, FIG. 15, and FIG. 16.

Whether a cell in the program chain information PGCI in row L1 is associated with any movie VOB management information M_VOBI in row L2 can be known from the management information described below.

S1 in FIG. 5→S2→S3 in FIG. 28 (C_Ns is the number of cells in the program. By counting the number of cells contained in a program in sequence from the first program, the number of a cell contained in the desired program is obtained. The number of the obtained cell is used as the cell search pointer CI_SRP#n.)

→S5→S6→S7 (Obtain the cell address based on the cell search pointer.)

→S8 (Obtain the number of the address cell information.)

→FIG. 30, S9 (movie cell information M_CI)

→S10 (movie cell general information M_CGI.)

→S11 (movie VOB information search pointer number M_VOBI_SRPN)

→FIG. 5, S12 (AV file information table)

→FIG. 15, S13→S14→S15 (access the movie VOB information search pointer detected in S11)

→S16→S17 (determine the movie VOB information start address)

→S18→S19

Figure 12:
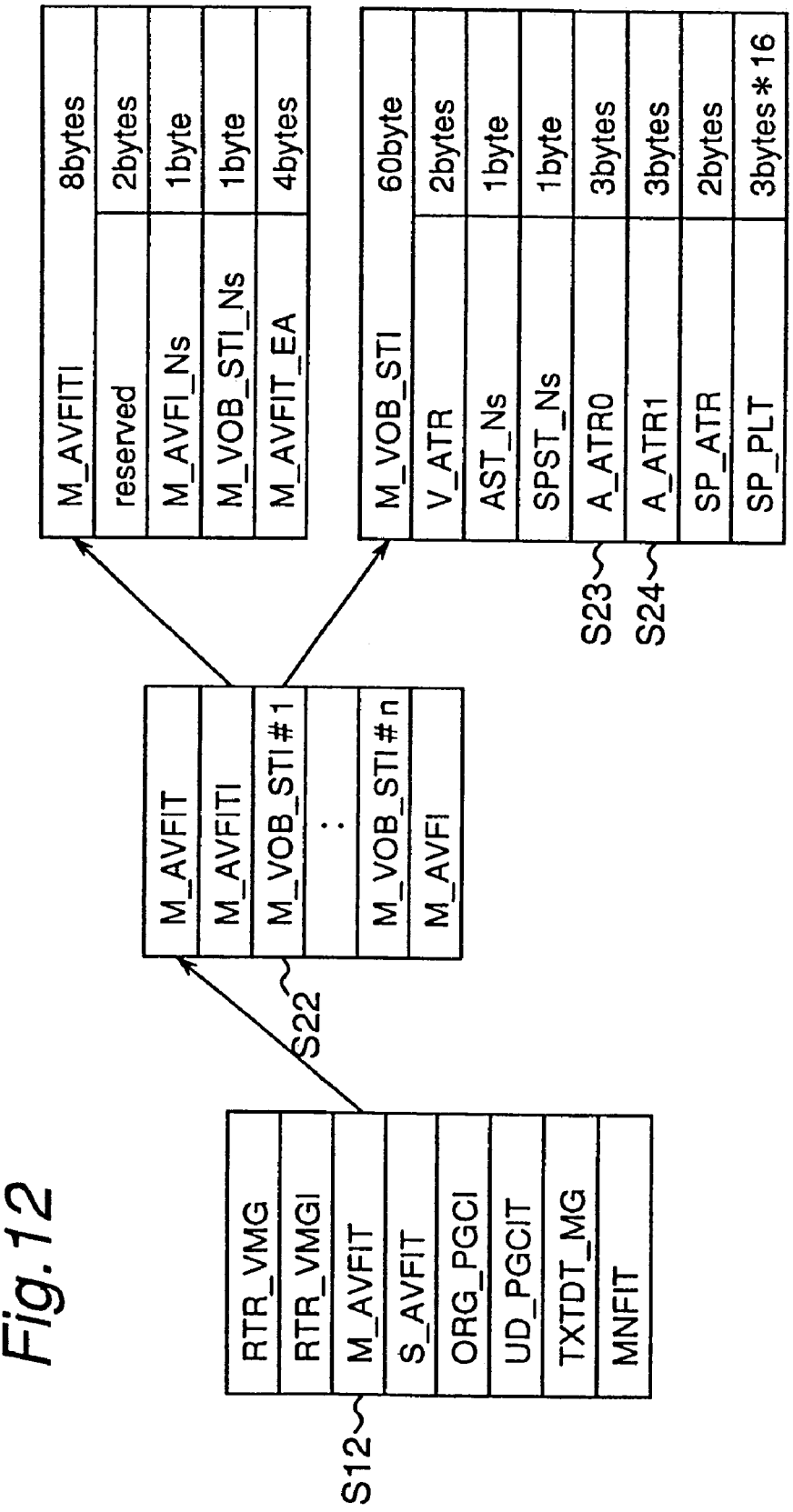
FIG. 12 shows the structure of the M_AVFIT block.

Row L3 in FIG. 46 shows the movie VOB stream information M_VOB_STI. Application Flag, and Preference Flag according to the present invention are written to M_VOB_STI. That is, as shown in FIG. 12, M_VOB_STI contains audio attributes A_ATR0 and A_ATR1. As shown in FIG. 13, audio attributes A_ATR0 and A_ATR1 contain an Application Flag (b17, b16) and Preference Flag (b19, b18). A maximum 64 M_VOB_STI can be written to one optical disc. One M_VOB_STJ is allocated to each one M_VOBI, and M_VOB_STI of identical content are often allocated to plural M_VOBI. In this case a common M_VOB_STI can be linked to multiple M_VOBI. For example, M_VOBI#1 and M_VOBI#2 are linked to a common M_VOB_STI#2 in FIG. 46.

The link between a particular M_VOBI and any particular M_VOB_STI can be known from management information as described next below.

In the above sequence of steps it was determined in step S19, FIG. 5, what movie VOB management information M_VOBI is linked to what cells in the program chain information PGCI in FIG. 46. The M_VOB_STI linked to movie VOB management information M_VOBI is obtained as follows.

FIG. 5, S19→S20→FIG. 16, S21 (M_VOB_STIN indicates a stream information number of the movie VOB).

The Application Flag (b17, b16) and Preference Flag are obtained from this M_VOB_STIN as follows.

FIG. 5, S12→FIG. 12, S22→S23→S24

Figure 47:
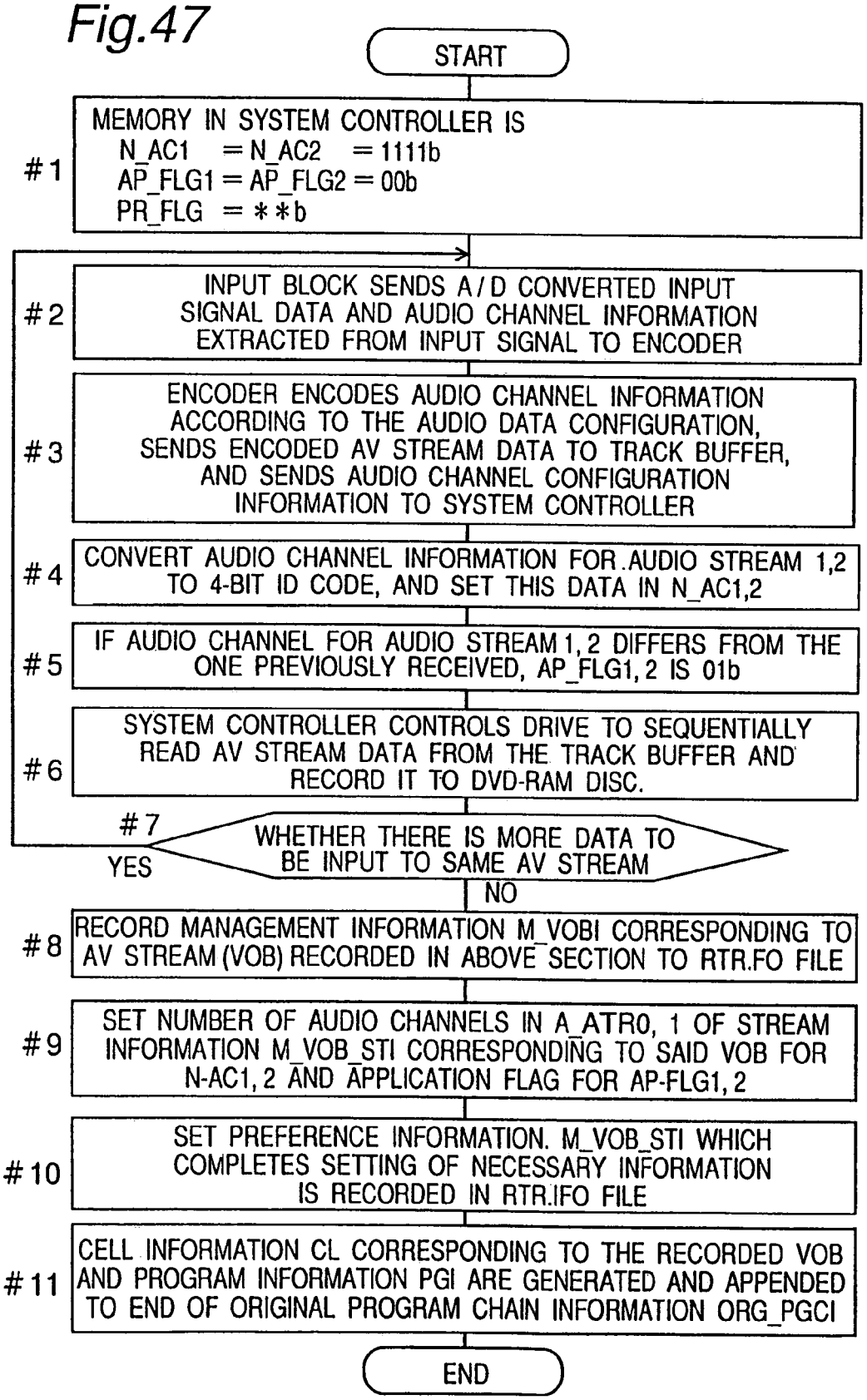
FIG. 47 is a flow chart of an operation for recording audio data management information to optical disc.

FIG. 47 is a flow chart of a process whereby a DVD-RAM disc is recorded by a DVD recorder according to the present invention. The steps in this process are described below.

Step #1: The disc recorder/player shown in FIG. 40 is initialized. N_AC1 memory, N_AC2 memory, AP_FLG1 memory, AP_FLG2 memory, and PR_FLG memory in the system controller 7802 are initialized. N_AC1 and N_AC2 are for temporarily recording the number of audio channels in audio stream 1 and audio stream 2. PR_FLG stores the user's channel preference. For example, if dual monaural recordings in Japanese and English are present, and the user prefers to listen in English, the Preference Flag information indicating that audio channel 2 should be preferentially reproduced is stored temporarily to memory. AP_FLG1 and AP_FLG2 store the audio stream 1 and audio stream 2 application information, that is, whether a mixed combination of plural audio channels is recorded. Information indicative of, for example, whether monaural, stereo, and dual monaural audio recordings are mixed in the single AV stream selected by the particular M_VOB_STI is temporarily stored in memory. A typical mixed audio application as shown in FIG. 42(c) might be a movie broadcast in Japanese and English using dual monaural channels and commercials recorded in stereo.

In Step #1 in this example, memory N_AC1 and N_AC2 are initialized to 1111b, and AP_FLG1 and AP_FLG2 are initialized to 00b, where "b" indicates binary code. PR_FLG is set to the preset value selected by the user by means of user interface 7801, or to the default value if no user preference has been defined.

Step #2: The input block 7803 sends the A/D converted input signal data (note that while both audio and video data is received and converted, we focus herein on the audio data) and the audio channel information extracted from the input signal to the encoder 7804.

Step #3: The encoder 7804 encodes the audio data according to the audio data configuration, sends the encoded audio data and video data, that is, the encoded AV stream data, to the track buffer, and sends 1o the audio channel information to the system controller 7802.

Step #4: The system controller 7802 converts the received audio channel information for audio stream 1 or audio stream 2 to the above-noted 4-bit ID code, and buffers this data to N_AC1 or N_AC2. For example, if the ID code is 0001b, the audio channel information is known to be two channel (stereo).

Step #5: If the audio channel for audio stream 1 or audio stream 2 differs within the same AV stream from the audio channel information previously received by the system controller 7802, AP_FLG1 or AP FLG2 is set to 01b. For example, if different audio channel configurations are mixed within a single audio stream as shown in FIG. 42 (c), the Application Flag is set to 01b as noted above, indicating that the audio stream contains a mixed audio channel configuration.

Step #6: The system controller 7802 controls the drive to sequentially read the AV stream data from the track buffer 7807 and record it to disc.

Step #7: Whether there is more data to be input to the same AV stream is then detected. If there is, the procedure loops back to step #2 and repeats. If not, it advances to step #8. In other words, step #8 begins when recording one AV stream is completed.

Step #8: Recording the movie VOB management information M_VOBI for the AV stream (VOB) that has been completely recorded begins to the RTR.FO file. It should be noted that most of this management information is temporarily stored in memory by the system controller 7802.

Step #9: Information in N_AC1 memory about the number of audio channels stored, and information in AP_FLG1 memory indicative of whether a mixed audio channel configuration is recorded, is recorded to ATR0 in stream information M_VOB_STI, that is, to areas b11, b10, b9, and b8, and b7 and b16 in the A_ATR0 format shown on the bottom in FIG. 13. Data from memory N_AC2 and AP_FLG2 is likewise recorded in ATR1 of stream information M_VOB_STI.

Step #10: User preference information recorded to PR_FLG memory is recorded to ATR0 in stream information M_VOB_STI, that is, to areas b19, b18 in the A_ATR0 format shown on the bottom in FIG. 13. Other information is also recorded to complete M_VOB_STI, and recorded to the RTR.IFO file.

Step #11: Cell information CI corresponding to the recorded VOB and program information PGI are generated and appended to the end of the original program chain information ORG_PGCI.

As shown in FIG. 50, when a DVD-RAM disc according to the present invention is loaded into a disc player, a list of all programs (for example, television dramas, sitcoms, documentaries, new movies, other) recorded to the DVD-RAM disc is presented by means of the output section 7805 for the user to review. The configuration of the audio accompanying each program is also indicated in this program list.

Figure 48:
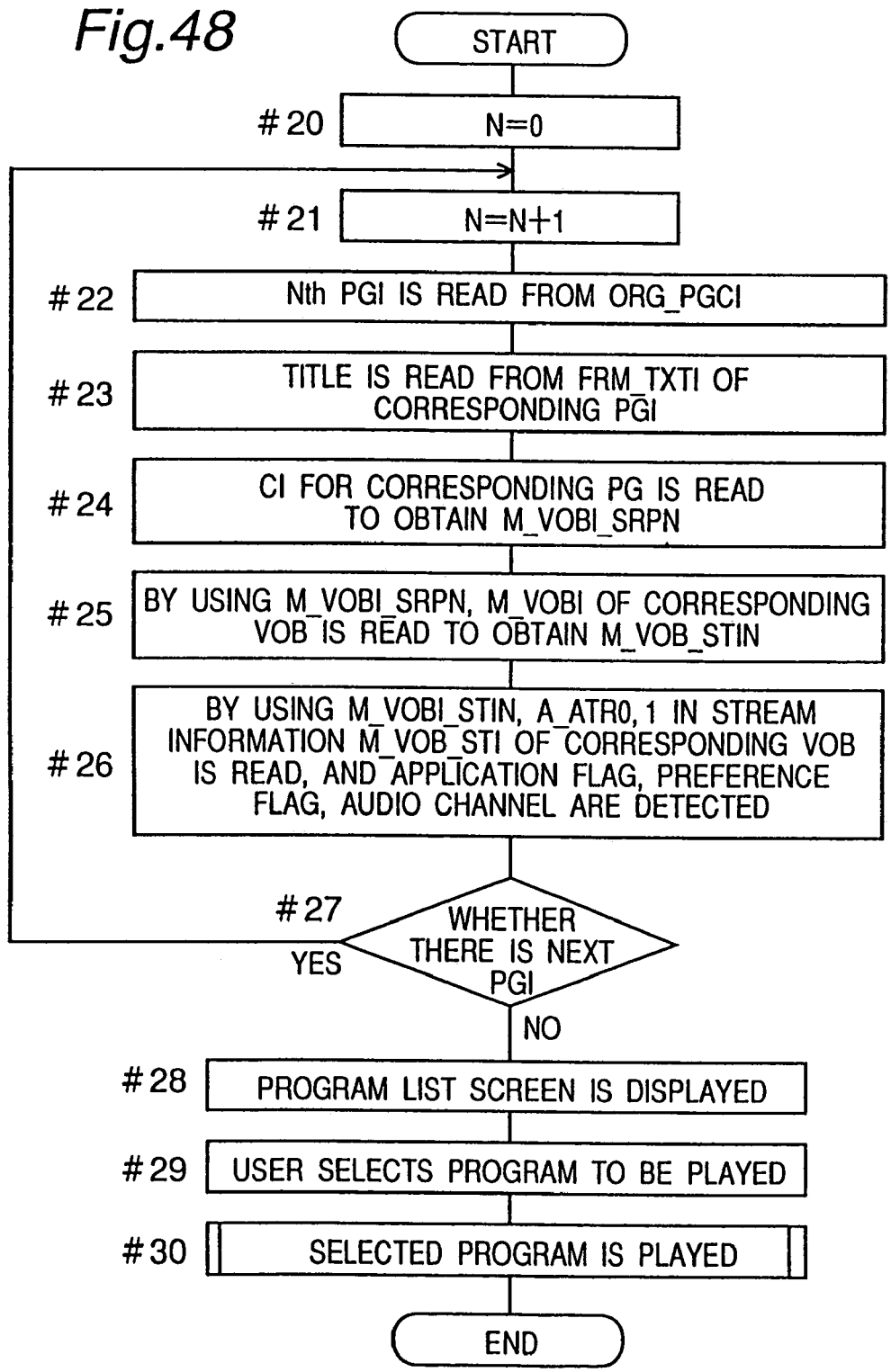
FIG. 48 is a flow chart of an operation for presenting a program list indicating the content of a disc inserted to the disc player.

FIG. 48 is a flow chart of a process for presenting a program list, and particularly information relating to the audio content configuration, for the user. The example described below addresses presenting a program list for an original program, that is, program content not edited by the user. The steps in this process follow.

Step #20: A counter N for counting the number of programs is reset to zero.

Step #21: Counter N is incremented 1.

Step #22: Program information PGI for the N-th program is read.

Step #23: The title is read from the PRM_TXTI field of the PGI.

Step #24: The cell information CI for the PGI is read to obtain the movie VOB information search pointer number M_VOBI_SRPN.

Step #25: Using M_VOBI_SRPN, the corresponding movie VOB management information M_VOBI is read and the movie VOB stream information number M_VOB_STIN is detected.

Step #26: Using M VOB_STIN, A_ATR0 in the movie VOB stream information M_VOB_STI of the corresponding M_VOB is read, and the Application Flag, Preference Flag, and audio channel count for audio stream 1 are detected. A_ATR1 is likewise read, and management information is found therein the Application Flag, Preference Flag, and audio channel count for audio stream 2 are also detected.

Step #27: Whether there is a next program information PGI is determined. If there is, the procedure loops back to step #21; if not, the procedure advances to step #28.

Step #28: Using the title detected in step #23 and the Application Flag, Preference Flag, and audio channel count detected in step #26, a program list screen is generated and presented. This program list also displays based on the information from A_ATR0 whether for audio stream 1 there is a mixed configuration of plural audio channels, whether an enhancement channel is present, and the number of audio channels. Based on the information from A_ATR1, it is also indicated for audio stream 2 whether there is a mixed configuration of plural audio channels, whether an enhancement channel is present, and the number of audio channels. If both A_ATR0 and A_ATR1 are present, the program list indicates that there are two audio streams available; if only A_ATR0 information is present, the program list indicates there is only one audio stream available.

Step #29: Referring to the displayed program list, the user selects a program by way of user interface 7801.

Step #30: The disc player then plays the selected program. The process for this is shown in the flow chart of 49 and described below.

A typical program list display is described below with reference to FIG. 50.

The numbers 1, 2, 3 on the left side of the display are sequential program numbers. The titles are shown in the middle column. In this example the program list includes a television drama, overseas documentary, and a new movie. This information is stored to the PRM_TXTI field of the program information PGI of the original program chain information ORG_PGCI written to the optical disc.

The third column (including two audio streams, monaural, and stereo, for example) shows the audio stream configuration of the corresponding program. This information relates to the audio stream contained in the VOB referenced from a cell contained in the corresponding program, and is generated and displayed using the ATR0 or ATR1 information recorded to the M_VOB_STI specified by M_VOB_S-TIN in the VOBI of the VOB. The user knows from this information the configuration of the audio stream contained in the program, and can thus determine what audio streams can be selected and the typical format of an audio stream when reproduced.

For example, it can be determined before playback begins that if the user selects the "overseas documentary", audio stream 1 of the dual monaural audio content will be reproduced based on the information recorded to ATR0, and that in accordance with the Preference Flag of ATR0 storing the user's preference, audio channel 1 (main audio) will be reproduced by default.

Likewise, if the "new movie" is selected, it can be known from the information recorded to the Number Of Audio Channels and the Application Flag recorded to ATR0 that audio stream 1 contains a mixture of dual monaural and other audio content, and that the user's preference specified by the Preference Flag is to listen to audio channel 2 (sub) in the representative dual monaural parts of the audio content.

It will thus be obvious that information from ATR0 and ATR1 can be presented to the user when allowing the user to select the program to be reproduced. The user can thus know basic information about the various possible audio stream configurations, such as how many audio streams are available, the channel configuration of each audio stream, and whether the channel configuration includes multiple modes mixed together, before a selection is made and playback starts, thus avoiding confusing the user when playback actually begins.

It is also possible to set for each VOB whether to select audio channel I or 2 when the audio stream is a dual monaural configuration, and the user can record using the Preference Flag of ATR0 and ATR1 which audio channel is preferred.

Moreover, if the disc player has a function for automatically selecting and reproducing the audio channel specified by the Preference Flag of a particular VOB, the user can preprogram the disc player once with the user's preferred audio channel selection so that the desired audio channel will always be automatically selected and played without the user needing to change the audio channel at all.

The playback operation performed after the user selects the program to be reproduced is described next below.

The track buffer 7807, decoder 7806, and output section 7805 are initialized by a command from the system controller 7802. The system controller 7802 then instructs the disc drive to seek the start address of the AV data in the first VOB of the selected program. The drive then begins reading the data and passes the read AV data to the track buffer 7807. The decoder 7806 reads data from the track buffer 7807, extracts the decompressed AV data by applying an MPEG decoding operation, and passes the decompressed AV data to the output section 7805. The output section 7805 D/A converts the data and outputs the resulting analog AV data to the television or other AV device connected to the output terminal.

FIG. 49 is a flow chart of a playback process for reproducing a program selected from the presented program list. The steps in this process are described next below.

Step #40: The cell information CI for the program information PGI of the selected program is read to obtain M_VOB_SRPN.

Step #41: The corresponding M_VOBI is read from the detected M_VOB_SRPN to obtain the VOB data read address.

Step #42: M_VOB_STIN is obtained from M_VOBI.

Step #43: Using M_VOB_STIN, the decoder is set to the attributes of the corresponding VOB stream. It should be noted that the audio stream attributes used to setup decoder operation at this time are the audio stream attributes related to the present invention, such as information about the number of audio channels and whether there is a mixed configuration of multiple audio channels.

Step #44: If there are two audio streams, one is selected by means of the user interface of the disc player. If there are multiple audio channels in the selected audio stream, or in the audio stream itself if there is only one audio stream from the start, and user preference information is also recorded, the audio channel indicated by the user preference information is selected. If preference information is not recorded, a default audio channel, such as audio channel 1, is selected.

Step #45: The decoder is set to the selected audio channel.

Step #46: VOB data is read from the read address, buffered to the track buffer, and supplied to the decoder.

Step #47: The decoder decodes the audio channel selected in step #44.

Step #48: Whether there is further VOB data to be read is determined. If there is, the procedure loops back to step #40; if not, the process ends.

It should be noted that the preferred embodiment of the invention is described above with reference to a DVD-RAM disc, but it will be obvious to one with ordinary skill in the related art that any rewritable optical disc can be alternatively used. Also, the invention is not restricted to optical disc, but can be applied to a hard disk or even distributable flash memory, i.e., a rewritable, random accessible storage medium of sufficient capacity.

In addition, preference information regarding two audio channels of a dual monaural configuration are used as the Preference Flag values stored to ATR0/ATR1 above, but preference information defining a preferred selection from among plural audio streams can be alternatively used.

Yet further, the Application Flag information stored to ATR0/ATR1 as described above indicates whether a mixed configuration of plural audio channels is recorded, or whether an audio enhancement channel for the visually impaired is recorded. Other possible Application Flag values include information indicating whether audio in a particular language is recorded. The DVD recorder as referred to above is also assumed to have both recording and playback capabilities in a single unit, but the benefits of the present invention can also be achieved using a dedicated disc recorder and a separate dedicated disc player.

Benefits of the Invention

By recording information indicating the type of an audio stream configuration contained in AV data recorded to optical disc, meaningful information enabling the user to select a desired AV stream for reproduction can be presented to the user, thereby avoiding user confusion and making the optical disc and disc player easier to operate and use.

Furthermore, by recording user preference information, it is additionally possible to provide a disc player capable of automatically selecting and reproducing an appropriate audio channel conforming to the user preference.

Although the present invention has been described in connection with the preferred embodiments thereof with reference to the accompanying drawings, it is to be noted that various changes and modifications will be apparent to those skilled in the art. Such changes is and modifications are to be understood as included within the scope of the present invention as defined by the appended claims, unless they depart therefrom.

What is claimed is:

1. A playback method for reproducing an optical disc comprising an area for storing a data stream containing an encoded video stream and at least one encoded audio stream, and an area for storing management information, said management information comprising an application flag which indicates whether a single audio stream includes at least two of the following, (a) dual monaural audio data having first audio channel data and second audio channel data, one of which is to be selectively reproduced, (b) stereo audio data having first audio channel data and second audio channel data, which are to be simultaneously reproduced, and (c) monaural audio data having data for only one audio channel, the playback method comprising:

reading the application flag from the area for storing management information;

detecting according to the application flag whether the single audio stream contains at least two of said audio data (a), (b) and (c); and generating a program list including audio information based on the application flag.

2. A playback apparatus for reproducing an optical disc comprising an area for storing a data stream containing an encoded video stream and at least one encoded audio stream, and an area for storing management information, said management information comprising an application flag which indicates whether a single audio stream includes at least two of the following, (a) dual monaural audio data having first audio channel data and second audio channel data, one of which is to be selectively reproduced, (b) stereo audio data having first audio channel data and second audio channel data, which are to be simultaneously reproduced, and (c) monaural audio data having data for only one audio channel, the playback apparatus comprising:

means for reading the application flag from the area for storing management information;

means for detecting according to the application flag whether the single audio stream contains at least two of said audio data (a), (b) and (c); and means for generating a program list including audio information based on the application flag.

* * * * *

UNITED STATES PATENT AND TRADEMARK OFFICE
CERTIFICATE OF CORRECTION

| | |
|---|---|
| PATENT NO. | : 7,062,155 B2 |
| APPLICATION NO. | : 10/713112 |
| DATED | : June 13, 2006 |
| INVENTOR(S) | : Kaoru Murase et al. |

It is certified that error appears in the above-identified patent and that said Letters Patent is hereby corrected as shown below:

IN THE SPECIFICATION

In column 2, line 9, please replace "input/output;" with --input/output,--.

In column 3, line 65, please replace "payload to 43" with --payload 43--.

In column 6, line 55, please replace "know 1o the" with --know the--.

In column 10, line 63, please replace "A PCK" with --A_PCK--.

In column 11, line 32, please replace "of-user-defined" with --of user-defined--.

In column 11, line 55, please replace "disc The" with --disc. The--.

In column 12, line 24, please replace "S_AVFIT SA" with --S_AVFIT_SA--.

In column 13, line 12, please replace "Creation" with --creation--.

In column 13, line 64, please replace "M_AVFIT EA" with --M_AVFIT_EA--.

In column 15, line 49, please replace "0000 0110b: 192 kbps" with --0000 0111b: 192 kbps--.

In column 16, line 27, please replace "01" to --01b--.

In column 16, line 30, please replace "(dual monaural) is audio" with --(dual monaural) audio--.

In column 16, line 52, please replace "file feneral information" with --file general information--.

In column 17, line 43, please replace "audio-reproduction" with --audio reproduction--.

In column 18, line 3, please replace "Date/time" with --date/time--.

In column 18, line 14, please replace "M VOB_STI" with --M_VOB_STI--.

UNITED STATES PATENT AND TRADEMARK OFFICE
CERTIFICATE OF CORRECTION

PATENT NO. : 7,062,155 B2
APPLICATION NO. : 10/713112
DATED : June 13, 2006
INVENTOR(S) : Kaoru Murase et al.

It is certified that error appears in the above-identified patent and that said Letters Patent is hereby corrected as shown below:

IN THE SPECIFICATION

In column 19, line 62, please replace "(Video Attributes)" with --(video attributes)--.

In column 20, line 40, please replace (S VOB_STI number)" with --(S_VOB_STI number)--.

In column 22, line 10, please replace "(IT TXT search pointer number)" with --(IT_TXT search pointer number)--.

In column 23, line 20, please replace "(IT_TXT_SRP Number)" with --(IT_TXT_SRP number)--.

In column 23, line 63, please replace "(Cell Video End Time)" with --(cell video end time)--.

In column 24, line 61, please replace "S_C EPI" with --S_C_EPI--.

In column 27, line 62, please replace "sends 1o the" with --sends the--.

In column 28, line 7, please replace "AP FLG2" with --AP_FLG2--.

In column 29, line 5, please replace "M VOB_STIN," with --M_VOB_STIN--.

In column 29, line 12, please replace "Step #27" with -- Step #27--. (indent paragraph)

UNITED STATES PATENT AND TRADEMARK OFFICE
CERTIFICATE OF CORRECTION

| | |
|---|---|
| PATENT NO. | : 7,062,155 B2 |
| APPLICATION NO. | : 10/713112 |
| DATED | : June 13, 2006 |
| INVENTOR(S) | : Kaoru Murase et al. |

It is certified that error appears in the above-identified patent and that said Letters Patent is hereby corrected as shown below:

In column 30, line 15, please replace "channel I or 2" with --channel 1 or 2--.

Signed and Sealed this

Twenty-seventh Day of February, 2007

JON W. DUDAS
*Director of the United States Patent and Trademark Office*